US010565848B2

(12) United States Patent
Davis et al.

(10) Patent No.: US 10,565,848 B2
(45) Date of Patent: Feb. 18, 2020

(54) FLUID LEAK DETECTION METHODS, SYSTEMS AND APPARATUS

(71) Applicant: Geyser Innovations, Ltd., Lakewood, CO (US)

(72) Inventors: Eric Davis, Lakewood, CO (US); Vincent Douglas Powell, Westminster, CO (US)

(73) Assignee: DripDrone, Inc., Denver, CO (US)

( * ) Notice: Subject to any disclaimer, the term of this patent is extended or adjusted under 35 U.S.C. 154(b) by 0 days.

(21) Appl. No.: 15/081,868

(22) Filed: Mar. 26, 2016

(65) Prior Publication Data
US 2016/0284193 A1    Sep. 29, 2016

Related U.S. Application Data

(60) Provisional application No. 62/138,878, filed on Mar. 26, 2015.

(51) Int. Cl.
*G08B 21/18* (2006.01)
*G01M 3/18* (2006.01)
*G01M 3/16* (2006.01)

(52) U.S. Cl.
CPC ............... *G08B 21/18* (2013.01); *G01M 3/16* (2013.01); *G01M 3/18* (2013.01)

(58) Field of Classification Search
CPC ............. A61M 2205/15; F01P 2031/18; F02D 2041/225; F16D 2500/511; F16L 2201/30; F02K 9/54; F17C 2260/038; F22B 37/421; F24F 2011/0084; G01F 23/00; G01M 3/007; G01M 3/16; G01M 3/283;
(Continued)

(56) References Cited

U.S. PATENT DOCUMENTS 3,299,417 A    1/1967 Sibthorpe
4,667,505 A *  5/1987 Sharp .................... F16L 21/002
                                                      138/104
(Continued)

FOREIGN PATENT DOCUMENTS

CN    203705128    7/2014
DE    2202826      8/1972
(Continued)

OTHER PUBLICATIONS

PCT/US2016/024385, filed Mar. 26, 2016, International Search Report and Written Opinion, dated Jun. 15, 2016, 12 pages.

*Primary Examiner* — Brian Wilson
(74) *Attorney, Agent, or Firm* — Haynes and Boone, LLP

(57) ABSTRACT

Embodiments disclosed herein relate to leak detection and notification from fluid conduit systems, apparatus and methods. In one aspect, embodiments relate to leak detection of water supply, sewage system, and plumbing. In another aspect, embodiments of the invention comprise an apparatus related to piping and plumbing encapsulation for detecting leaks. In another aspect, certain embodiments further comprise an apparatus that conform to piping and plumbing features, for example, valves and connectors, for detecting leaks that may be included as part of original installations or added in retrofit applications. In other embodiments, leak detection and notification systems may be included as part of the manufacture of fixtures by a manufacturer.

20 Claims, 43 Drawing Sheets

(58) Field of Classification Search
CPC .............. G01M 3/18; G01N 2223/647; Y10S 252/964; G08B 21/18; G08B 21/20
USPC ....... 340/540, 603, 604, 605, 612, 618–625; 114/114; 137/312
See application file for complete search history.

(56) References Cited

U.S. PATENT DOCUMENTS

| | | | |
|---|---|---|---|
| 4,786,088 A * | 11/1988 | Ziu | F16L 7/00 138/113 |
| 5,072,622 A | 12/1991 | Roach et al. | |
| 5,343,191 A | 8/1994 | McAtamney | |
| 5,351,753 A * | 10/1994 | Golson | E21B 33/08 166/107 |
| 5,511,573 A * | 4/1996 | Corte | F16K 27/12 137/15.08 |
| 5,550,532 A * | 8/1996 | Marshall | G01M 3/16 137/312 |
| 5,610,324 A * | 3/1997 | Lawson | G01M 3/042 340/605 |
| 6,206,337 B1 | 3/2001 | Veillet, Jr. | |
| 6,230,735 B1 * | 5/2001 | Bravo | F16K 51/00 137/312 |
| 6,789,584 B2 * | 9/2004 | Linam | F16L 19/00 137/15.11 |
| 6,886,388 B1 | 5/2005 | McGill et al. | |
| 6,935,160 B2 | 8/2005 | Hong et al. | |
| 7,362,230 B1 | 4/2008 | Fish | |
| 8,281,645 B2 | 10/2012 | Dryden | |
| 8,823,532 B1 | 9/2014 | Carlblom | |
| 9,920,586 B2 | 3/2018 | Brewer | |
| 2002/0179300 A1 * | 12/2002 | Gay | E21B 33/08 166/81.1 |
| 2006/0289104 A1 | 12/2006 | Haggerty | |
| 2007/0289635 A1 | 12/2007 | Ghazarian | |
| 2008/0224876 A1 * | 9/2008 | Fish | G01M 3/04 340/605 |
| 2008/0246621 A1 * | 10/2008 | Wu | G01M 3/16 340/605 |
| 2011/0048555 A1 | 3/2011 | Malouf et al. | |
| 2014/0202558 A1 * | 7/2014 | Chou | F16K 27/12 137/377 |
| 2014/0259383 A1 * | 9/2014 | Harris | E03C 1/0403 4/678 |
| 2015/0010356 A1 | 1/2015 | Adler | |
| 2015/0246806 A1 * | 9/2015 | Yoo | B67D 7/3209 137/312 |
| 2015/0348392 A1 * | 12/2015 | Burtner | G01F 23/242 340/605 |
| 2016/0108699 A1 * | 4/2016 | Martino | E21B 34/02 166/91.1 |

FOREIGN PATENT DOCUMENTS

| | | | | |
|---|---|---|---|---|
| EP | 055119 | 6/1982 | | |
| GB | 2431429 | 4/2007 | | |
| GB | 2431429 A * | 4/2007 | ........... | F24D 19/088 |
| GB | 2489061 | 9/2012 | | |
| JP | H10292893 | 11/1998 | | |
| KR | 10-20130077525 | * | 1/2015 | ............... F17D 5/02 |
| KR | 101479520 | 1/2015 | | |
| WO | WO9317266 | 9/1993 | | |
| WO | WO9622516 | 7/1996 | | |
| WO | WO9743616 | 11/1997 | | |
| WO | WO03076890 | 9/2003 | | |
| WO | WO2008153410 | 12/2008 | | |

* cited by examiner

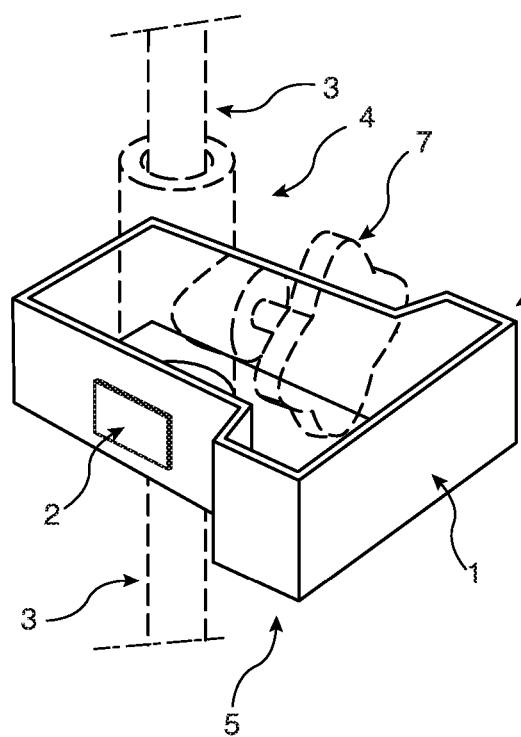
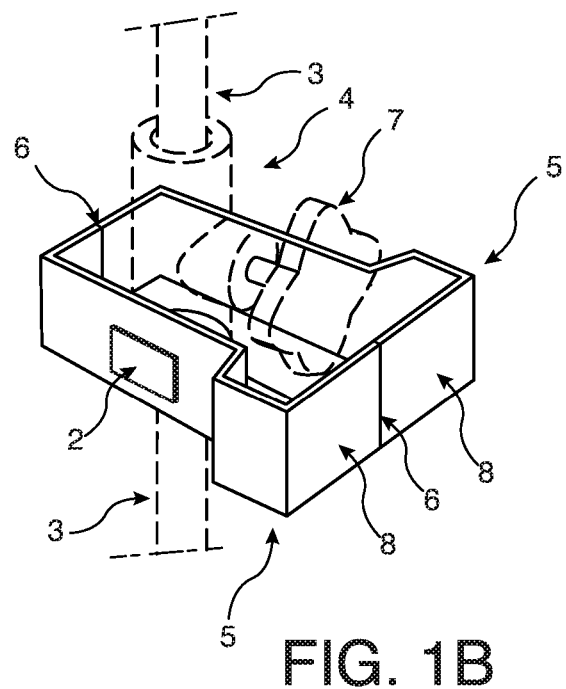
FIG. 1A
FIG. 1B
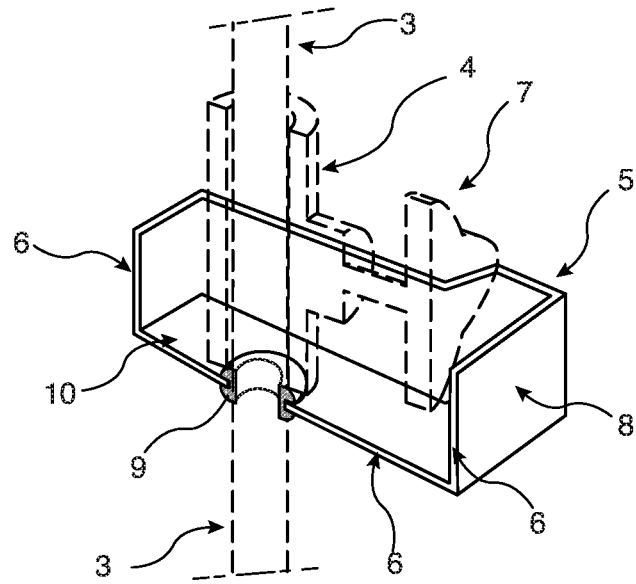
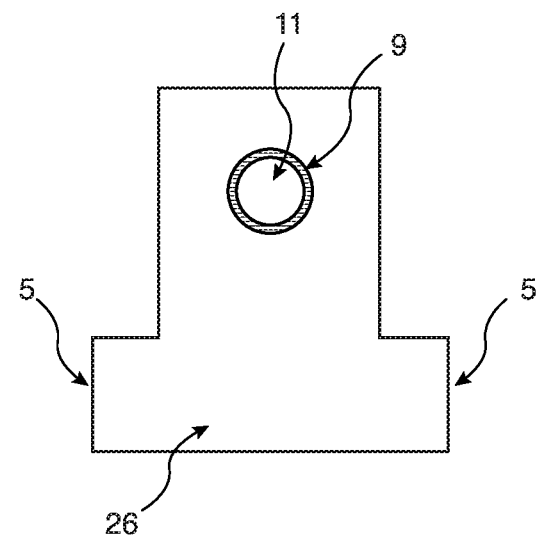
FIG. 1C
FIG. 1D

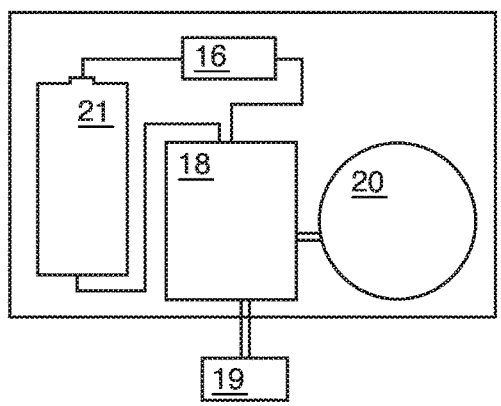
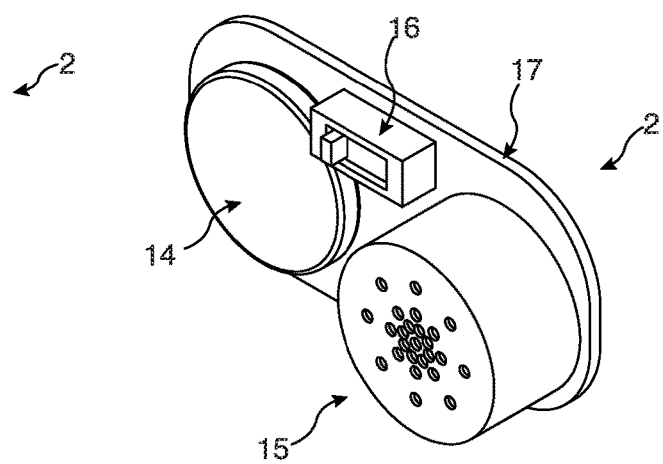
FIG. 3A  FIG. 3B
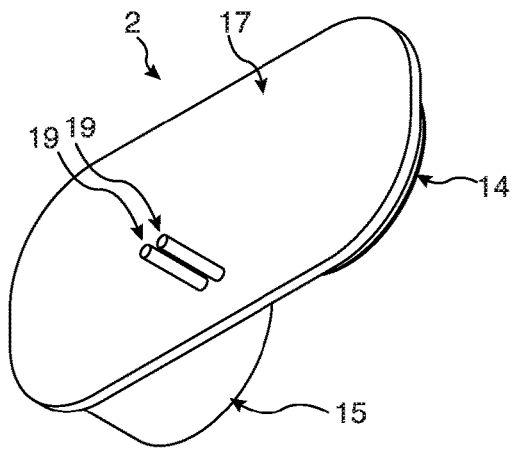
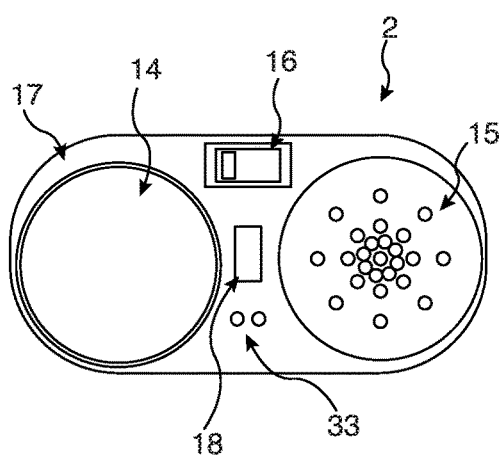
FIG. 3C  FIG. 3D
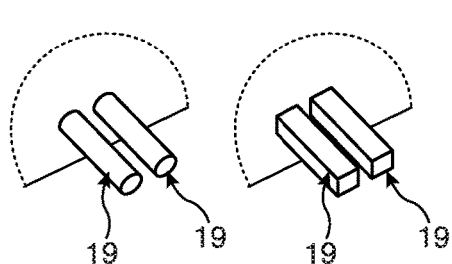
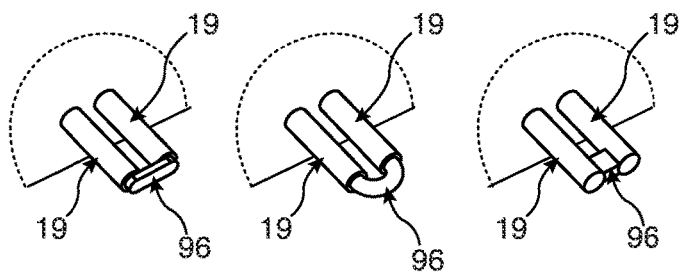
FIG. 3E  FIG. 3F

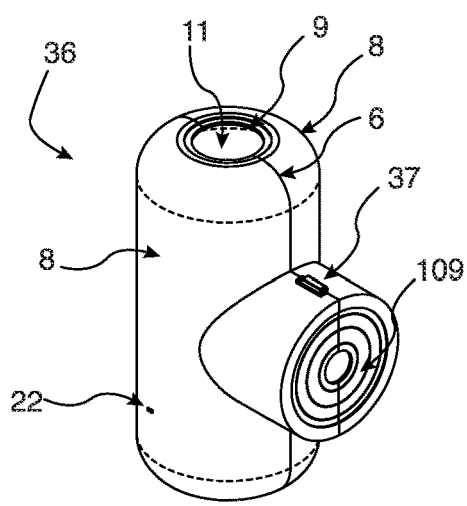
FIG. 8A
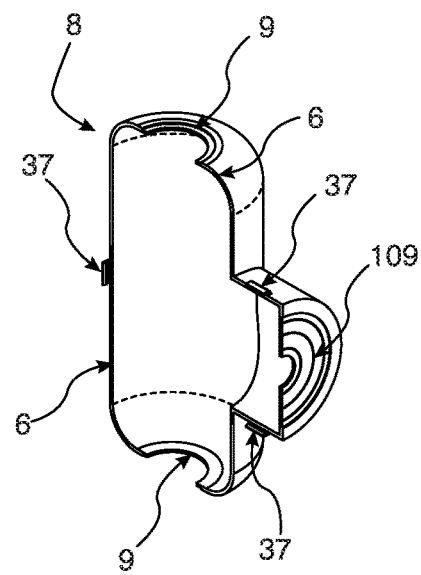
FIG. 8B
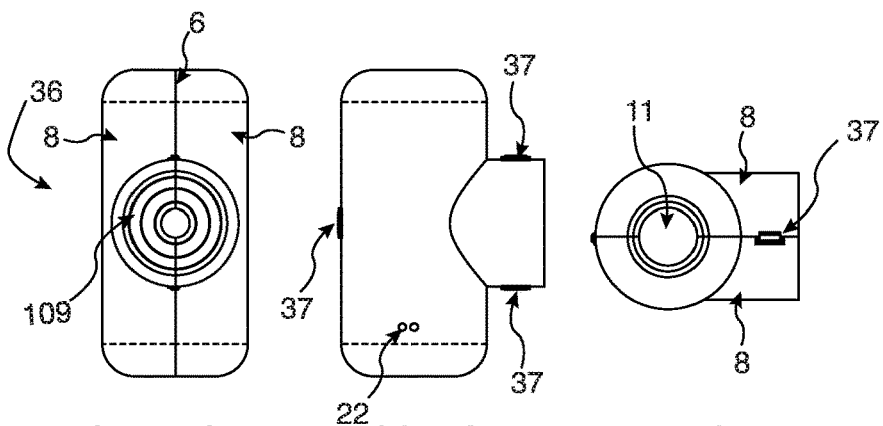
front-view  side-view  top-view
FIG. 8C
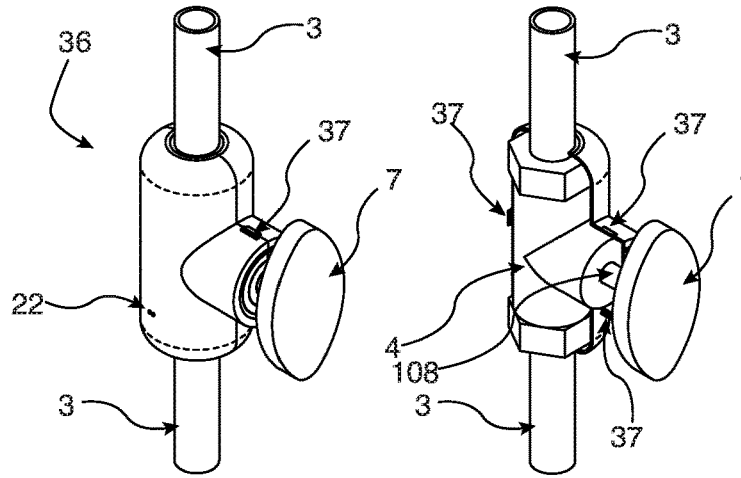
FIG. 8D  FIG. 8E
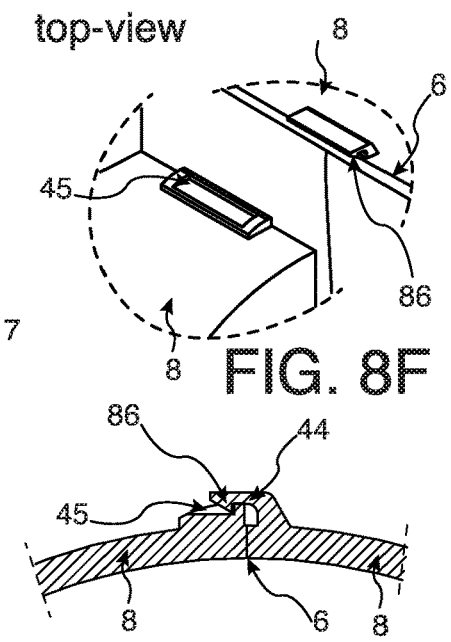
FIG. 8F
FIG. 8G

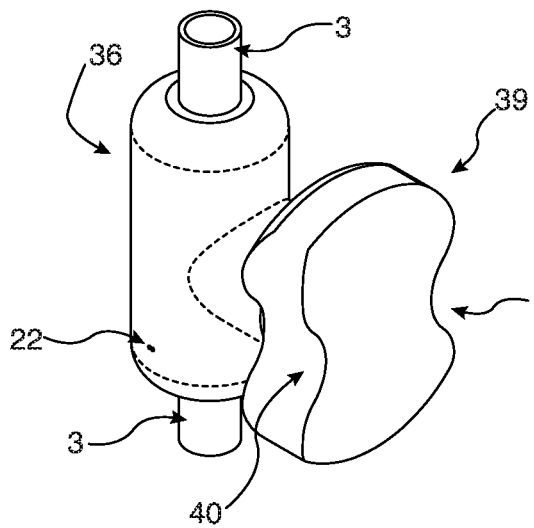
FIG. 9A
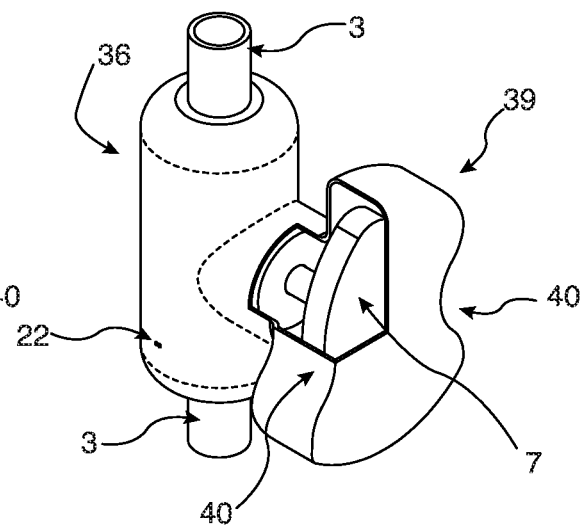
FIG. 9B
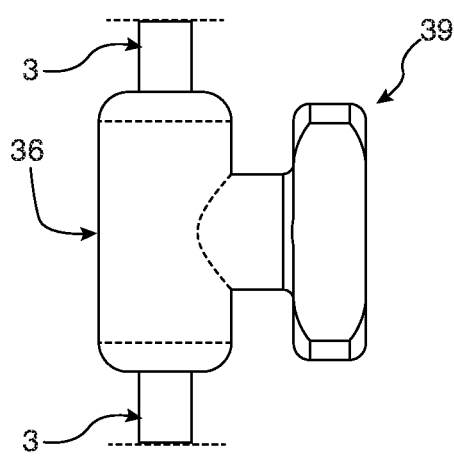
side-view
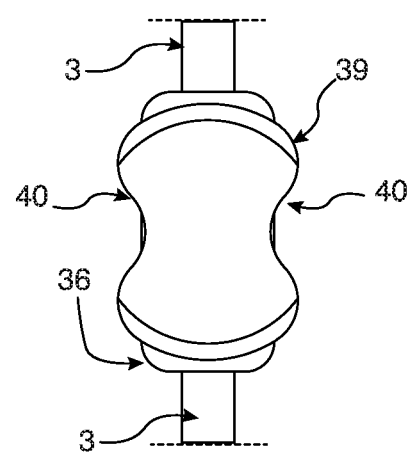
front-view
FIG. 9C

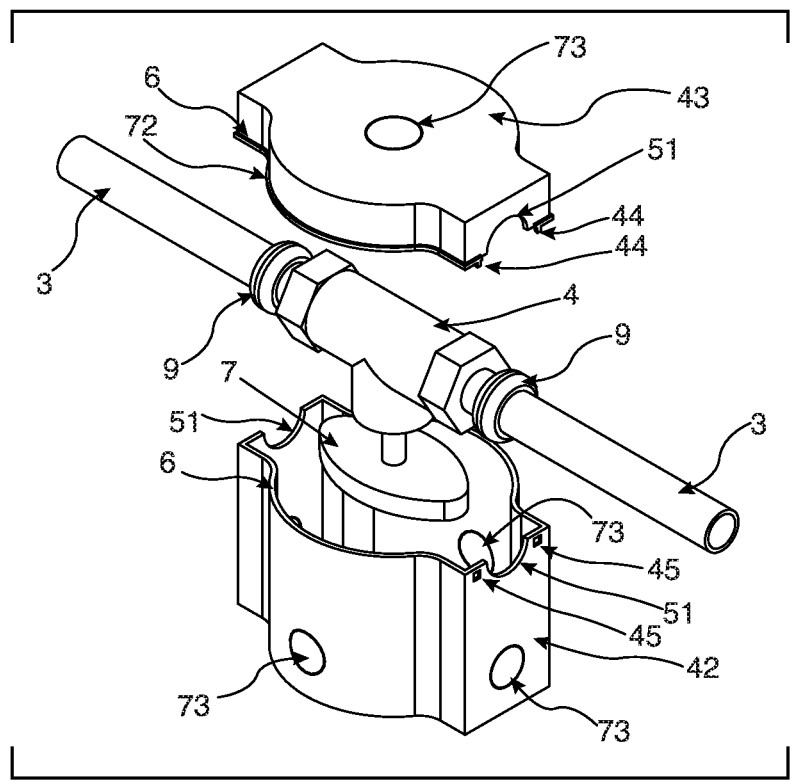
FIG. 10A
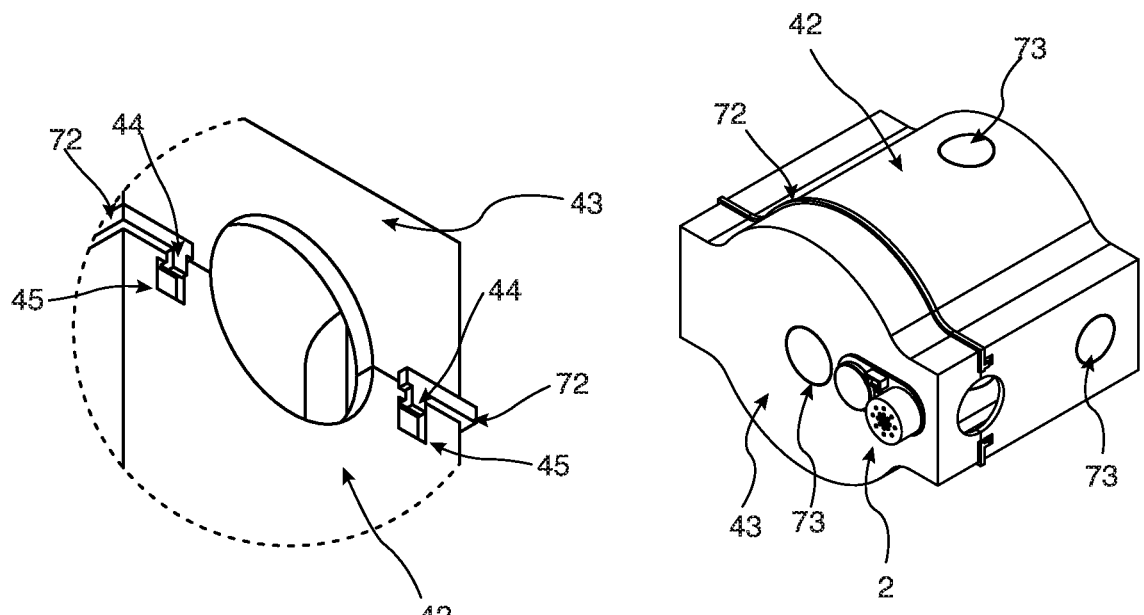
FIG. 10B
FIG. 10C

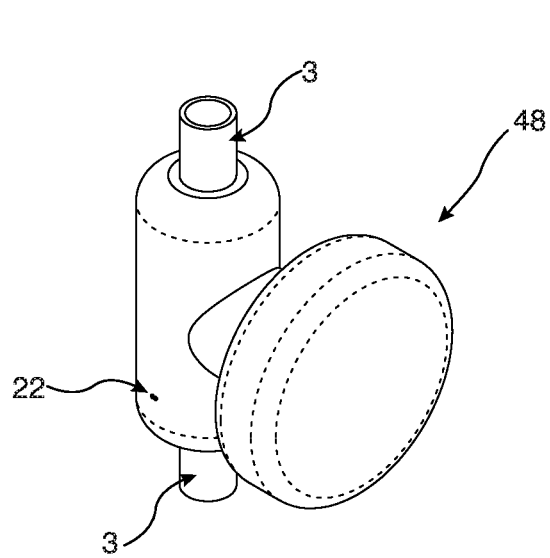
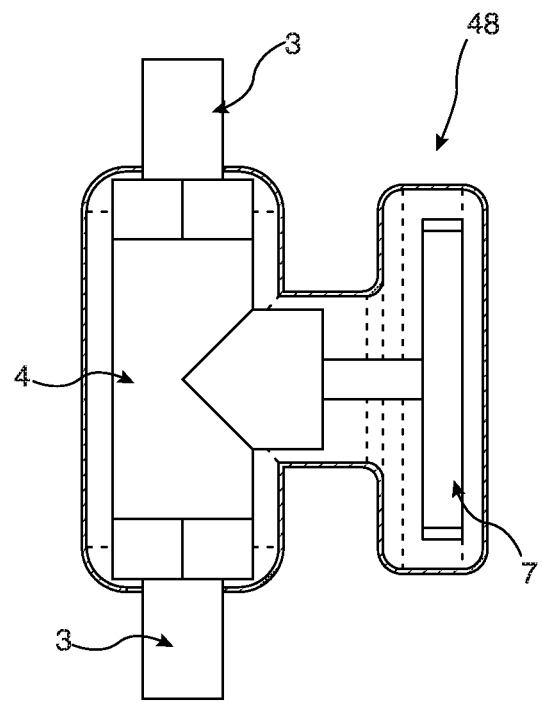
FIG. 13A    FIG. 13B
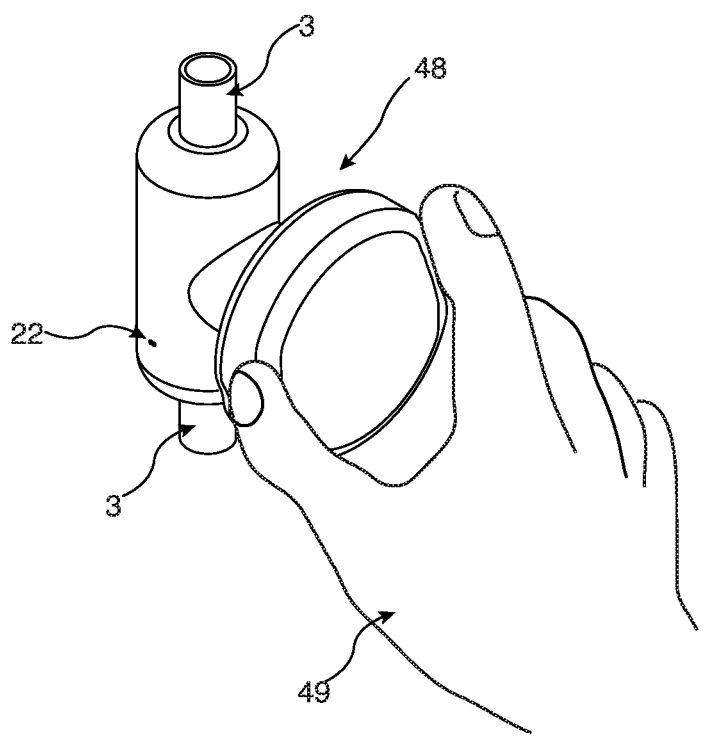
FIG. 13C

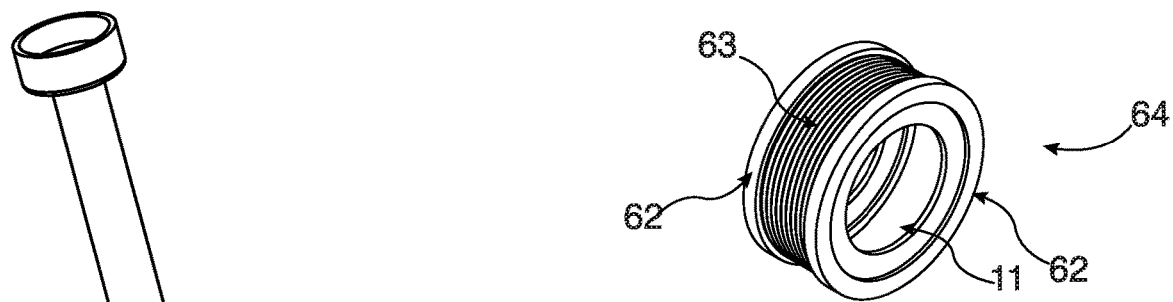
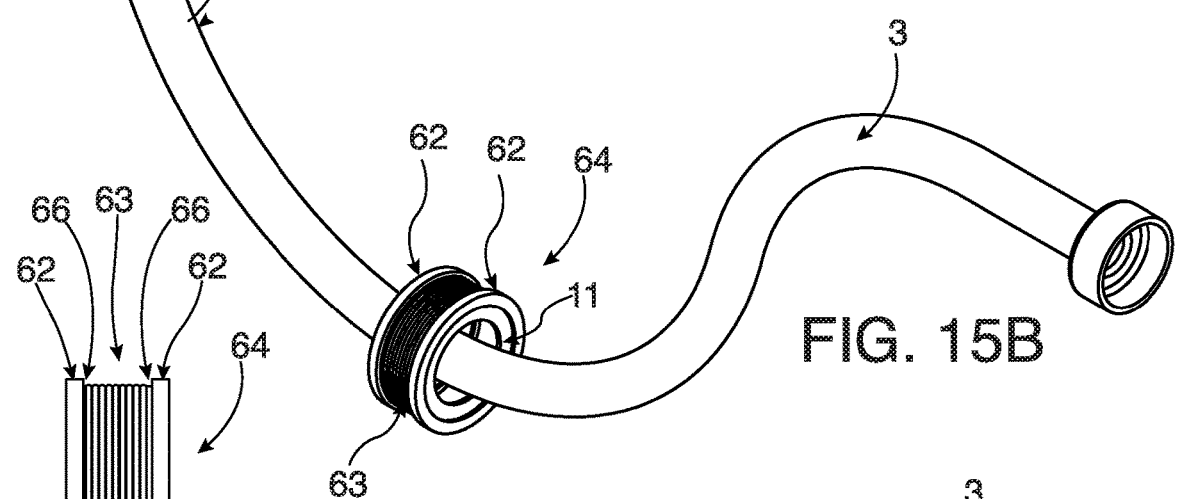
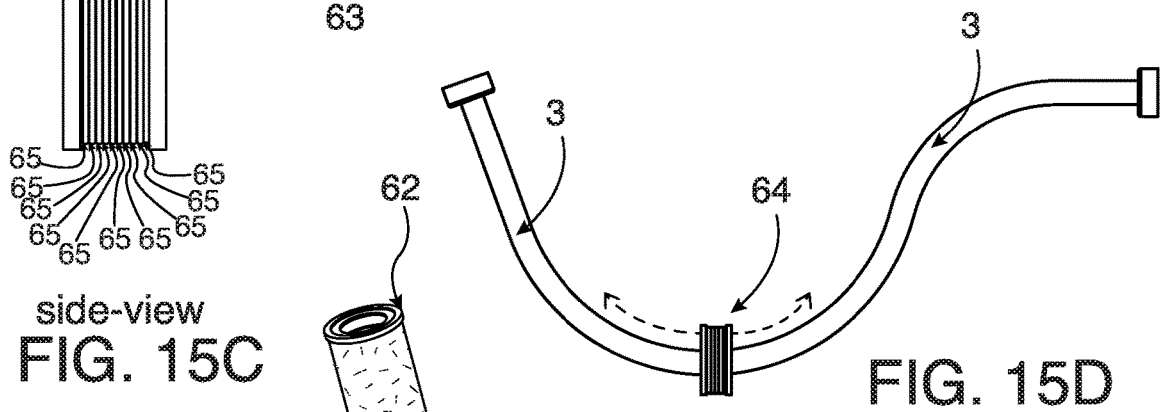
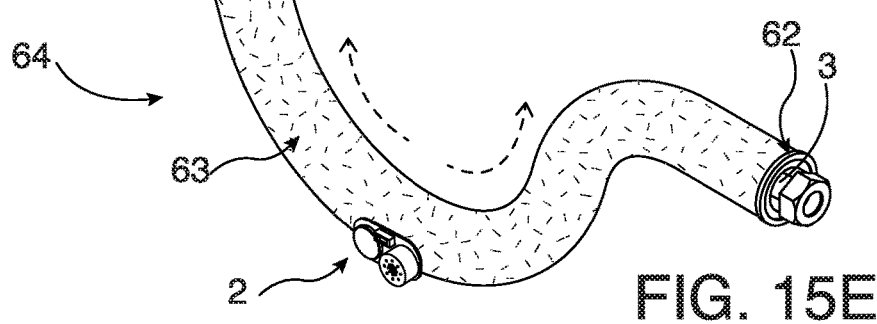

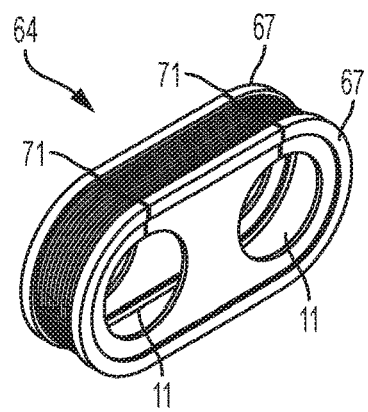
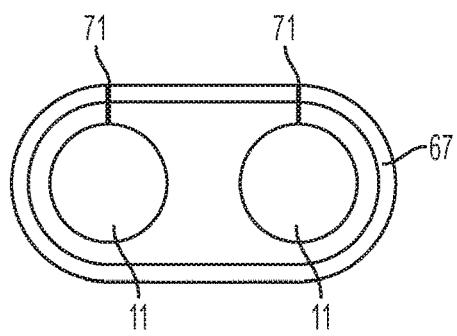
FIG. 16A  FIG. 16B
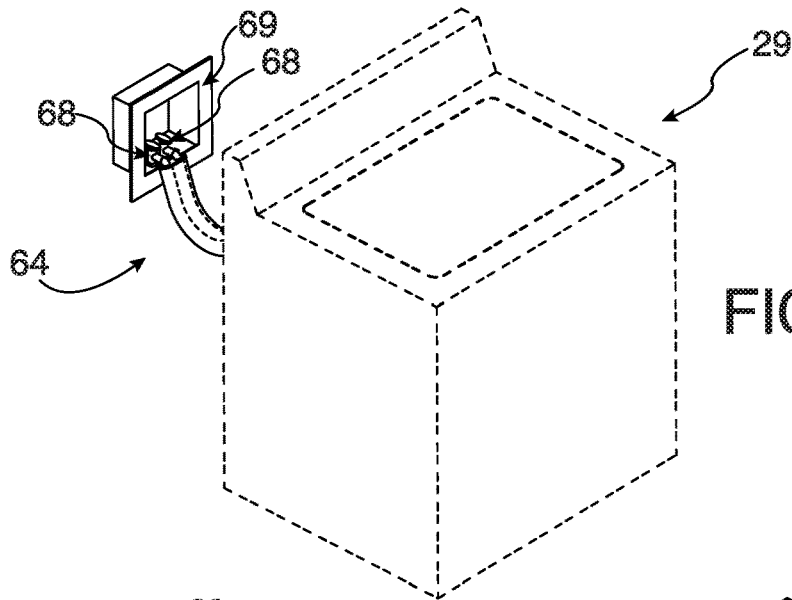
FIG. 16C
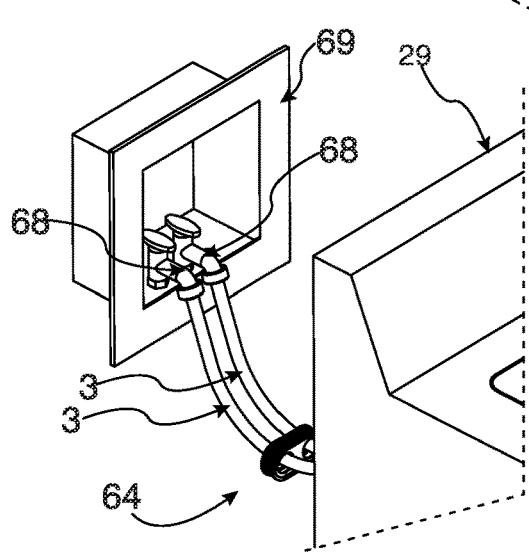
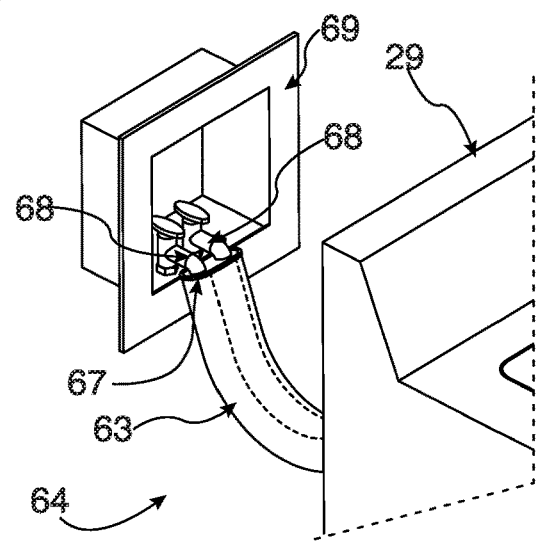
FIG. 16D  FIG. 16E

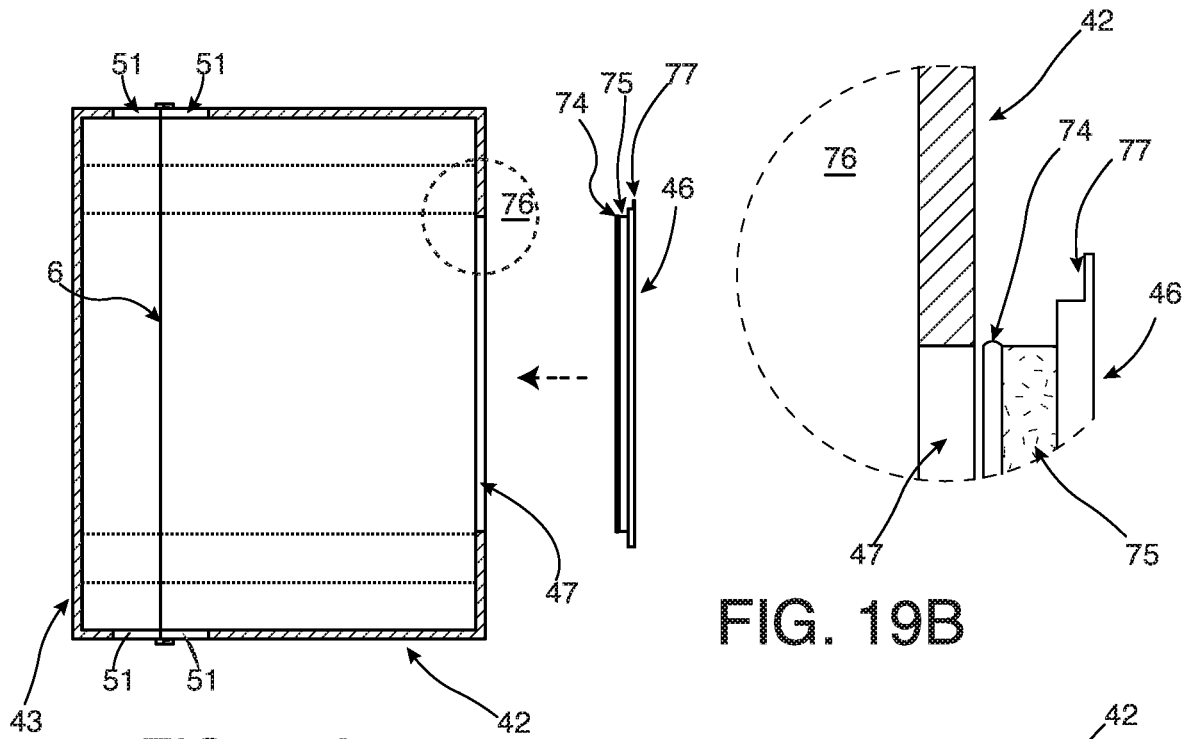
FIG. 19A
FIG. 19B
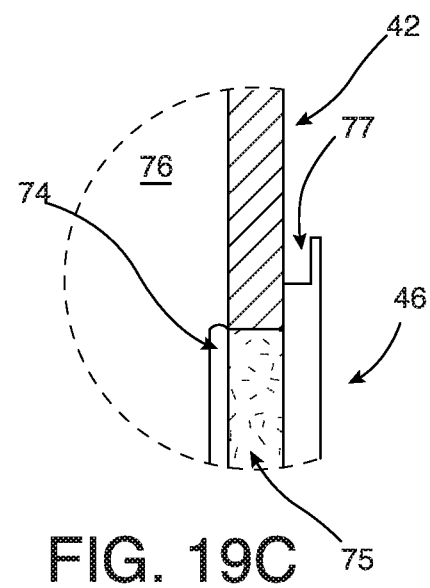
FIG. 19C
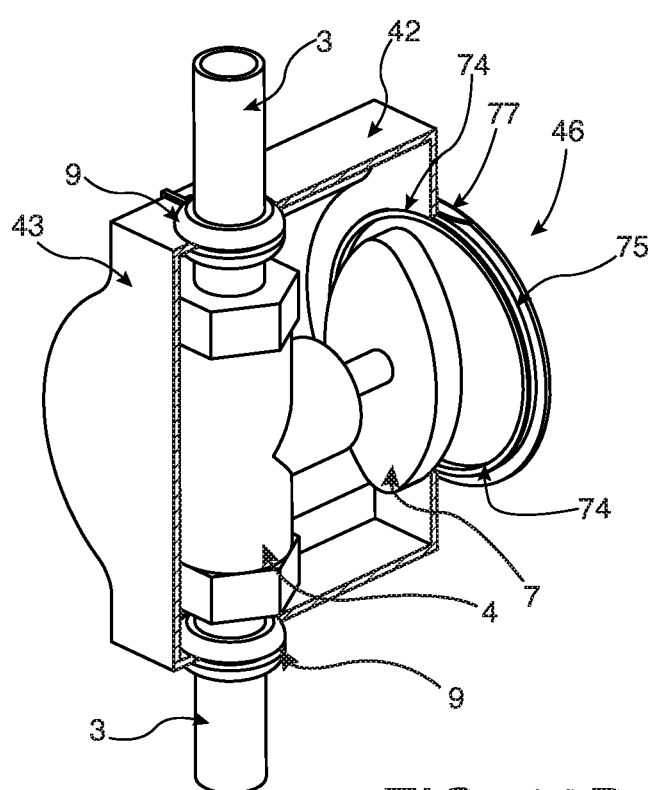
FIG. 19D

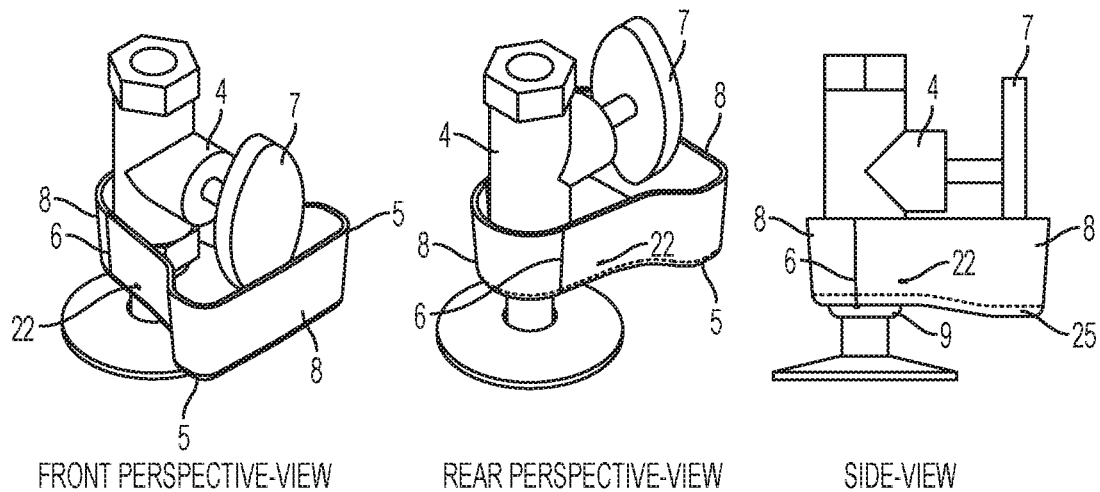
FRONT PERSPECTIVE-VIEW    REAR PERSPECTIVE-VIEW    SIDE-VIEW
FIG. 26A
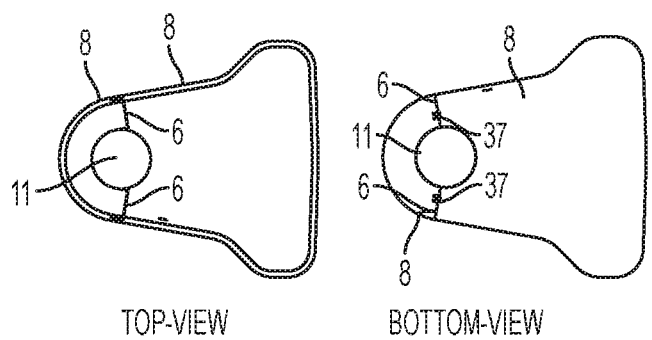 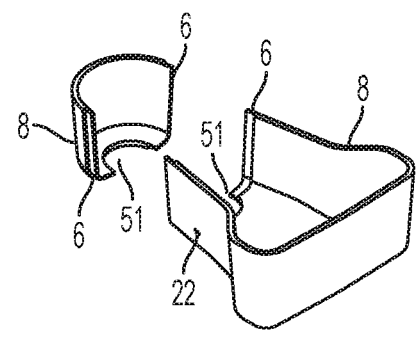
TOP-VIEW    BOTTOM-VIEW
FIG. 26B          FIG. 26C
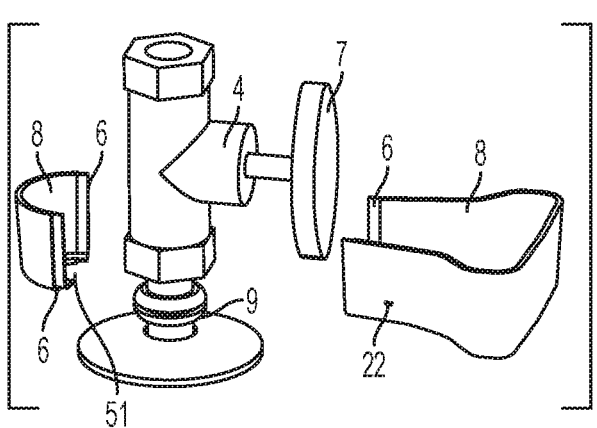 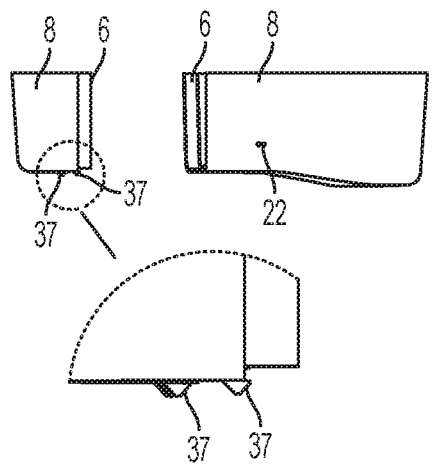
FIG. 26D          FIG. 26E

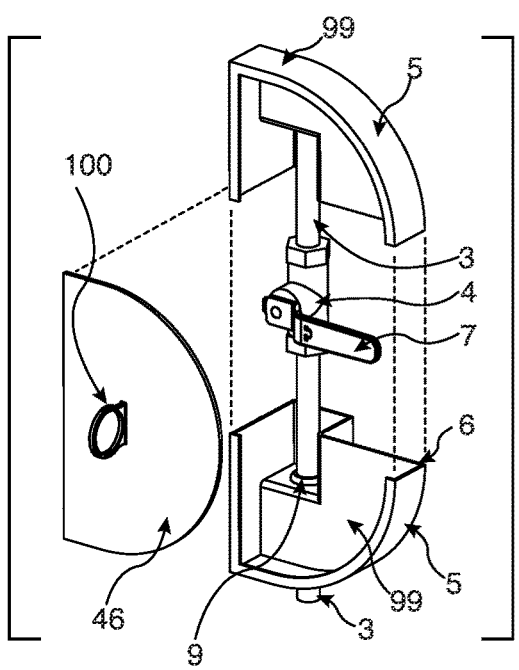
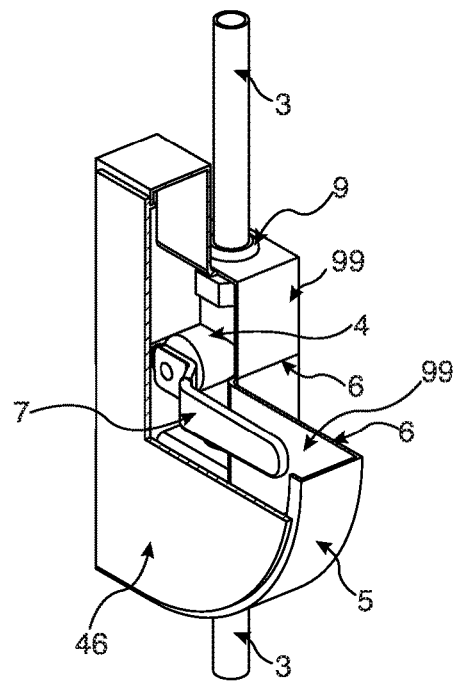
FIG. 28A
FIG. 28B
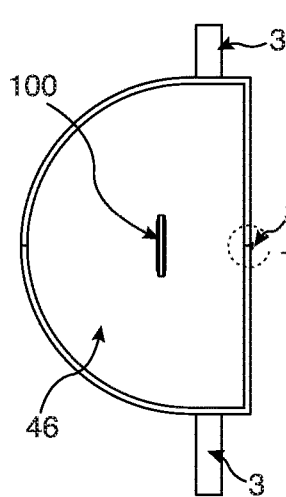
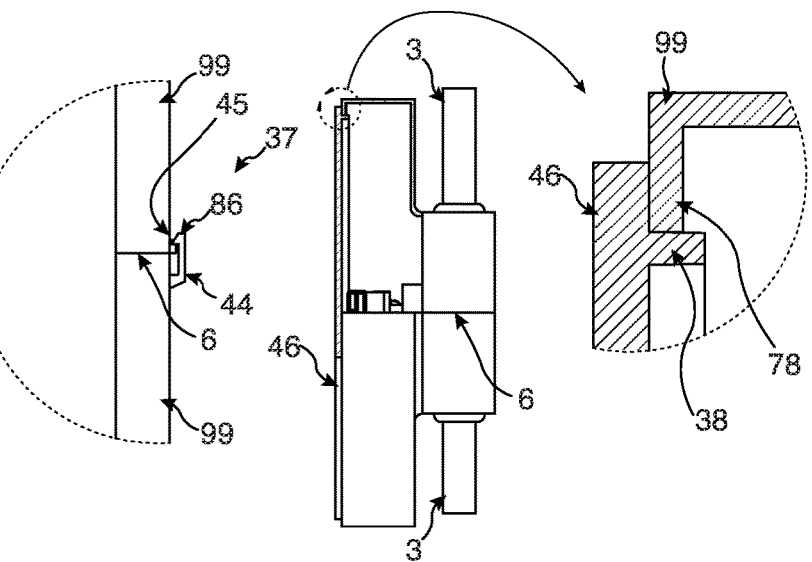
FIG. 28C
FIG. 28D

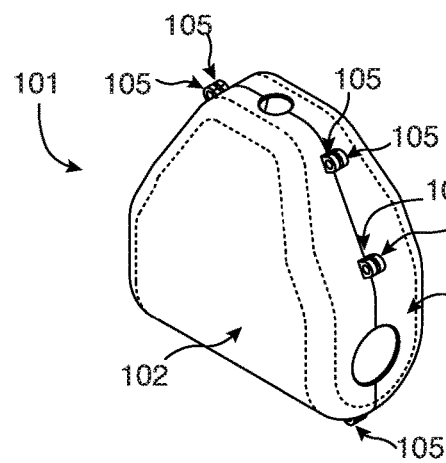
FIG. 30A
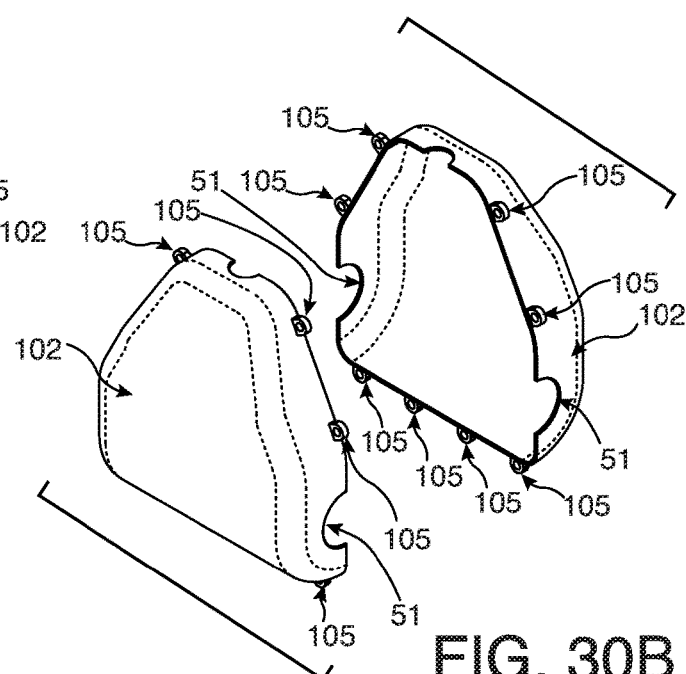
FIG. 30B
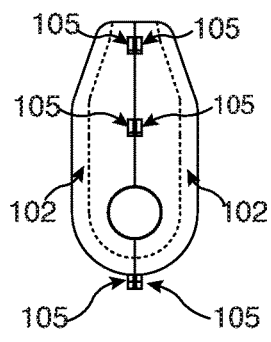
side view
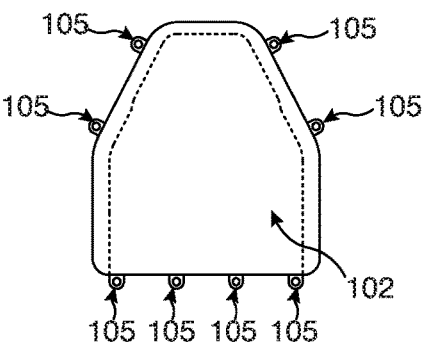
front view
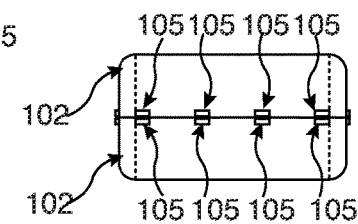
bottom view
FIG. 30C
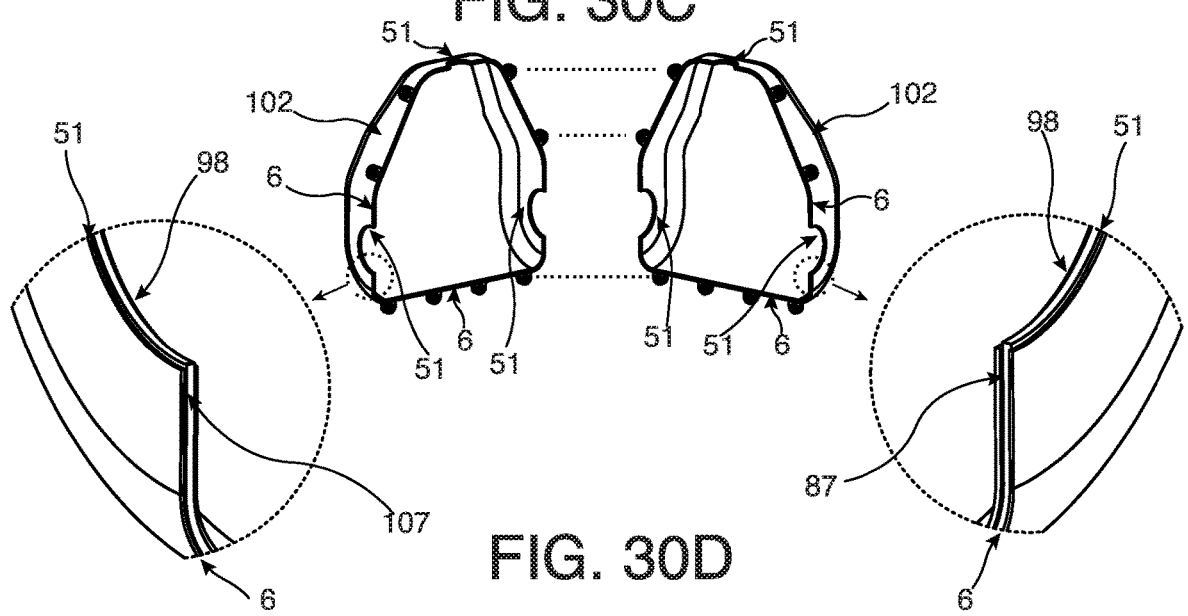
FIG. 30D

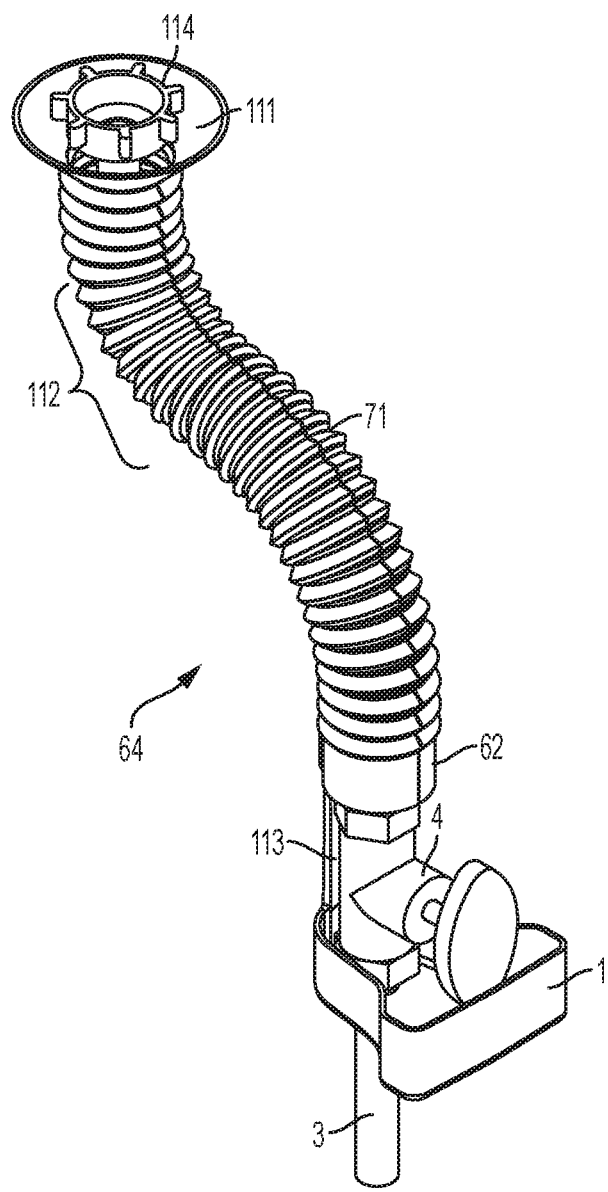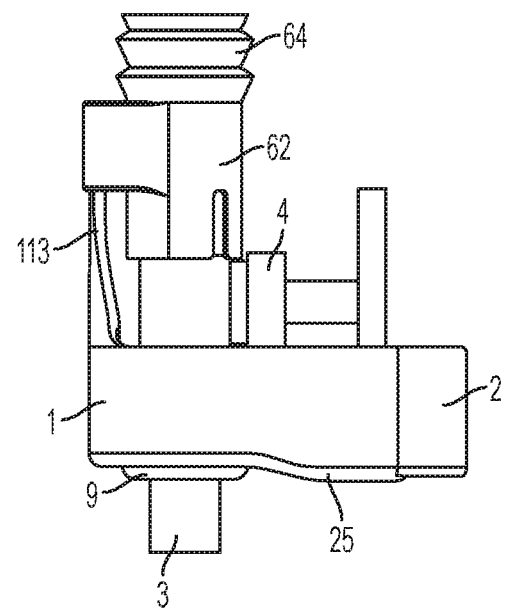
FIG. 31C
FIG. 31D

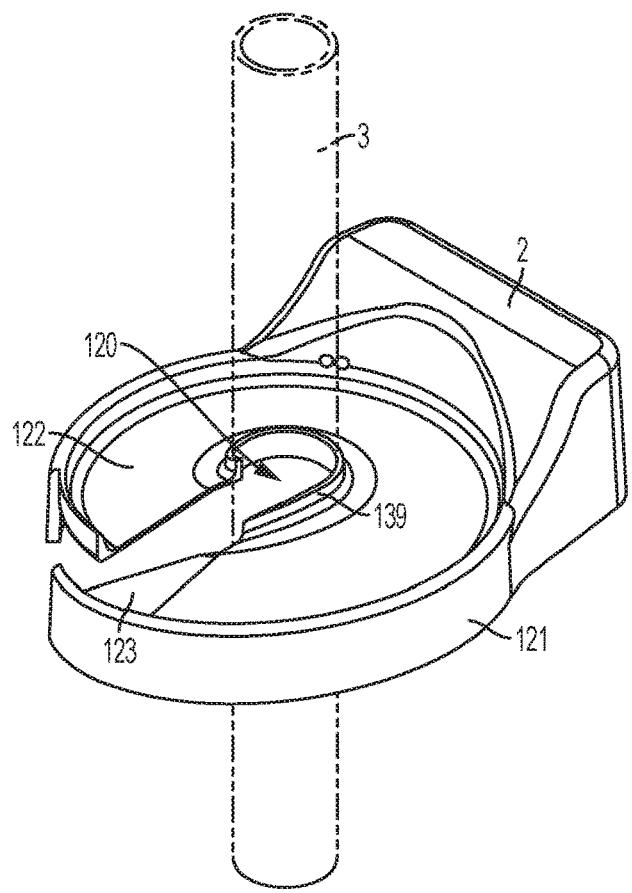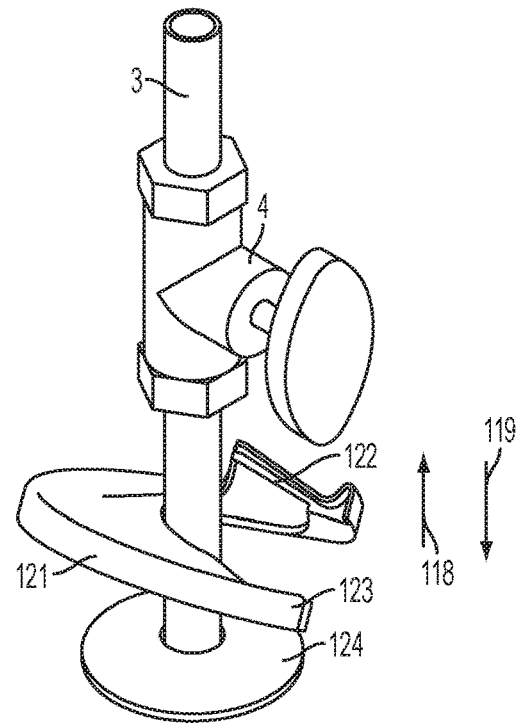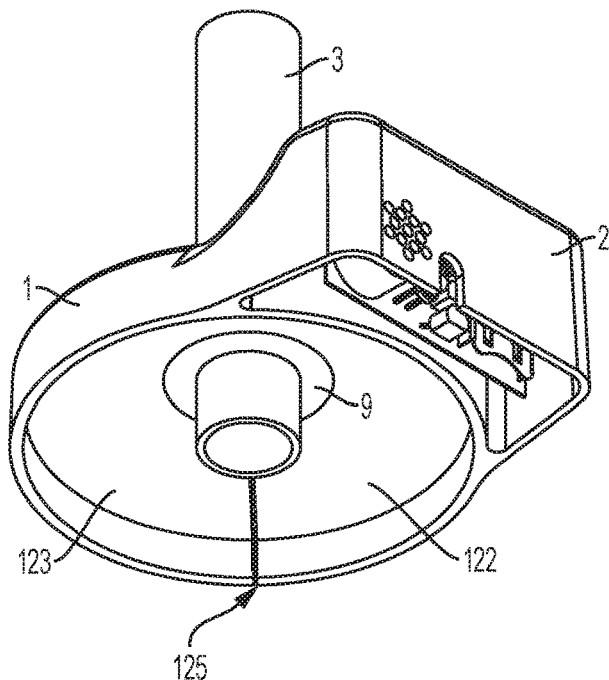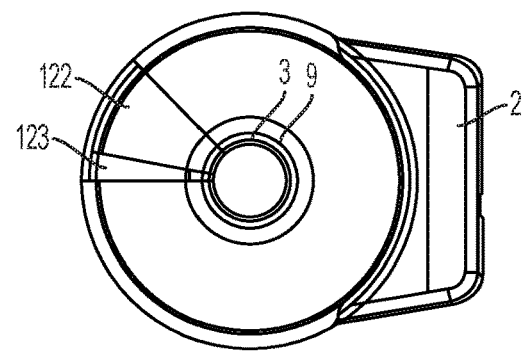
FIG. 33A
FIG. 33B
FIG. 33C
FIG. 33D

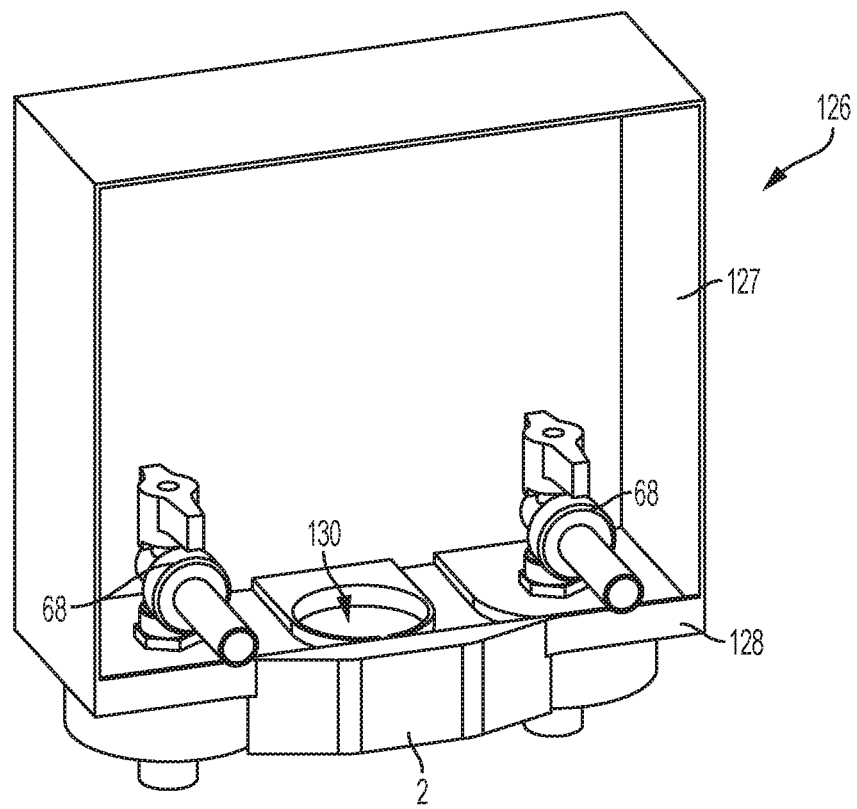
FIG. 34A
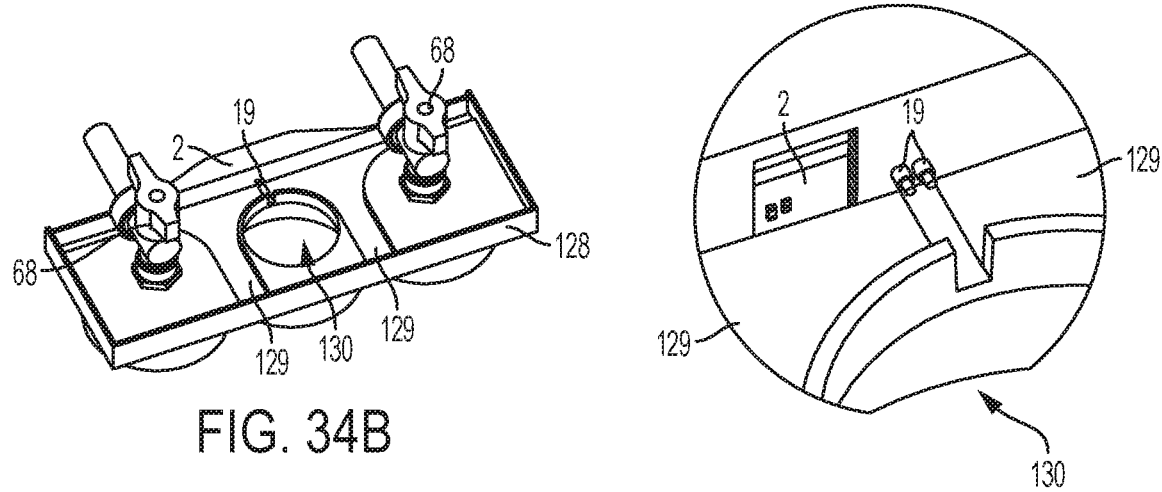
FIG. 34B
FIG. 34C

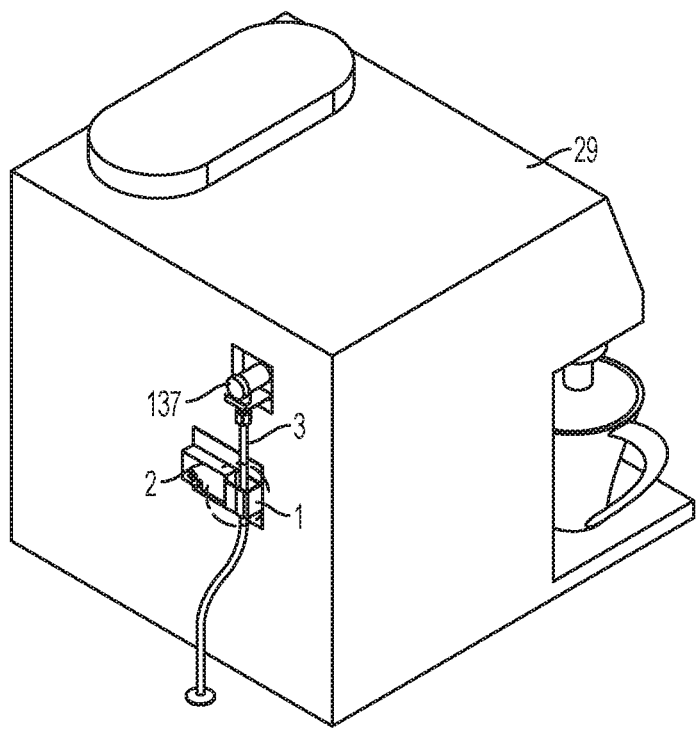
FIG. 37A
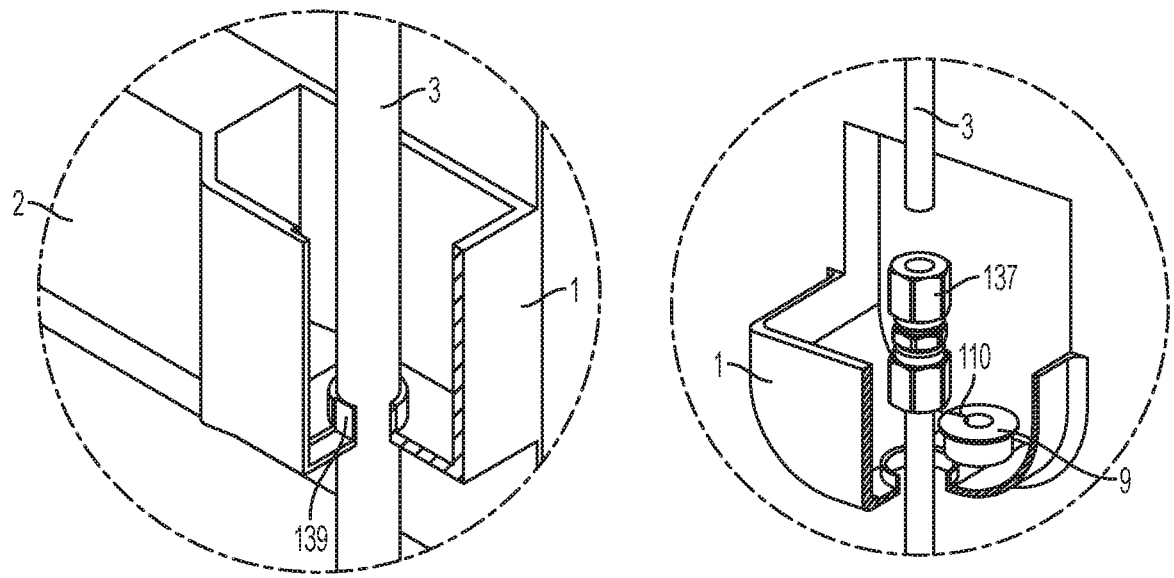
FIG. 37B
FIG. 37C

FLUID LEAK DETECTION METHODS, SYSTEMS AND APPARATUS

CROSS REFERENCE TO RELATED APPLICATION

This application is a non-provisional patent application of, and claims the benefit to, U.S. Provisional Patent Application No. 62/138,878, filed Mar. 26, 2015 and titled "Piping System and Leak Detection Methods, Systems and Apparatus", the disclosure of which is hereby incorporated herein by reference in its entirety.

BACKGROUND OF THE INVENTION

Water is one of the leading causes of property damage in both commercial and residential properties—estimated to be in the billions of dollars annually. Water leaks can occur from a range of appliances and fixtures. The most common sources of these leaks include junctions and connections from water heaters, refrigerators, washing machines, dishwashers, toilets, and sinks.

Even though the valves, junctions, and line connections are visible for these appliances and areas, they are usually not reviewed or observed on a regular basis. Therefore, if a slow water leak occurs at any of these junctions or devices, framing, flooring, walls, and nearby items are usually significantly damaged before the leak is detected. Additionally, many of these situations will also develop mold, which requires additional steps of remediation and cost.

Water leak detection systems, also called water damage loss mitigation devices, are proactive systems that detect and notify when a water leak has occurred. These systems are ideal for use in apartment buildings, condominiums, rental properties, households, commercial buildings, and highly sensitive areas such as laboratories or computer rooms.

Water detection systems and devices can help prevent losses from slow leaks as well as more forceful types of water damage. Systems can be passive and/or active. A simple passive system will provide a leak alert to the area impacted while an active system can send an alarm to a central monitoring station and also stop water flow by activating a shutoff valve.

Fluid conduit system such as piping systems enable the delivery control of a fluid. Fluids include materials in liquid or gaseous form, or any material that that generally exhibit the characteristic readiness to flow, including finely divided solids. Fluid conduit systems such as piping systems can carry fluids from one location to another. Piping systems are usually made from materials that can sustain the weight, pressure, fluid momentum, and/or other forces exhibited by the properties and/or movement of a fluid.

Examples of a piping system include oil supply systems, gas supply systems, water supply systems, and sewage systems. In typical water supply systems or sewage systems, a system, or a network, of piping and plumbing fittings transport water or water-based aqueous materials from one location to another. In one aspect, piping and plumbing fittings, when connected properly enable the delivery of water, or aqueous materials from one location to another. Piping systems in general include, but are not limited to components such as pipes, hoses, valves, couplings, unions, outlets, joints, appliances, and pumps. Piping system components, when fitted together, have an opening through which a fluid can flow through the piping system from one location to another. Commonly found examples of piping and plumbing fittings include, pipes or hoses, valves, faucets, water-related fixtures, and other plumbing fittings which may be found in a typical household, or the more complex system of pipes or hoses which may be found in large commercial buildings.

Piping system components are typically made of materials such as steel, like galvanized steel, copper, brass, silicone, rubber, and/or plastics, where an example of a plastic material is colloquially referred to as polyvinyl chloride (PVC). While typical system components are designed to enable movement of a fluid from one location to another, replacement, fixing, or otherwise repairing some or all sections of a piping system is an integral part of maintaining the movement of a fluid from one location to another. Because many of the components that make up the piping and plumbing fittings can fail over time, repair is integral to maintaining effective flow of fluids. Such failure of piping system components can occur because of, for example, corrosion, fatigue, impact, wear, buckling, fracture, and other causes of mechanical, temperature, biological, and chemical stresses, among other stresses.

Damage to a part or whole of a piping system, from normal wear and tear and/or sudden damage from use and misuse can also cause failure within a piping system, and lead to decreased flow of a fluid from one location to another. For instance, gaskets can fail leading to leak of fluids in various piping systems. In one example, certain valves further comprise gaskets and/or seals that mitigate the unwanted flow of a fluid from flowing through or flowing out of a piping system. Failure of these gaskets and/or seals can lead to unwanted flow of a fluid, thus resulting in a slow leak.

A possible result of failure from a part or sum of parts of a piping system is a leak. In a typical piping system, component failure can result in a leak. In the case of a typical water supply system or sewage system, a leak can cause inefficient transfer of water from one location to another. The resulting water or aqueous substance that escapes a water supply system or sewage system is then typically found on the exterior of piping and plumbing fittings associated with the water supply system or sewage system. Slow leaks are characterized by relatively slower escape of a fluid from a piping system than fast leaks. Slow leaks can be further characterized by a gradual, consistent or inconsistent, flow of a fluid on the exterior of piping and plumbing fittings.

Insurance claims related to water damage are the second most frequently filed claims in the United States, accounting for approximately 23% of all homeowner property losses over the course of 5 years. According to the Insurance Services Office, between 2008 and 2012, the average cost of a water damage claim was $7,195 per claim, with an estimated loss of $11 billion annually in the U.S. alone. In 2012, the frequency of water-damage and freezing claims accounted for 1.79 claims per 100 house years (policies). Furthermore, according to the ACE Private Risk Services study (published by ACE Group, Apr. 4, 2011), up to 93% of the cost of water damage could have been prevented or minimized if an automatic water leak detection and shut-off system has been present at home.

Common sources of leaks related to piping systems, and specifically in water supply system or sewage systems, are related to junctions, which can include connections, hoses, pipes, fittings, and/or valves and junctions with washing machines, refrigerators, icemakers, water heaters, water mains, dishwashers, restaurant equipment, toilets, sinks, and industrial distribution applications. To prevent such leaks, it is advised that persons regularly inspect these piping systems and related components, and replace any of such systems or components on a regular basis or when damage or leaks are detected. However, it is not always the case that inspections and replacements are performed regularly, and the problem of potentially damaging sources of leaks is thus still present. Problems related to such water leaks include slow leaks that can cause significant damage to framing, flooring, walls, and other nearby property before the leak is detected. In some cases, a piping system may be hidden or out of view, and leaks may occur without a person's knowledge, potentially leading to substantial damage to property before the leak is detected. Additionally, there is a risk for mold development and other unwanted biological growth, which often requires additional steps of remediation and cost.

Leaks, and particularly slow leaks are typically not avoidable. The materials that comprise piping systems are susceptible to damage and wear over the course of time. Various sources of stress can exist for a piping system, and the sources of stress can create a leak in which the liquid substance flowing through said piping system could escape. A common source of leaks is at and near fittings. Typical fittings join two pieces of pipe or hoses together. However, stress on a fitting can weaken seals and regions associated with such joining, and result in a leak of a liquid substance. Another common example of a source of leaks is at and near valves. In certain cases, the moving elements of valves can weaken or become damaged from stress. In one example, some valves have elastomers that prevent the flow of unwanted fluid flow through the components of the valve. In these cases, the elastomers can break, corrode, or may not properly fit, leading to a leak. However, it is known to persons having skill in the art that the source of leaks and slow leaks are not limited to these examples and locations related to a piping system.

Japanese Patent No. JP10292893A (Ohigata, 1997) discloses a doughnut-shaped pan with a detector that may attach to the exterior of a pipe. The doughnut shaped pan is fitted to the outer circumference of a distribution pipe, and condensation along the exterior of a distribution pipe is detected. However, there are number of shortcomings related to attachment of such detector to a pipe. For example, junctions and valves of piping systems are a common source of slow leaks. Therefore, there is a need for a detector that specifically enables detection of leaks from other areas of piping systems, including detection from areas of piping systems that are prone to leaks, such as leaks located at connection points like fittings, junctions and/or the valves.

In addition, many common types of fittings and valves change the direction of flow of a liquid substance, which can also induce a change in flow rate, or pressure, which can be associated with an increased rate of failure. For instance, a number of different types of fittings, commonly used in plumbing, include elbows, couplings, crosses, caps, and tees. These fittings can have a size and/or shape different from those of a pipe in their proximity. Valves can have irregular shapes and sizes. Fittings and valves can also have an irregular form. One of the problems with JP10292893A (Ohigata, 1997) is that it cannot be attached to fittings and valves to detect leaks.

When slow leaks are not repaired quickly, water or aqueous substances escaping the piping and plumbing fittings can cause substantial damage. Because of the slower rate of escape, slow leaks are not detected easily, and thus can cause substantial damage prior to detection. Problems associated with a slow leak can range from economic loss due to unnecessary consumption of the fluid escaping through a slow leak, or damage to building structures or foundations. Furthermore, insurance companies specializing in property insurance may have specific guidelines for covering certain types of risks to property. In some instances, a given insurance policy does not protect a payer from certain types of damage. In many cases, a higher, thus more expensive insurance premium must be paid to ensure protection against potential damage caused by leaks relating to piping system, and particularly for slow leaks. Therefore, there is a need for an early detection of a leak, particularly for slow leaks as to prevent further damage that can be derived from such slow leak.

U.S. Pat. No. 5,343,191 (McAtamney, 1993, incorporated by reference in its entirety) discloses a leak detection system installed on a pipeline system. An outer compartment encompasses a piping system and detects leaks from the pipeline system in the interstitial space. Various sensors placed along the outer compartment are disclosed. However, this leak detector system requires that the outer compartment be installed while installing a piping system, or while modifying a piping system. These requirements make installation of such leak detectors costly and labor intensive. Further, a number of leak sensors may be placed across the outer compartment, and because the outer compartment is interconnected, it may become difficult to discern specific regions of the piping system as a source of a leak. Additionally, U.S. Pat. No. 5,343,191 (McAtamney, 1993) is designed for both underground and above-ground installations. However, any mechanical problems, hydraulic problems, structural problems, electrical problems, leakage, or other problems to a piping system and/or the leak detector disclosed in McAtamney, 1993 requires that part or a whole of the piping system and/or the leak detector be disassembled, fixed, re-assembled. Therefore, there is a need for a retrofit leak detection means that fits on existing piping systems, and further, specifically target the detection of leaks from problematic components of a piping system, including but not limited to junctions, valves, joints, and fittings. Additionally, there is a need for a leak detection means that is modular, and that can be installed more simply, quickly, and efficiently on a number of different piping system applications.

Many water detection products exist today to identify water once it is on the ground or after the water has caused significant damage. These devices primarily consist of contact based cable-type or rope-type devices, contact based sensors, and cylinders/towers. Examples of such existing products include the Leak Alert™ Water Detector by Zircon Corp, and the Water Defense Water Alarm by Honeywell, Inc. These types of designs rely on water moving across a floor or flat surface, and then, if the device is placed correctly, the potential exists for the water to come into contact and be detected with the probe, sensor, or other types units. If water contact occurs, these types of devices then trigger an audible alarm. However, there are a number of limitations with these types of prior art detectors. For instance, it is sometimes difficult to predict where to place an existing water detection product, and an incorrect prediction of placement can greatly affect whether or not these detectors will detect a leak and how soon such that much damage may be done prior to detection. For instance, these existing products rely on water moving towards and contacting the sensor portion these products. If a floor is uneven, not level, or there are obstructions that affect the flow of a fluid, such fluid may not reach a prior art water-detection product. The path of the pipe can allow the leak to flow into floors, walls, ceilings, and other environments, etc. away from the device, and therefore, be undetected by the alarm device or user.

Thus, significant damage from the leak occurs over time, usually without detection from these types of devices. Additionally, these designs rely on water being leaked on a surface in significant quantities before an alarm is generated. In some cases, these devices or portions of these devices are spatially bulky and may not fit in certain environments. In a related sense, the design of these devices or portions of these devices are, subjectively speaking, not aesthetically pleasing, and may further lead to low adoption rates. Therefore, there is a need for a form fitting, inconspicuous and/or aesthetically pleasing detector for leaks that may lead to greater adoption, and hence, decreased costs associated with water damage.

SUMMARY

Embodiments of the present invention disclosed herein relate to leak detection from fluid conduit systems such as piping systems. In one aspect, embodiments relate to leak detection of water supply, sewage system, and plumbing. In another aspect, embodiments of the invention comprise an apparatus related to piping and plumbing encapsulation for detecting leaks. In another aspect, certain embodiments of the invention further comprises an apparatus that conform to piping and plumbing features, for example, valves and connectors, for detecting leaks.

Embodiments of the present invention automatically identify different levels of water leaks occurring from various types of business, industrial, and household water applications including junctions, connections, couplings, valves, hoses, appliances, and water heaters. These devices are unique in that they mitigate the water leak and notify the user of an issue prior to the water contacting the surrounding environments and causing damage. According to certain embodiments, slow leaks are detected quickly. The water leaks are contained in a storage container tank, sleeve, or tub, which prevents water damage to the surrounding areas such as framing, flooring, walls and other nearby items or structure. Embodiments of the present invention can be used in retrofitting or in new piping system builds and installations and can be built directly into various appliances, fixtures, valves, pumps and the like. Embodiments where a new build is desired comprise a one-piece unit that can be installed during new valve/junction installation. Embodiments where retrofitting is desired comprise one or more pieces that can be installed on or adjacent to any existing junction, connection, valve, etc.

According to certain embodiments of the present invention, detection of a fluid leak to mitigate damage resulting from an undetected leak comprises installing a leak detection device, detecting a leak using said leak detection device, triggering an alarm after detection of a leak, generating a notification to alert a user of said leak, whereby damage is mitigated by the early detection of said leak. Detection of the leak before it reaches surrounding structures such as walls, floors and the like is important to mitigating damage. Such early detection could result in substantial savings to homeowners and insurers. For example, a homeowner could install the water detection device at his or her home, the homeowner could inform an insurer about the use of the water detection device, and the water detection device would alarm once a slow leak is detected, whereby the damage caused by water damages is mitigated by the early detection of the slow leak.

Certain embodiments have an open configuration that can be used on vertical water valves. These embodiments can be used on vertical valves and junctions in common bathroom, kitchen, sink, and toilet applications. The present invention can catch a small leak from any aspect of the vertical valve (e.g. compression fitting, valve stem seal, water line junction, and valve stem junction, etc.) and can present an alarm to the user. Additionally, these embodiments will catch leaks from any upward junctions/connections, where the connection leak follows the direction of the pipe and flows into the storage container unit.

Certain embodiments have an enclosed configuration and valve access. These embodiments can be used on horizontal or vertical valves and junctions common in, but not limited to bathroom, kitchen, sink, toilet various other appliances and industrial applications including gas leaks. The present embodiments can catch a small leak from any aspect of the horizontal or vertical valve (e.g. compression fitting, valve stem seal, water line junction, and valve stem junction, etc.), and can present an alarm to the user. These embodiments will catch leaks from any upward junctions/connections, where the connection leak follows the direction of the pipe and flows into the storage unit. Additionally, this configuration has various types of openings that allow the user to have access to the valve via removal of a panel, door, or seal.

Other embodiments have an enclosed configuration with a sleeve junction. These embodiments can be used on horizontal or vertical valves and junctions common in, but not limited to bathroom, kitchen, sink, toilet, and various other appliances and industrial applications. The present invention can catch a small leak from any aspect of the horizontal or vertical valve (e.g. compression fitting, valve stem seal, water line junction, and valve stem junction, etc.), and can present an alarm to the user. These embodiments can comprise a sleeve that connects between the top of the storage unit and the top-most line junction above the storage unit. This ensures that all leaks from any above junctions will follow the path of the sleeve and flow into the storage tank. Additionally, these embodiments have various types of openings that allow the user to have access to the valve via removal of a panel, door, or seal.

Certain embodiments have an open configuration and can used on horizontal valves and junctions common in, but not limited to, bathroom, kitchen, sink, and toilet applications. The present invention can catch a small leak from any aspect of the horizontal valve (e.g. compression fitting, valve stem seal, water line junction, and valve stem junction, etc.), and can present an alarm to the user. Additionally, these embodiments will catch leaks from any upward junctions/connections, where the connection leak follows the direction of the pipe and flows into the storage unit.

Other embodiments have an open design that can be used with washing machines. These embodiments can be used on horizontal hose junctions on washing machines and water valve connections. The open configuration will affix to the existing horizontal hose connection(s), catch a small leak from any aspect of the horizontal junction (e.g. water line inlet and Water hose connection), and can present an alarm to the user. Embodiments can function on a single hose connection or double hose connection (hot/cold).

Certain embodiments have an enclosed configuration with valve access. These embodiments can be used on horizontal hose junctions on washing machines and water valve connections. The enclosed design will affix to the existing horizontal hose connection(s), catch a small leak from any aspect of the horizontal junction (e.g. water line inlet and water hose connection), and can present an alarm to the user. Embodiments can function on a single or double hose connection (hot/cold). Certain embodiments can encapsulate the entire junction/connection of single or double hose while still allowing the user access to the hose junctions for inspection, removal, and new installation. Certain embodiments include a single unit with multiple sleeves to encapsulate multiple hoses in one unit. Certain embodiments have an enclosed configuration with sleeve junction. These embodiments can be placed on horizontal hose junctions on washing machines and water valve connections. Certain embodiments comprise an encompassing sleeve, which is a flexible, expandable sleeve that has rubber junction encasements at each end of the sleeve. In yet another embodiment, a configuration fits around multiple valves such as in an automatic washer appliance such that leaks from both the hot and cold on/off valves are caught at the source and a notification such as an alarm can alert a user. The leak point could be from a number of potential sources such as the valve to hose junction or the crimp that connects the hose.

Other embodiments comprise an encompassing sleeve that connects to enclosed storage units. Both of these enclosed embodiments ensure the washing machine hose and related junctions/connections are fully enclosed. Using this approach, any type of leak from any aspect of the hose will be collected in the storage tanks or sleeve and an alarm will sound accordingly. Embodiments can function on a single or double hose connection (hot/cold). These embodiments encapsulate the entire junction/connection of single or double hose while still allowing the user access to the hose junctions for inspection, removal, and new installation.

In yet another embodiment, the present invention can be used on horizontal and vertical water feed line junctions on refrigerators, freezers, and icemakers. In these embodiments, the enclosed storage unit configuration can catch and identify a small leak from any aspect of the horizontal or vertical connection including the water connection joint and point of entry into the appliance.

Certain embodiments have an enclosed design with sleeve junction. These embodiments can be used on horizontal and vertical valves, junctions, and connections that are common on most refrigerators, freezers, and icemakers. The present invention can catch and identify a small leak from any aspect of the horizontal or vertical connection including the water connection joint and point of entry into the appliance. These embodiments also comprise a sleeve that connects between the top of the storage unit and the top-most connection point above the storage unit. This ensures that all leaks from any above junctions will follow the path of the sleeve and flow into the storage tank.

In yet another embodiment, the present invention can be used on vertical valves and junctions that are commonly used above most water heaters. The present invention can catch a small leak from any aspect of the vertical valve (e.g. compression fitting, valve stem seal, water line junction, and valve stem junction), and can present an alarm to the user. Additionally, these embodiments can catch leaks from any upward junctions/connections, where the connection leak follows the direction of the pipe and flows into the storage unit.

Other embodiments have an enclosed configuration with valve access and can be used on vertical valves and junctions that are commonly utilized above most water heaters. The present invention can catch a small leak from any aspect of the vertical valve (e.g. compression fitting, valve stem seal, water line junction, and valve stem junction), and can present an alarm to the user. This design will catch leaks from any upward junctions/connections, where the connection leak follows the direction of the pipe and flows into the storage unit. Additionally, these embodiments have various types of openings that allow the user to have access to the valve via removal of a panel, door, or seal.

Certain embodiments have an enclosed design with a sleeve junction and can be used on vertical valves and junctions that are commonly utilized above most water heaters. The present invention can catch a small leak from any aspect of the vertical valve (e.g. compression Fitting, Valve stem seal, water line junction, and valve stem junction), and present an alarm to the user. These embodiments comprise a sleeve that connects between the top of the storage unit and the top-most line junction above the storage unit. This ensures that all leaks from any above junctions will follow the path of the sleeve and flow into the storage tank. Additionally, these embodiments have various types of openings that allow the user to have access to the valve via removal of a panel, door, or seal.

In yet another embodiment, the present invention has an enclosed design with valve access can be used on vertical and/or horizontal valves and junctions that are commonly utilized for most dishwashers. The present invention can catch a small leak from any aspect of the valve (e.g. compression fitting, valve stem seal, water line junction, and valve stem junction), and can present an alarm to the user. This design will catch leaks from any upward junctions/connections, where the connection leak follows the direction of the pipe and flows into the storage unit. Additionally, these embodiments have various types of openings that allow the user to have access to the valve via removal of a panel, door, or seal.

Other embodiments have an enclosed design with sleeve junction. Dishwasher feed hoses, valves, and junctions can follow various upward or looping paths. Therefore, these embodiments use a combination of a sleeve and a unit having an enclosed configuration. The present invention can catch a small leak from any aspect of the dishwasher feed valve (e.g. compression fitting, valve stem seal, water line junction, and valve stem junction), and can present an alarm to the user. These embodiments also have a sleeve similar to embodiments used with washing machines, comprising a sleeve that is installed over the dishwasher feed line. This ensures that all leaks from any above junctions will follow the path of the sleeve and flow into the storage tank.

In yet another embodiment, the present invention can be used with water main valves and sprinkler system valves. As those skilled in the art can appreciate, the embodiments described above are not limited to the specific environment used in the examples above and certain embodiments are configured to work with other systems such as water main valves and sprinkler system valves. Moreover, as can be appreciated, the present invention can be used in numerous settings and benefit multiple industries and is not limited to leak detection in residential homes. Certain embodiments of the present invention are directed to commercial buildings. Other embodiments can be used in the oil and gas industry and water/sanitation, where similar systems, methods and apparatuses can be used to detect the slow leak of a fluid, whether the fluid is oil or water, or a combination of any material that can flow. For example, those in the oil and gas industry could install a leak detection device on the junctions of pipes, valves, pumps such that the leak detection device would alarm once a slow leak is detected, and action could be taken in response to the alarm, whereby the loss of oil resulting from a slow leak is mitigated. As those skilled in the art can appreciate, early detection of a slow leak in the oil and gas industry could also prevent damage caused by leaks, such as damage to the surrounding environment, or damage to the equipment. The leak detection device could also be built directly into or onto pipes, valves and pumps by a manufacturer.

In certain embodiments, the present invention comprises a system to determine the presence of a fluid leak to mitigate damage resulting from an undetected leak comprising a container adapted to hold fluid attached to a piping system, an alarm located within said container, said alarm comprising a sensor adapted to determine the presence of a fluid within said container, a device configured to receive said alarm, and notification interface to notify a user of said alarm.

Embodiments of the present invention comprise an alarm to notify the detection of a leak. The alarm can utilize various types of sensors, switches, and/or circuits to identify the presence of water within one of the storage tanks or sleeves. Once the switch has been tripped, an alarm will occur, which can be any singular or combination of; an audible alarm, visual alarm, scent alarm, and/or alarm via a wireless system. In one embodiment, the alarm system comprises an on-board alarm circuit and a remote alarm notification. The on-board alarm system can have a speaker that would sound once the alarm is triggered. The on-board alarm system comprises a power source, which can be battery or an AC power source. In certain embodiments, the circuit can be on-board a tank or sleeve. The circuit can be placed in various locations to maximize leak detection. In certain embodiments, the system further comprises a switch to turn off any alarm, a low-voltage/battery warning, a reset option or process, and a water sensor probe or float level switch. Certain embodiments comprise a monitoring system, which can be wired or wireless. Certain embodiments also can be monitored using applications, including portable electronic devices such as computer applications, web-based cloud notifications, or smart phone applications (e.g. Android, iOS, etc.). The system can be configured to avoid false alarms of leaks, such as condensation prematurely triggering the alarm. For example, the sensors can be positioned a small distance from the fluid capture area of the containment device to allow a pre-determined amount of condensation or fluid accumulation to occur without triggering the alarm.

BRIEF DESCRIPTION OF THE DRAWINGS

FIG. 1A. Perspective view of an open design vertical valve application embodiment for new plumbing installations.

FIG. 1B. Perspective view of an open design vertical valve application embodiment for existing plumbing installations.

FIG. 1C. Perspective view of an open design vertical valve application embodiment for existing plumbing installations, showing one container-half piece with respect to a cross-sectional view of a pipe and vertical valve.

FIG. 1D. Bottom view of a vertical valve application embodiment.

FIG. 3A. A schematic of a sensor unit embodiment.

FIG. 3B. Perspective view of the sensor unit in an embodiment.

FIG. 3C. Back perspective view of the sensor unit in an embodiment.

FIG. 3D. Front view of a sensor unit embodiment.

FIG. 3E. Embodiments of sensor probes.

FIG. 3F. Embodiments of sensor probes with a bridging material.

FIG. 8A. Perspective view of an enclosed container vertical valve application embodiment for existing plumbing installations.

FIG. 8B. Perspective view of a portion of an enclosed container vertical valve application container piece for retrofitting existing plumbing existing plumbing in an embodiment.

FIG. 8C. An enclosed container vertical valve application embodiment for installations on existing plumbing viewed in the front view, side view, and top views.

FIG. 8D. Perspective view of an enclosed container vertical valve application for retrofitting existing plumbing embodiment, shown with features of a piping system.

FIG. 8E. Perspective view of an enclosed container vertical valve application partial container piece for retrofitting existing plumbing embodiment, shown with features of a piping system.

FIG. 8F. Perspective close-up view of an embodiment of a fastening feature.

FIG. 8G. Cross-sectional view of an embodiment of a fastening feature.

FIG. 9A. Perspective view of a closed design vertical valve application with an operating handle container, shown with features of a piping system.

FIG. 9B. Perspective view of a closed design vertical valve application with an operating handle container, where a portion of the operating handle container is cut out, shown with features of a piping system.

FIG. 9C. Side view and front view of a closed design vertical valve application with an operating handle container, shown with features of a piping system.

FIG. 10A. Exploded perspective view of an enclosed straight container embodiment and an enclosed straight cap embodiment attached to a straight valve in a horizontal orientation.

FIG. 10B. Perspective view of a fastening feature for an enclosed straight container embodiment and an enclosed straight cap embodiment.

FIG. 10C. Perspective view of an enclosed straight container embodiment and an enclosed straight cap attachment embodiment with a sensor unit embodiment.

FIG. 13A. Perspective view of a flexible encapsulation assembly embodiment.

FIG. 13B. Side cross-sectional view of a flexible encapsulation assembly embodiment around a straight valve.

FIG. 13C. A user's hand in relation to a flexible encapsulation assembly embodiment.

FIG. 15A. Perspective view of a contracted sleeve with a ring plate embodiment.

FIG. 15B. Perspective view of a contracted sleeve with a ring plate embodiment on a pipe.

FIG. 15C. Side view of a contracted sleeve with a ring plate embodiment.

FIG. 15D. Side view of a sleeve with a ring plate embodiment contracted on a pipe.

FIG. 15E. Perspective view of a sleeve with a ring plate embodiment expanded on a pipe.

FIG. 16A. Perspective view of a contracted sleeve with a two-opening plate.

FIG. 16B. Front view of a sleeve with a two-opening plate embodiment.

FIG. 16C. Perspective view of a sleeve with a two-opening plate embodiment expanded on a pipe, a pipe connecting a wall-mounted assembly and an appliance.

FIG. 16D. Perspective view of a sleeve with a two-opening plate embodiment contracted on a pipe.

FIG. 16E. Perspective view of a sleeve with a two-opening plate embodiment expanded on a pipe.

FIG. 19A. Cross-sectional side view of an enclosed straight container access panel and access port and an enclosed straight cap.

FIG. 19B. Close-up cross-sectional view of an access panel and access port.

FIG. 19C. Close-up cross-sectional view of an access panel press fit to an access port.

FIG. 19D. Perspective cross-sectional view of an enclosed straight container and enclosed straight cap, with an access panel attached to an access port.

FIG. 26A. Front perspective view, rear perspective view, and side view of an open design vertical valve application.

FIG. 26B. Top view, and bottom view, of an open design vertical valve application embodiment further including partial container piece embodiments for existing plumbing.

FIG. 26C. Perspective view of a two-piece container. FIG. 26D. Exploded view of an open design vertical valve application embodiment further including partial container piece embodiments.

FIG. 26E. Close-up view of a fastening feature for an open design vertical valve application embodiment further including partial container piece embodiments.

FIG. 28A. Exploded perspective view of a lever valve container embodiment on a valve.

FIG. 28B. Partial cutaway view of a lever valve container embodiment on a valve.

FIG. 28C. Close-up view of a fastening feature for a lever valve container embodiment.

FIG. 28D. Close-up partial sectional view of an access port attaching on a lever valve container embodiment shown in FIG. 28B.

FIG. 30A. Perspective view of an industrial application embodiment.

FIG. 30B. Exploded view of an industrial application embodiment.

FIG. 30C. Side-view, front-view, and bottom view of an industrial application embodiment.

FIG. 30D. Close-up view of joining edges of industrial application partial container piece embodiments.

FIG. 31C. Perspective view of sleeve and container installed on pipe.

FIG. 31D. Side view of sleeve and container installed on pipe.

Figure 32A:
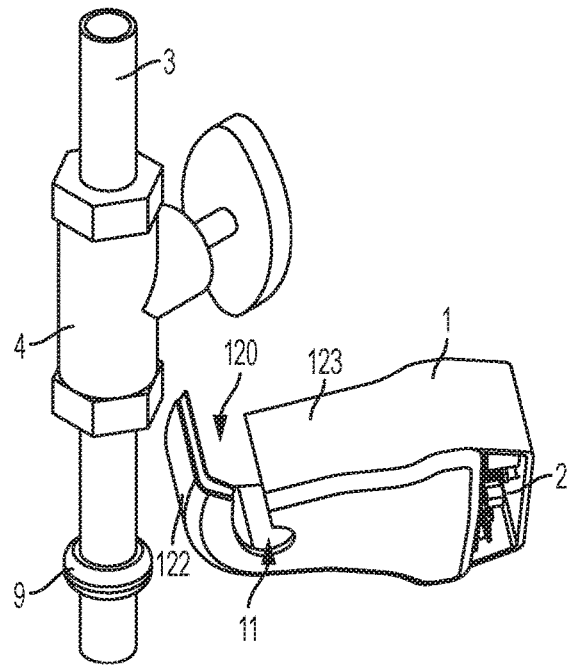
FIG. 32A. Perspective view of flexible container for retrofit.
Figure 32B:
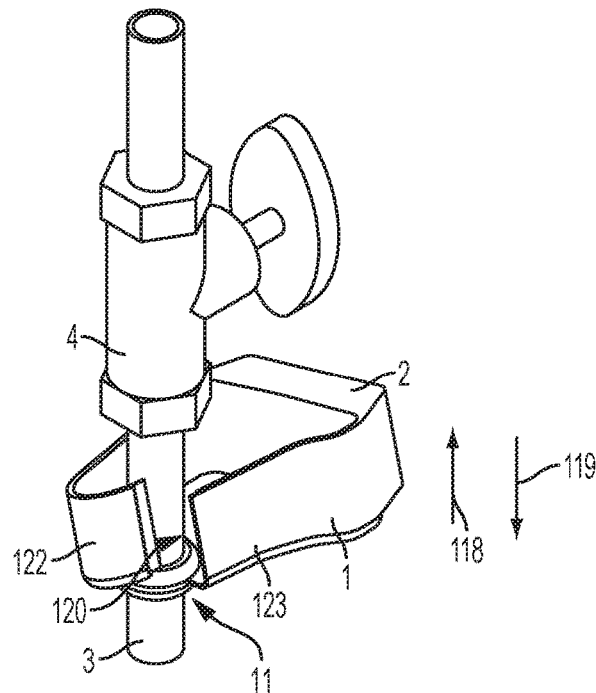
FIG. 32B. Perspective view of flexible container for retrofit being installed on pipe.
Figure 32C:
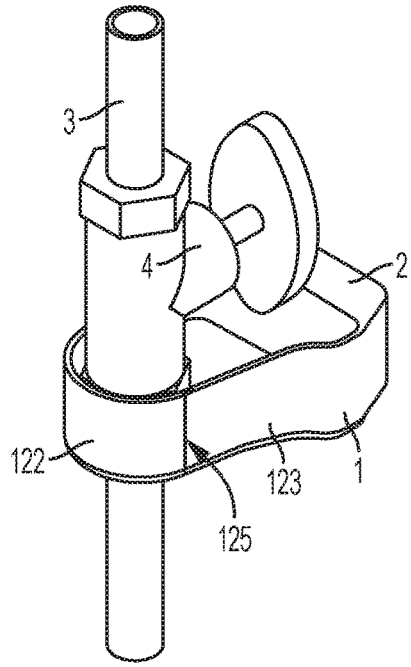

FIG. 32C. Perspective view of flexible container for retrofit after installation on pipe.

FIG. 33A. Perspective view of trim ring cup container on pipe.

FIG. 33B. Perspective view of trim ring cup container being installed on pipe.

FIG. 33C. Bottom view of trim ring cup container installed on pipe.

FIG. 33D. Bottom view of trim ring cup container installed on pipe showing overlapping portions.

FIG. 34A. Perspective view of wall mount container for multiple valves.

FIG. 34B. Perspective view of box portion of wall mount container.

FIG. 34C. Enlarged view of sensor mount area of wall mount container.

Figure 35A:
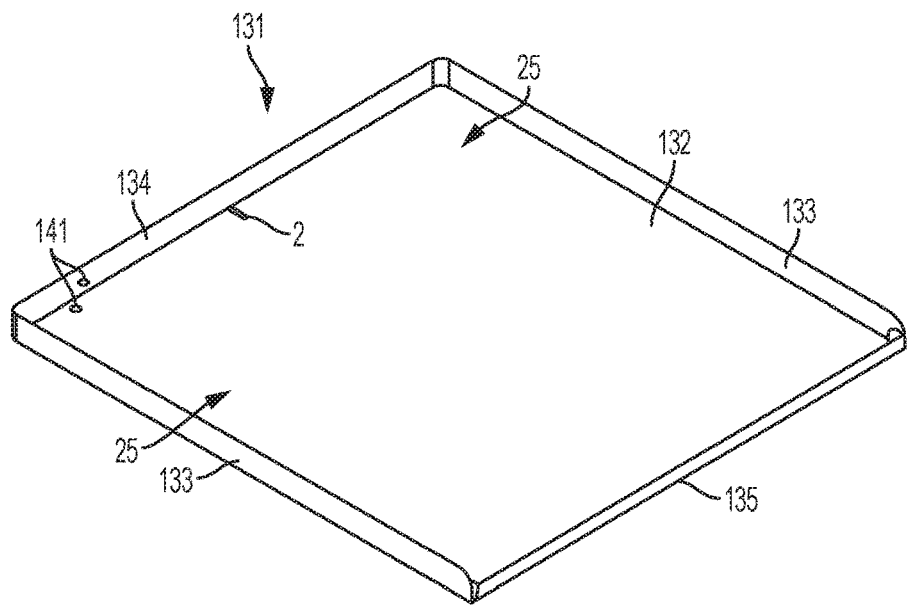

FIG. 35A. A perspective view of a tray container.

Figure 35B:
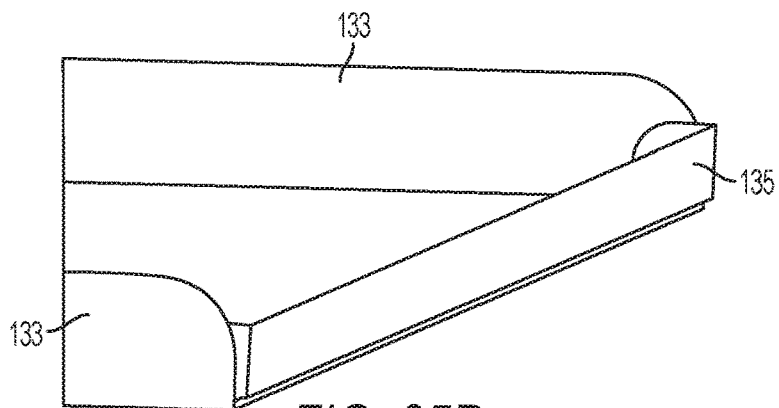

FIG. 35B. A perspective view of a tray container with front portion closed.

Figure 35C:
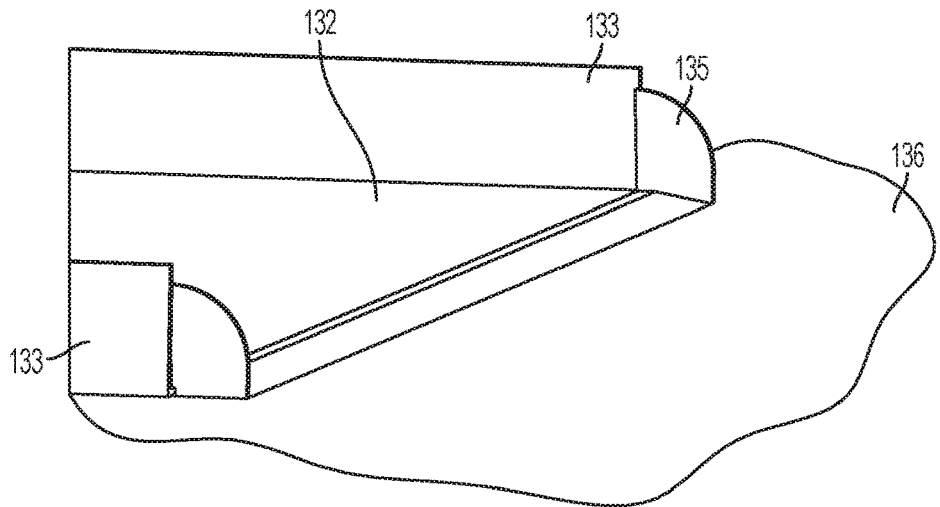

FIG. 35C. A perspective view of a tray container with front portion open.

Figure 35D:
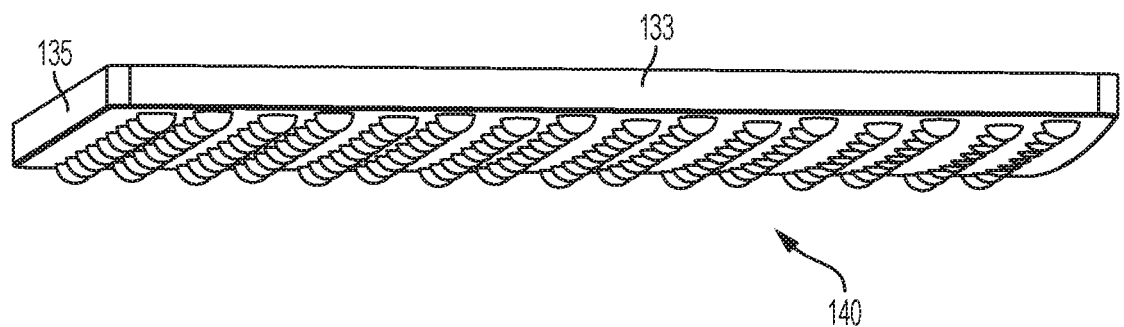

FIG. 35D. A perspective view of the underside of a tray container showing texturing.

Figure 36A:
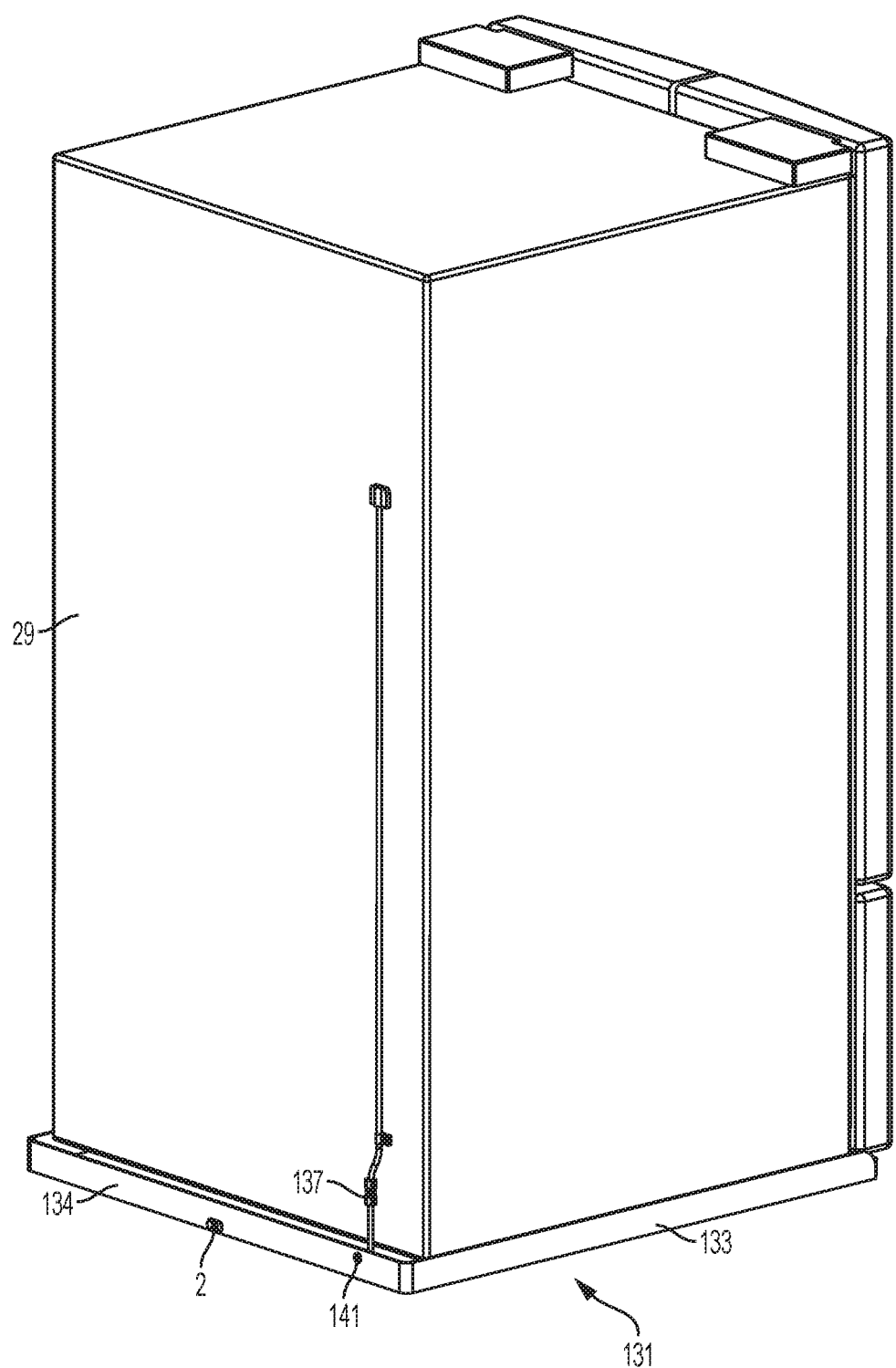

FIG. 36A. A rear perspective view of a fixture on a tray container.

Figure 36B:
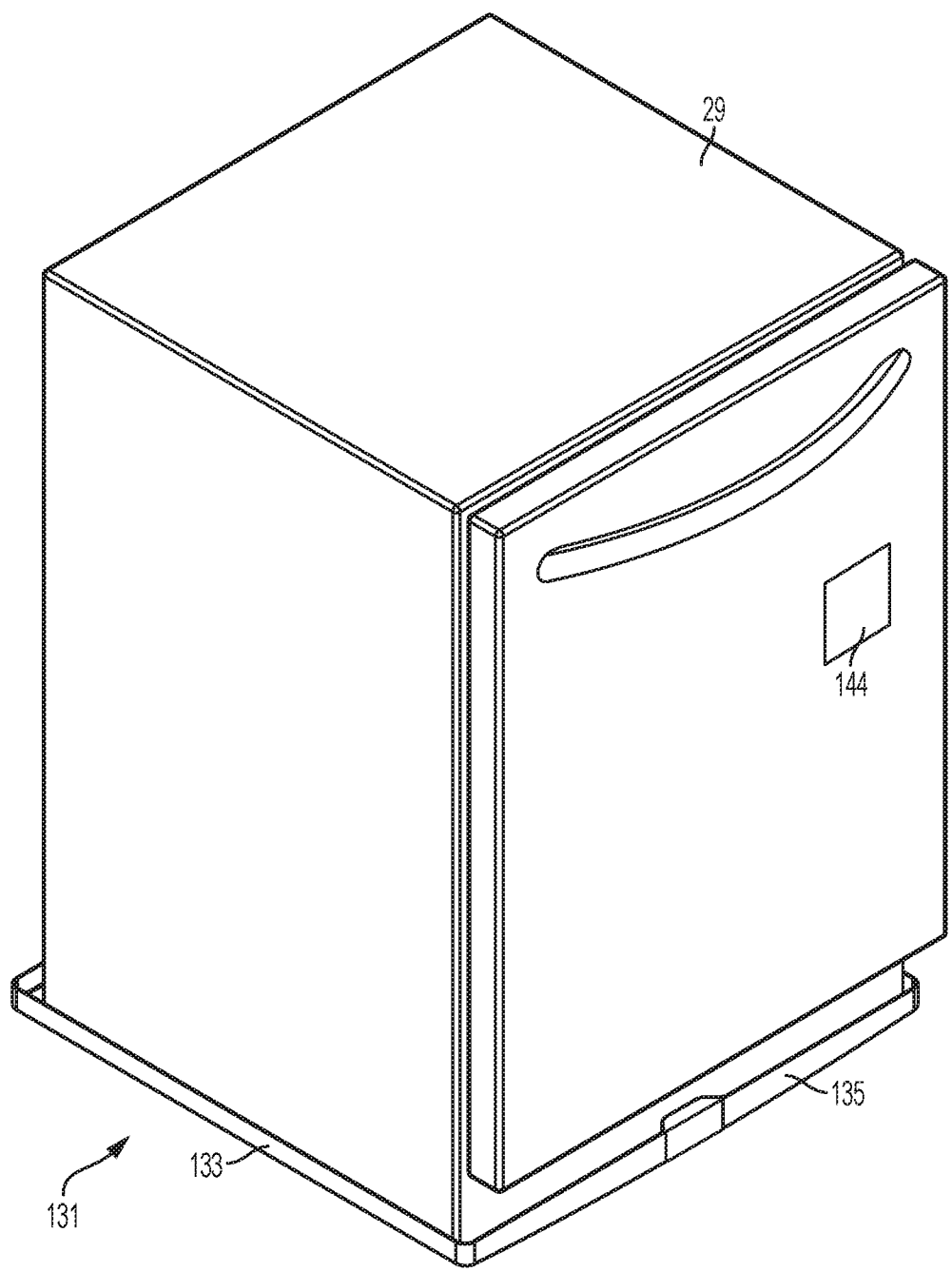

FIG. 36B. A front perspective view of a fixture on a tray container.

FIG. 37A. A rear perspective view of a fixture with sensor and container attached.

FIG. 37B. An enlarged view of a partially cutaway container showing the container-pipe interface.

FIG. 37C. An enlarged view of a partially cutaway container with an alternate container—pipe interface including a gasket.

Figure 37D:
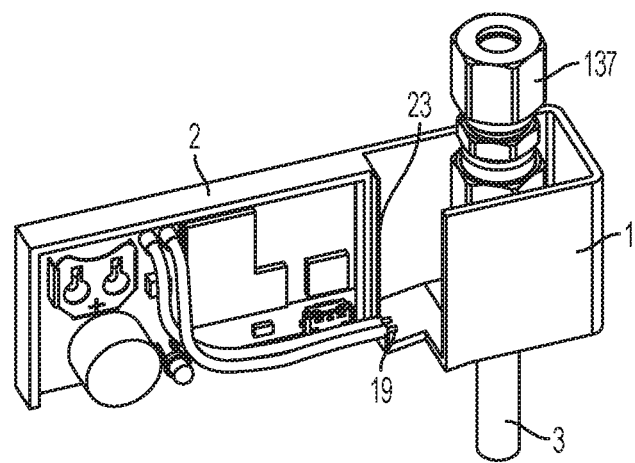

FIG. 37D. A front perspective view of a sensor unit.

Figure 38:
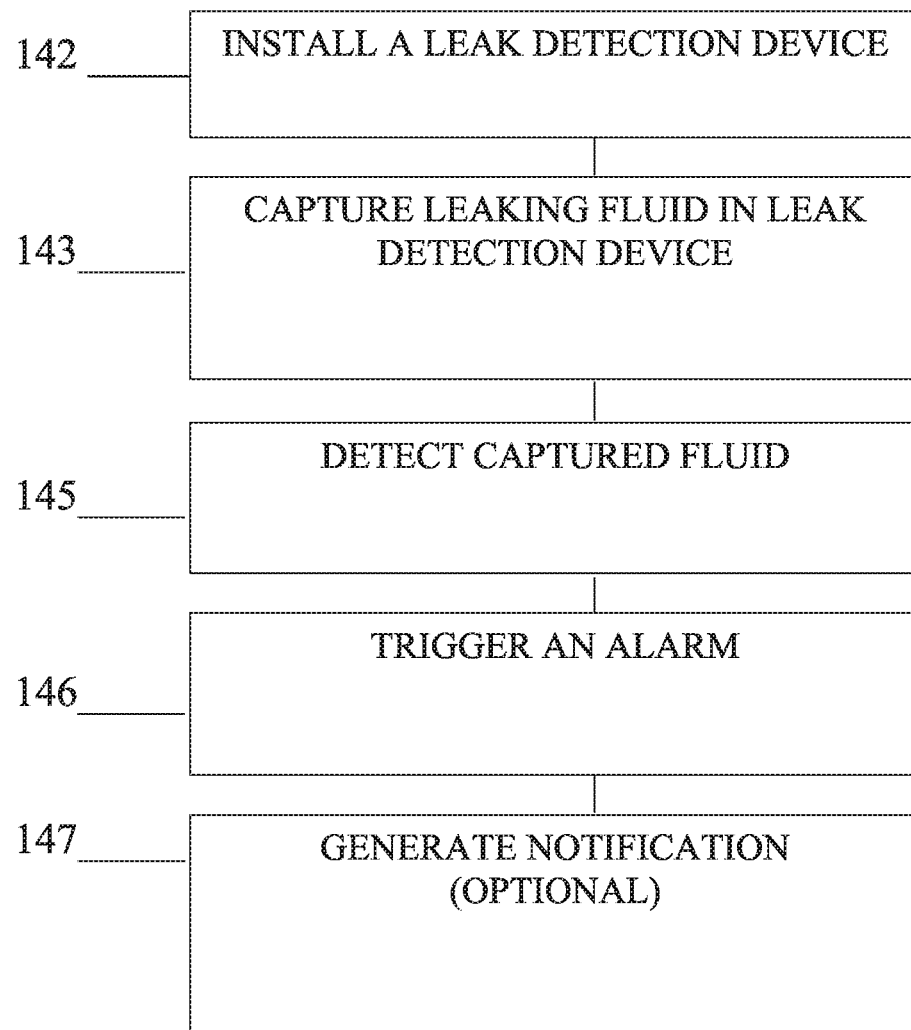

FIG. 38. A Flow chart illustrating a method for leak detection and notification.

LISTING OF ITEMS WITH REFERENCE NUMBERS

Container 1
Sensor unit 2
Pipe 3
Straight valve 4
Shaped region 5
Joining edge 6
Operating handle 7
Partial container piece 8
Gasket 9
Container bottom 10
Opening 11
Angle valve 12
Piping attachment 13
Battery 14
Speaker 15
Switch 16
Sensor unit mount 17
Microprocessor 18
Sensor probe 19
Alarm 20
Power source 21
Sensor opening 22
Container wall 23
Container inner aspect 24
Sloped aspect 25
Container bottom exterior 26
Upper region 27
Lower region 28
Fixture 29
Open design vertical embodiment 30
Open design angle embodiment 31
Closed design vertical container 32
Probe mount 33
Container attachment 34
Probe wire 35
Enclosed container 36

Fastening feature 37
Wedge 38
Operating handle container 39
Operating handle container waist 40
Coupling 41
Enclosed straight container 42
Enclosed straight cap 43
Flexible tab 44
Depression 45
Access panel 46
Access port 47
Flexible encapsulation assembly 48
User's hand 49
Compression nut 50
Piping matching contour 51
Protruding aspect 52
Enclosed vertical fitting cover 53
Vertical fitting base 54
Space 55
Dual horizontal connector container 56
Dual horizontal connector lid 57
Dual horizontal connector lid with stabilizers 58
Stabilizer 59
Hose protector 60
Horizontal fitting 61
Ring plate 62
Bellows 63
Sleeve 64
Pleats 65
Bellows end 66
Two-opening plate 67
Shut-off valve 68
Wall-mounted assembly 69
Flat aspect 70
Slit 71
Face seal 72
Removable piece 73
Lid gasket 74
Access port interface 75
Close-up view of an access panel/access port assembly 76
Tab 77
Inner edge 78
Female adapter 79
Male adapter 80
Threaded region 81
Membrane ring plate 82
Membrane 83
Membrane housing 84
Partial ring plate piece 85
Ridge-engaging tooth 86
Groove 87
Sleeve and container assembly 88
Closed design vertical container neck 89
Closed design vertical container body 90
Opening gap 91
Detection 92
Alarm 93
Notification 94
Notification Recipient 95
Bridging material 96
Lever valve container 97
Lining 98
Lever valve partial container piece 99
Handle 100
Enclosed container for industrial or other applications 101.
Industrial application partial container piece 102
Nut 103
Threaded fastener 104
Tabbed feature with aperture 105
Valve assembly 106
Tongue 107
Operating handle stem 108
Adjustable face 109
Gasket slit 110
Sleeve funnel 111
Pipe bend area 112
Connecting arm 113
Fixture connection 114
Probe wires 115
LED lights 116
Controller 117
Directions 118/119
Opening 120
Trim ring cup 121
Flexible portions 122/123
Trim ring 124
Seam 125
Leak detection wall unit 126
Enclosure 127
Box 128
Area 129
Drain 130
Tray 131
Tray bottom 132
Tray side 133
Tray rear 134
Tray front 135
Tray floor 136
Fitting coupling 137
Battery backup 138
Elastomeric seal 139
Texturing 140
Grommet holes 141
Display 144

DESCRIPTION

The present invention is directed to solving numerous problems associated with leak detection, particularly slow leak detection. Embodiments of the present invention include installation of methods, systems, and apparatuses that detect leaks on pipes and piping systems. Embodiments of the invention encapsulate or partially encapsulate and detect leaks related to piping systems, the piping systems typically include components such as pipes, hoses, pipe fittings, pipe connections, pumps and valves that carry a fluid from one location to another. Embodiments of the present invention encapsulate or partially encapsulate an area relating to pipes, hoses pipe connections, pumps, and valves, and a sensor to capture fluids on the interior and/or exterior of the encapsulated area.

In certain embodiments, a fluid being carried by a piping system has a higher density characteristic relative to the surrounding medium, for instance, water through a room at atmospheric pressure. In such cases, gravity acts upon the fluid and the addition of a sloped aspect in the container enables the fluid to flow and accumulate toward lower regions of certain embodiments of the invention. This enables the targeted placement of a sensor unit to support the detection of slow and fast leaks alike. In other embodiments, placement of a sensor unit, sensor probe, or sensor opening, may be in other regions of the various embodiments of the invention, as to detect the presence of a fluid. In the case of a fluid carried through a piping system having a lower density characteristic relative to the surrounding medium, such as fluid substances which are typically at a gaseous state at atmospheric pressure, a sensor unit, sensor probe, or sensor opening may be placed in a different region of other embodiments of the invention as to better detect leaking of such fluid. For example, in the instance that the fluid carried exists at a gaseous state and exhibits a density less than ambient atmosphere, the sensing feature may be located at an elevated region of a container as the flow of such a fluid would typically flow upward opposing gravitational force.

In one aspect, embodiments of the invention solve the problem of preventing leaks that may have direct effects, such as substantial damage to property or loss of a fluid, and indirect effects, such as monetary loss, by detecting a leak in features of a piping system before substantial damage occurs. In one aspect, embodiments of the invention solve the problem of potentially great damage from water leaks, by detecting leaks related to specific features of a piping system, such as the connection related to piping systems. However, persons having skill in the art will understand that embodiments of the invention are not limited to applications for water leak detection, but also include, and are not limited to uses for piping systems carrying fluids such as oil, crude oil, hydrocarbons, natural gas, steam, and other substances existing in a fluid, liquid or gaseous state.

Examples of connections in fluid conduit systems such as piping systems include fasteners, threads, soldering, compression fittings, flange fittings, and welding, which can be seen in piping system junctions. Such connections typically allow the attachment of pipes, fittings, valves, fixtures, drains, and other components related to piping systems. Further, the components related to fluid conduit systems, such as pipes, fittings, valves, fixtures, drains, and other components, themselves have the potential for leaking. In one aspect, embodiments of the invention solve the problem of expensive and labor-intensive processes associated with previous leak detection means, by including features that allow installation of such embodiments of the invention on existing piping related to piping systems, known commonly as retrofitting. In one aspect, embodiments of the invention are installed on newly installed (new build) connections. In another aspect the embodiments may be installed after the connection or other fixture or feature is installed (retrofit). In another aspect, the embodiments may be installed by a manufacturer of the pump, pipe, fitting, fixture, valve or the like at the time of manufacture. In another aspect, embodiments of the present invention solves the problem of delayed detection of slow leaks associated with known devices, by being directly associated with potential sources of the slow leaks, thus avoiding potentially damaging fluid leakage. Further, embodiments of the invention further comprise container features that can collect leaked fluid, as to prevent further escape of such fluid.

In an embodiment, a container fitting the form of piping systems is disclosed. In an embodiment, a container 1 fits over a fluid conduit system such as a pipe 3 and/or straight valve 4, as shown in FIG. 1A and FIG. 1B. In this embodiment, container 1 is one piece for an original installation application but in some embodiments, container 1 may be more than one piece to fit over pipe 3 in retrofit applications. In general, a pipe 3, as referred to herein, may include pipes, hoses, tubes, and other materials used to convey a fluid. There are a number of sources of leaks associated with valves, for example, at the compression fitting, valve stem seal, line junction, and valve stem junction. Embodiments related to a straight valve further comprise a sensor unit 2 affixed to the container 1. In certain embodiments, the container 1 comprises a plurality of container parts 8, seen in FIG. 1B. Certain embodiments of the container 1 as shown in FIG. 1A, FIG. 1B, FIG. 1C, and FIG. 1D comprises a shaped region 5. The shaped region 5 has a form that allows certain features of a piping system to fit when a container 1 is placed in the vicinity of a piping system. For instance, as shown in FIG. 1A, FIG. 1B, FIG. 1C, FIG. 2A, FIG. 4A, FIG. 4B, and FIG. 26A, the shaped region 5 accommodates the form of an operating handle 7 of a valve, the operating handle and valve having shapes that are known to those having skill in the art. Embodiments of the invention further comprise a container bottom 10. Embodiments of the container bottom 10 allow certain embodiments of the container 1 to retain a fluid so that sensor unit 2 detects the fluid in and around the area encapsulated or partially encapsulated by a container 1. Certain embodiments of the invention may be placed in new plumbing installations, as illustrated in FIG. 1A. Certain embodiments comprise an opening 11, as shown FIG. 1D of a bottom view of a container 1 further showing a container bottom exterior 26, where a piping system component, such as a pipe or valve, can be placed through said opening 11 during assembly of the piping system. Further, a gasket 9 placed between an opening 11 and a pipe 3 or valve prevents the flow of a fluid through the interface between a container 1 and features of a piping system. It will be appreciated that gaskets may comprise of one or more materials including but not limited to materials polymeric, metallic, and/or organic in nature. Some examples of materials used in the manufacture of gaskets include but are not limited to rubber, nitrile, buna, neoprene, foam, silicone, metal or a plastic polymer such as polytetrafluoroethylene (PTFE), polyether ether ketone (PEEK), urethane, or ethylene propylene. A gasket 9, in certain embodiments of the invention, is comprised of a material such as rubber or silicone, or other materials having sealing properties known to persons having skill in the art.

In other embodiments, a container is retrofitted to existing piping systems, as exemplified in FIG. 1B and FIG. 1C. A plurality of container pieces 8 can be joined, to further comprise a container 1, as shown in FIG. 1C, showing a cross-sectional perspective view. A container 1 affixes to existing piping systems by joining of at least two container pieces, typically two halves. A container piece 8 has a plurality of joining edges 6, wherein a joining edge 6 of one container piece 8 affixes to a joining edge 6 of another container piece. In certain embodiments of the invention, union of such joining edges is achieved by an interference fit, including ridges, bumps or latches to allow the two pieces to join at joining edge 6. In an embodiment, placing a sealing material or coating between the faces of the joining edges may be accomplished with or without the interference fit.

It will be appreciated to those skilled in the art that container pieces may be separate non-attached pieces or exist attached to at least one other container piece through the use of mechanical attachments that allow movement of separate attached container pieces independent of each other. Such attachments include but are not limited to hinges and pivot point attachments, which enable guided assembly of a plurality of container pieces.

It will be appreciated that embodiments of the invention, including but not limited to parts or a whole of certain embodiments of a container, container piece, enclosed container, operating handle container, operating handle container waist, enclosed straight container, enclosed straight cap, enclosed vertical fitting cover, vertical fitting base, dual horizontal connector container, dual horizontal connector lid, dual horizontal connector lid with stabilizers, industrial application enclosed container and others components of embodiments of the invention, may comprise of one or more materials, where examples of materials include but are not limited to materials polymeric, metallic, and/or organic in nature. Some examples of materials used in the manufacture of containers and components include but are not limited to rubber, nitrile, bioplastics, buna, neoprene, foam, silicone, metal (such as steel, stainless steel, brass, iron, teflon, among others), or a plastic polymer such as polytetrafluoroethylene (PTFE), polyether ether ketone (PEEK), urethane, polyethylene terephthalate (PET), ethylene propylene, high density polyethyelene, or other thermoplastics.

As shown in FIG. 1C, a container piece 8 may further include a gasket 9, wherein gasket 9 retrofits the invention to an existing pipe 3 or a pipe fitting. Moreover, gasket 9 prevents the flow of a fluid across the interface between a container 1 and features of a piping system 3. In embodiments of the invention, the gasket is made of material that includes rubber, silicone, elastomer, and other materials that prevents or decreases the flow of a fluid between an interface, wherein gasket 9 generally acts as a seal. Gasket 9 may be used in an embodiment intended for the retrofitting of existing plumbing which comprises at least one segment of gasketing material which, when the distal ends interface, a gasket or seal forms around the exterior surface of existing pipe 3 or pipe fitting to prevent the flow of fluid between the interface of the existing pipe, the container piece 8 and the mating container piece. It will be appreciated that the gasket material may comprise of a singular segment of flexible or semi-rigid gasket material, a plurality of flexible gasket material, a plurality of semi-rigid gasket material or a plurality of rigid gasket material to form a full gasket around the perimeter an existing pipe 3 or valve. Gasket 9 may also comprise a split seam gasket with a slit 110 in the gasket to allow it to be retrofitted around a pipe 3. Gasket 9 may be built into container 1 or may be applied around pipe 3 in a separate operation from the attachment of container 1 or container pieces 8. Gasket 9 may also be utilized in original installations to fit over pipe 3 prior to its connection with another pipe or fitting.

Figure 2A:
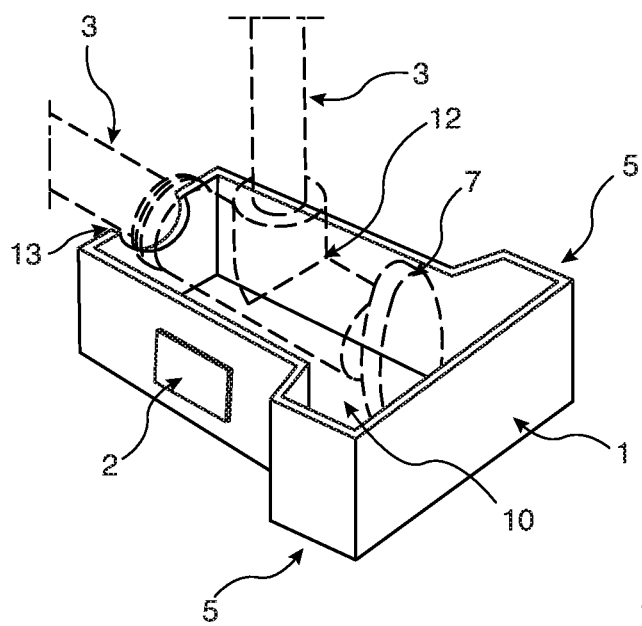
FIG. 2A. Perspective view of an open design angle valve application embodiment with associated piping system.
Figure 2B:
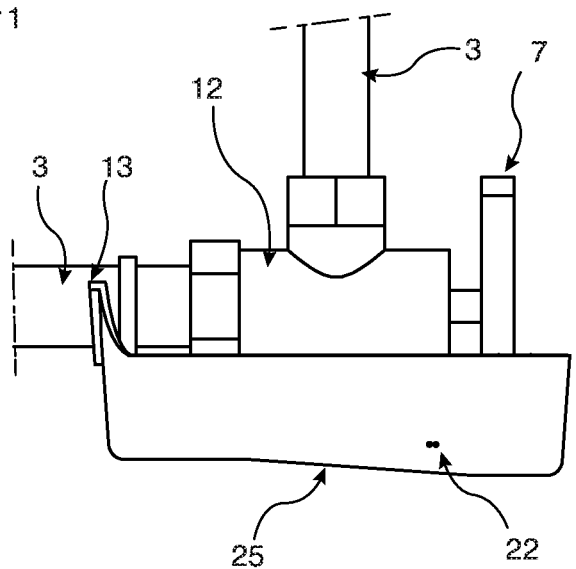
FIG. 2B. Side view of an open design angle valve application embodiment.
Figure 2C:
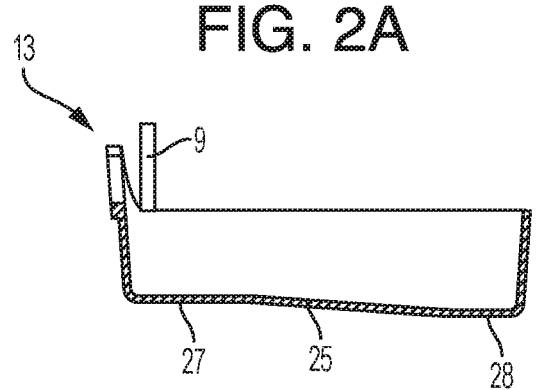
FIG. 2C. Side view of an open design angle valve application embodiment.
Figure 2D:
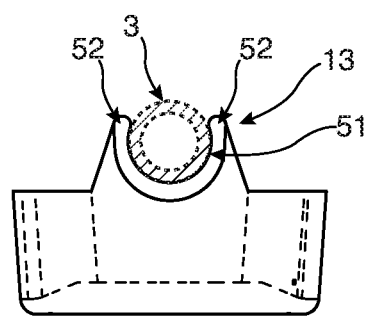
FIG. 2D. Frontal view of an open design angle valve application embodiment associated with a piping system.
Figure 2E:
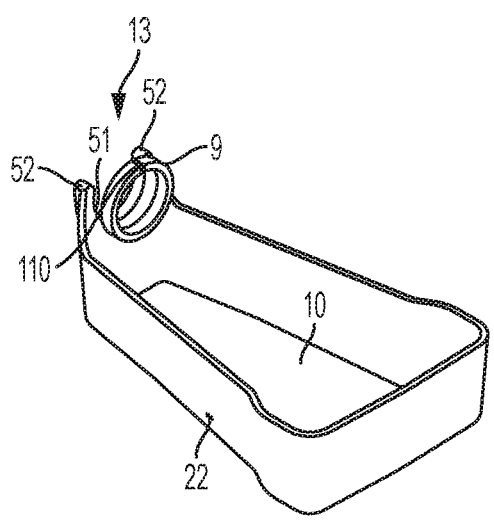
FIG. 2E. Perspective view of an open design angle valve application embodiment.

In an embodiment, a container 1 attaches to a pipe 3 and/or an angle valve 12, as shown in FIG. 2A and FIG. 2B. Embodiments of a piping attachment 13 allow attachment of a container 1 to a pipe or a valve or other aspects of a piping system, where the piping attachment 13 exhibits a form that fastens to a feature of a piping system. In certain embodiments, the piping attachment is made of a material that includes plastic, rubber, metal, among others. For instance, as shown in FIG. 2D and FIG. 2E, a piping attachment 13 has a piping matching contour 51 with a protruding aspect 52. An aspect of a piping system, such as a pipe 3, fits within the piping matching contour 51, and the protruding aspects 52, such that the container 1 associated with the piping attachment 13 is affixed to said certain aspect of a piping system, such as a pipe 3. It will be appreciated by one skilled in the art that the affixation of said container 1 exhibiting said piping matching contour 51 and said protruding aspect 52 may use one or more of a plurality of fastening mechanisms including but limited to hardware, saddle clamps, strap type attachment devices or the use of a semi-rigid protruding aspects 52 which enable the snapping of said container 1 onto said pipe without the use of additional attachment devices. As shown in FIGS. 2C and 2E, in either original or retrofit applications, gasket 9 may be included to provide a liquid seal between pipe 3 and container 1.

As illustrated in FIG. 2A and FIG. 2E, an embodiment of the container bottom 10 allow embodiments of the container 1 to retain a fluid if the piping system associated with the container has a leak. Moreover, as shown in FIG. 2B and FIG. 2C, the bottom of the container further has features to more effectively collect and detect a fluid. In certain embodiments, as shown in FIG. 2C, the bottom of a container has a sloped aspect 25 to enable a liquid substance within a container 1 to move from an upper region 27 to a lower region 28 by force of gravity. In other embodiments, the bottom of a container has a sloped aspect throughout, a flat region throughout, or various combinations of sloping or flat regions.

In certain embodiments, the collection of a fluid in specific portion of the container enables quicker detection of a fluid leaking from a piping system, as compared to prior art fluid detection apparatuses. A container 1 in certain embodiments of the invention, and moreover, a sloped aspect 25 of said container 1, allows a leaking fluid to collect within a certain portion of an encapsulated area or partially encapsulated area of said container 1, thus allowing a sensor unit 2 to detect a leak of a fluid from an aspect of a piping system as said leak occurs. It will be appreciated that the bottom surface 10 of said container 1 may exhibit features such as but not limited to channeling, raised features and/or slope intended to direct the flow of fluid to a localized area proximal to fluid detection device. It will be appreciated that features relating to the bottom surface 10 is further applicable to other embodiments of the invention. Additionally, as shown in FIG. 2B and FIG. 2E, in certain embodiments, the placement of a sensor opening 22 or a sensor unit in the proximity of the lower region 28 of a sloped aspect 25 enables a sensor unit to detect a fluid accumulating near the lower region of a sloped aspect 25.

In certain embodiments, a fluid carried by a piping system has a higher density characteristic relative to the surrounding medium, for instance, water carried in a pipe through an environment of air at atmospheric pressure. In such cases, gravity may act upon the type of fluid and a sloped aspect enables the fluid to accumulate towards a certain region of certain embodiments of the invention. In such an embodiment, the placement of a sensor unit, sensor probe, or sensor opening is located proximal to the region of fluid accumulation, typically at the lowest region within a container. In other embodiments, the placement of a sensor unit, sensor probe, or sensor opening may be in other regions of the various embodiments of the invention as to detect the presence of a fluid dependent on characteristics of said fluid.

In an embodiment in which a fluid carried through a piping system in which said fluid exhibits a lower density relative to the surrounding medium, such as hydrogen carried in piping through an air filled environment at atmospheric pressure, a sensor unit, sensor probe, or sensor opening may be placed in a different region, such as proximal to the regions of fluid accumulation such as the highest region within a container as to better detect leaking of such fluid.

A "sensor unit," as referred to herein, are those used to detect the presence of a fluid in a surrounding environment of differing composition. Embodiments of a sensor unit comprise an apparatus with a probe, circuitry associated with a probe, and a signaler. As illustrated in a certain embodiment in FIG. 3A and FIG. 3C, a sensor unit 2 comprises a sensor probe 19. In certain embodiments, the sensor probe 19 is comprised of a conductivity sensor, which may be used to detect the presence of fluids of liquid form such as oils, water and other aqueous solutions. It will be appreciated to those skilled in the art that a sensor probe 19 type may include, but is not limited to, a conductivity based probe, a sampling device, palladium based sensor, optical fiber sensor, electrochemical sensor, microelectromechanical sensor, film sensor or photoelectric sensor, hydrometer.

In certain embodiments of the invention used for substantially liquid form sensing with electrically conductive characteristics, at least two electrodes comprising the sensor probe utilize an open circuit. This open circuit provides sensing enablement in that, when such a fluid bridges the gap between said electrodes the circuit is closed, which provides signal to the sensor unit to activate the alarm and/or notify the user. In some embodiments, such electrodes may exhibit form of simple bare conductive materials, such as two sensor probes 19 as shown in FIG. 3E. In other embodiments, such electrodes embody fine conductive material or filament, embedded into a non-conductive substrate wherein if moisture contacts the substrate, the electrodes are bridged thereby providing signal to activate the alarm and/or notify the user. In other embodiments, as shown in FIG. 3F, there is a bridging material 96 having a nonconductive property between such electrodes or sensor probes 19, where a fluid absorbed by a bridging material 96 the electrodes are bridged thereby providing signal to activate the alarm and/or notify the user. In such case, such bridging material increases the absorption, retention, and transfer of a fluid by capillary action, and increases potential detection of such fluid between sensor probes 19. It will be appreciated that such embedded conductive material or filament provides increased sensing surface area and increased flexibility of sensing surface area to adapt to a variety of embodiments. It will be further appreciated to those skilled in the art that the orientation of electrodes having an embedded filament or conductive material is immaterial provided that electrodes do not come in contact or proximity sufficient to close the open circuit in the absence of a leak.

Figure 4A:
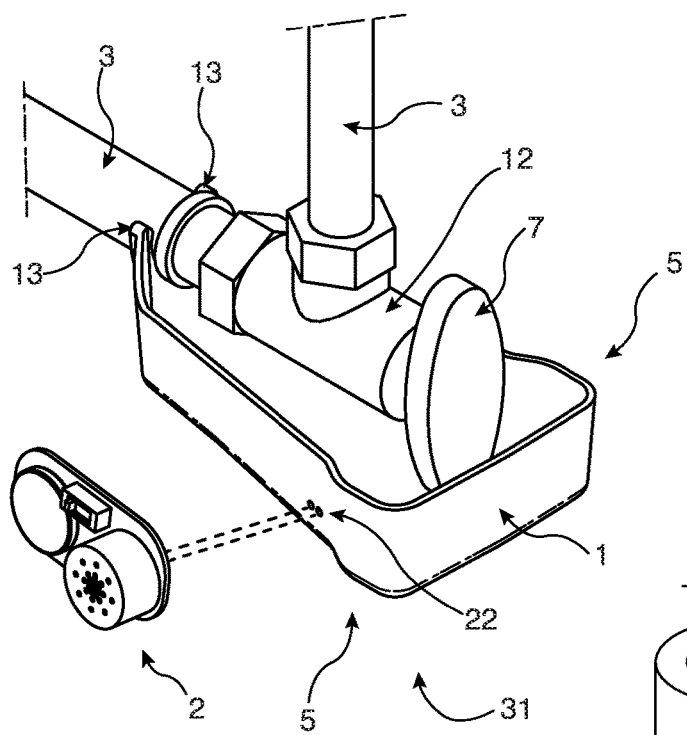
FIG. 4A. Perspective view of a sensor unit affixing to a container for a horizontal valve application.
Figure 4B:
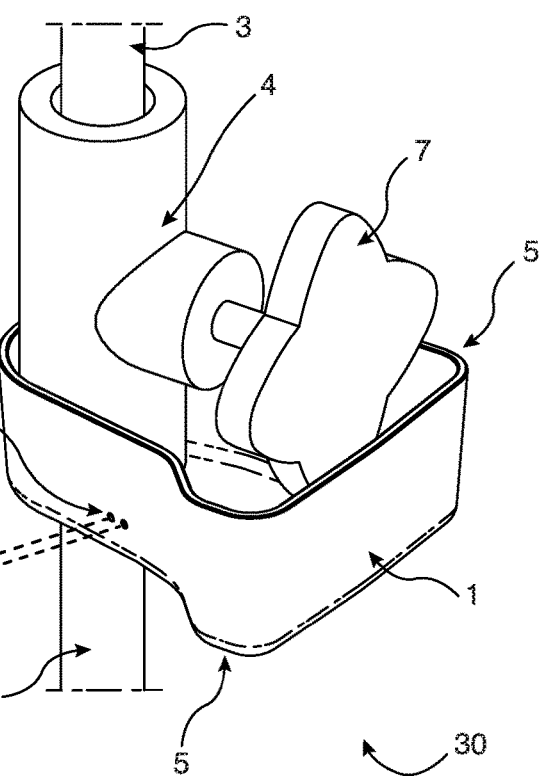
FIG. 4B. Perspective view of a sensor unit affixing to a container for a vertical valve application.
Figure 4C:
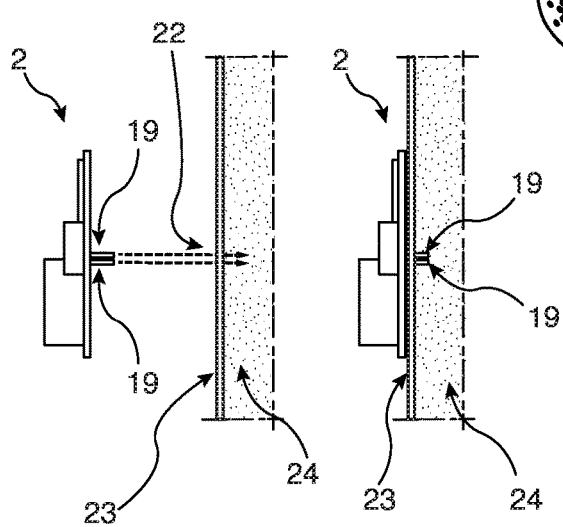
FIG. 4C. Top-down view of a sensor unit affixing to a container wall, in one embodiment of the invention.

In certain embodiments of the sensor unit, the sensor unit affixes to a container 1 by securing an aspect of a sensor unit, such as a sensor probe 19, through a sensor opening 22 as shown in FIG. 4A, FIG. 4B and FIG. 4C, the sensor probe 19 being located within or near the encapsulated area or partially encapsulated area of a container 1. The placement of a sensor probe 19 within or near an encapsulated area or partially encapsulated area of a container enables embodiments of the sensor probe 19 to detect fluids that are collected within or near a container 1. In certain embodiments of the invention, the sensor unit 2 contains a probe mount 33, as shown in FIG. 3D, where a sensor probe or a sensor probe connected to a wire affixes to the probe mount.

In an embodiment of the invention, as shown in FIG. 4A, the sensor unit 2 affixes to the container 1 intended for angled valves referred to as an open design angle embodiment 31, and as shown in FIG. 4B, the sensor unit 2 affixes to the container 1 intended for vertical valves referred to as an open design vertical embodiment 30. The sensor unit 2 affixes to any form of container, such as the containers disclosed herein, as to detect the level of the water within or near the container. In such container or plurality of containers, the sensor unit affixes in any number of ways. In one embodiment, a part of or a whole of a sensor unit 2 fits within a sensor opening 22 as shown in FIG. 4A and FIG. 4B. In an embodiment, a sensor probe 19 or plurality of such probes passes across the thickness of a container wall 23 through sensor opening 22, such that a portion of the sensor probe is located within an inner aspect 24 of a container, as shown in FIG. 4C.

Figure 6A:
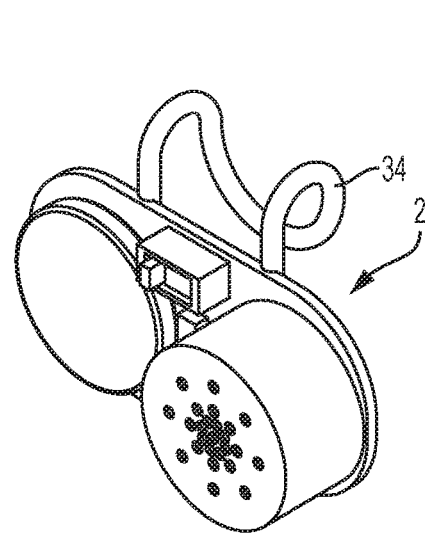
FIG. 6A. Front perspective view of a sensor unit with a container attachment.
Figure 6B:
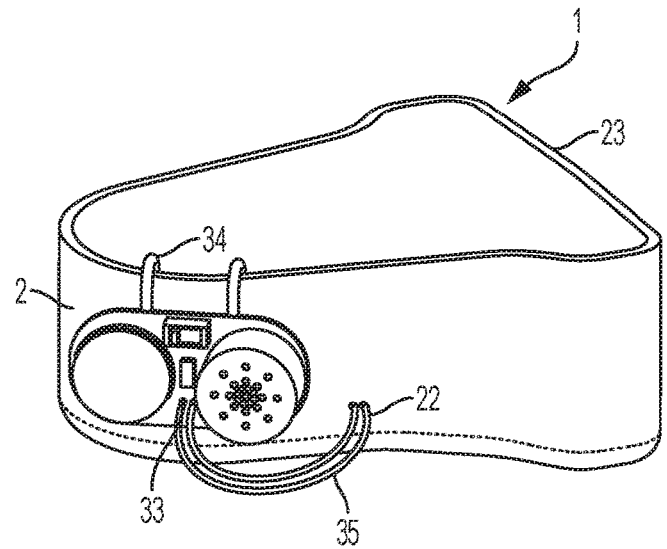
FIG. 6B. Rear perspective view of a sensor unit with a container attachment.

In another embodiment of the invention, as shown in FIG. 6A, the sensor unit 2 affixes to a container 1 with a container attachment 34. A container attachment 34, enables a sensor unit to affix to certain aspects of a container 1, for example, with a hook-like feature to the side of a container 1, as shown in an embodiment in FIG. 6B. In certain embodiments of the invention, the sensor unit 2 detects the fluid within the container 1 using at least one probe wire 35, a probe wire 35 links a probe mount 33 to a sensor probe, and such sensor probe is placed within a sensor opening 22, as shown in FIG. 6B.

Figure 6C:
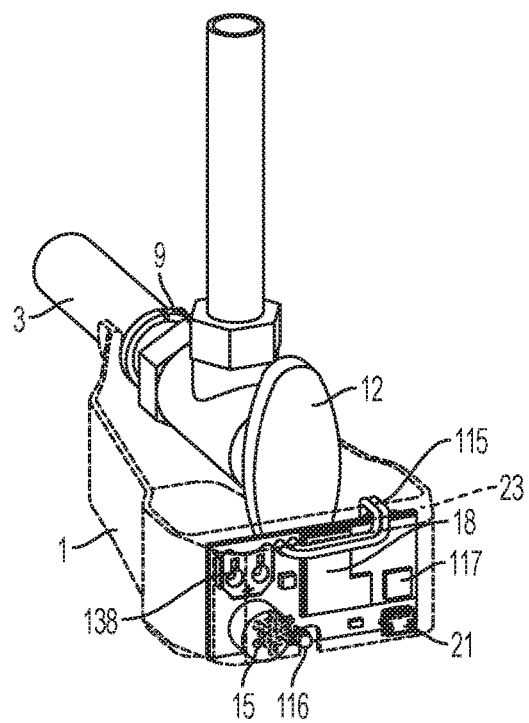
FIG. 6C. Embodiment of a sensor unit incorporated into a container.

In the embodiment shown in FIG. 6C, sensor unit 2 is incorporated as part of container 1. Sensor unit 2 includes speaker 15, microprocessor unit 18, power source 21 and sensor probe 19 which may include wires 115 connected to or acting as probe 19. One or more LED lights 116 may also be included to provide visual notification to a user of fluid detected by sensor unit 2. Wires 115 can be soldered to the circuit board of sensor 2 and routed over container 1 as shown in FIG. 6C or probes 19 may be routed through a wall 23 of container 1 with wires 119 connecting them to sensor unit 2. Probes 19 could also be rigid probes that extend through a wall 23 of container 1 and are directly connected to sensor 2. Probes 19 could be molded into container 1 during fabrication thus reducing the potential for leaks where probes 19 pass through wall 23. Probes 19 could be hard mounted through the sensor unit mount 17 and to sensor 2 eliminating the need for soldering wires 115. In some embodiments, wires 115 can be routed to additional containers to provide one sensor 2 for multiple containers 1. For example, where there are multiple lines such as hot/cold for a washing machine or other fixture, a single sensor may be used with wires 115 connected to multiple containers and sensors. In another embodiment, wires 115 may be routed to a secondary sensor on the same container. This enables the detection of a leak in various locations in the container in the event that the container becomes re-oriented or dislodged such that the sloped aspect 25 is altered with respect to the ground surface and the fluid is routed to different portions of the container.

As illustrated in a certain embodiment as shown in FIG. 3A, the sensor unit 2 further comprises of a microprocessor 18. A microprocessor 18 is communicatively linked to other features such as an alarm 20, the sensor probe 19, power source 21, and switch 16. By linking to such other features, the microprocessor 18 communicates water detected by a sensor probe 19 sensing a fluid to signal fluid detection via an alarm 20. In certain embodiments, an example of alarm 20 comprises an output to signal a user of the presence of a fluid, for example, a speaker 15, as shown in FIG. 3B, FIG. 3C, FIG. 3D, and FIG. 6C. In certain embodiments, the presence of a fluid by the sensor probe 19, results in the microprocessor relaying information to a speaker to sound an audible alarm. In other embodiments of the invention, detection of a fluid by the sensor probe 19 relays a sensing event to other examples of an alarm 20, for example, an LED that displays a visual alarm, or a colorimetric indicator. LED could include a light pipe taking light to a lens and the light could be directed into the container 1 or at the pipe 3 or externally, to allow for the easiest viewing by a user. Other examples of ways to alert a user include wireless signals communicated through protocols such as Wi-Fi, Bluetooth, cellular, or radiofrequency, that may be further associated with software or hardware that alert a user, for example, smart-phone apps and web interfaces. Furthermore, embodiments of the sensor unit are powered with a power source 21, as shown in FIG. 3A, such as a battery 14 or battery backup 138 as shown in FIG. 3B, FIG. 3C, FIG. 3D and FIG. 6C. In yet other embodiments of the invention, the power source is provided from external means such as, but not limited to alternating current (AC), direct current (DC) or AC converted to DC power provided from a power source such as a household outlet. In yet other embodiments of the invention, the power source includes solar power provided by a solar panel or an array of solar panels. Additionally, certain embodiments of the invention further comprises a switch 16 to turn on the sensor unit 2, as shown in FIG. 3A, FIG. 3B, FIG. 3C, and FIG. 3D. The switch enables power and power consumption control over the functioning of the sensor unit 2. In yet another embodiment, the sensor unit has a setting to detect low-voltage or low-battery from the power source 21 and provides an alert a user that the sensor unit 2 may not function properly in the case of an insufficient amount of electrical power going to the sensor unit 2. In one embodiment, power source 21 may be a micro USB plug which may be supplemented by a battery backup 138 such that the alarm may activate in the event of a power disruption or if the communication network goes offline.

Figure 5A:
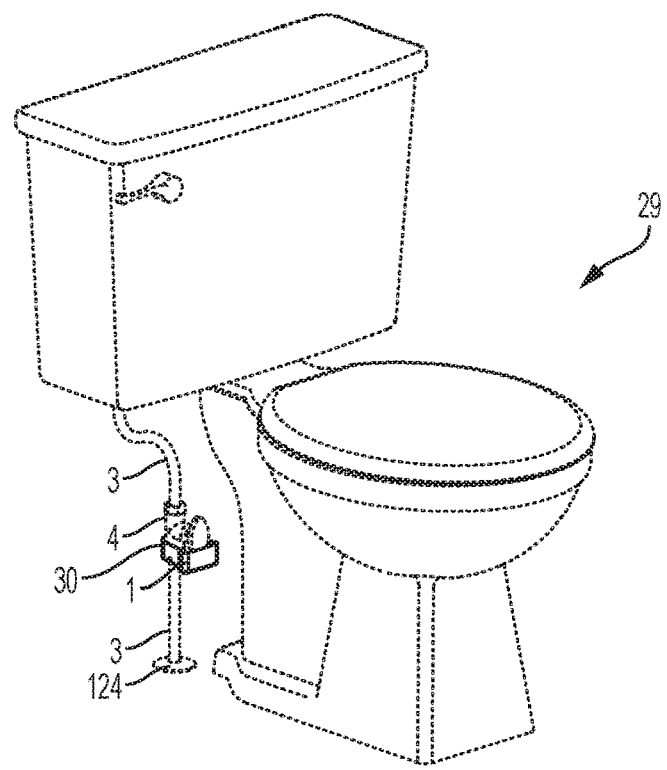
FIG. 5A. An embodiment of open design angle valve application in relation with a fixture.
Figure 5B:
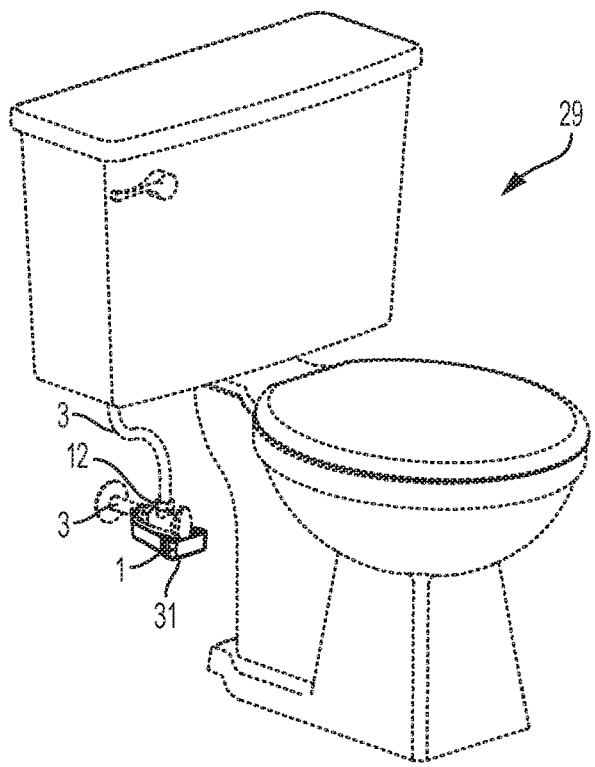
FIG. 5B. An embodiment of open design vertical valve application in relation with a fixture.
Figure 7A:
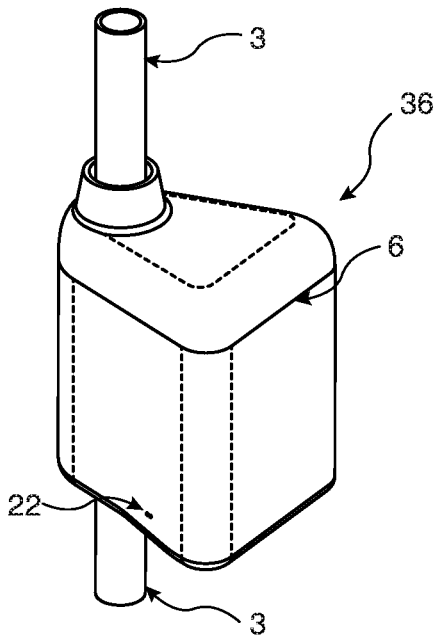
FIG. 7A. Perspective view of a closed design vertical valve application for new plumbing installation in an embodiment with features of a piping system.
Figure 7B:
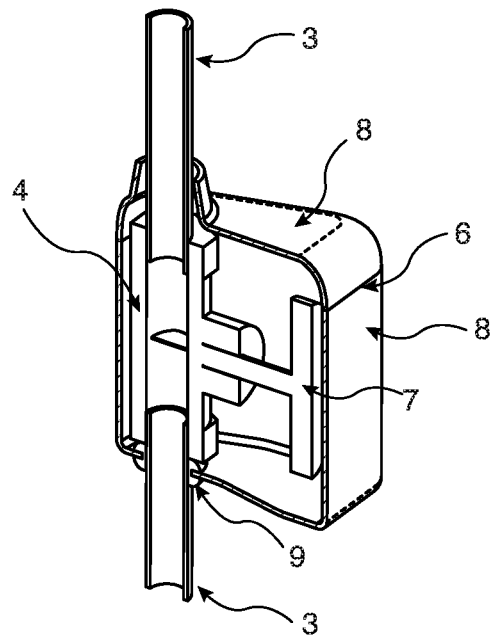
FIG. 7B. Perspective view of a cross section of a closed design vertical valve application for new plumbing installation in an embodiment, with features of a piping system.
Figure 7C:
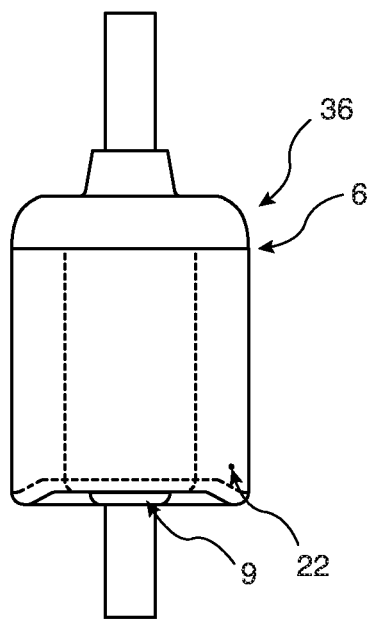
FIG. 7C. Back view of a closed design vertical valve application for new plumbing installations in an embodiment of the invention.
Figure 7D:
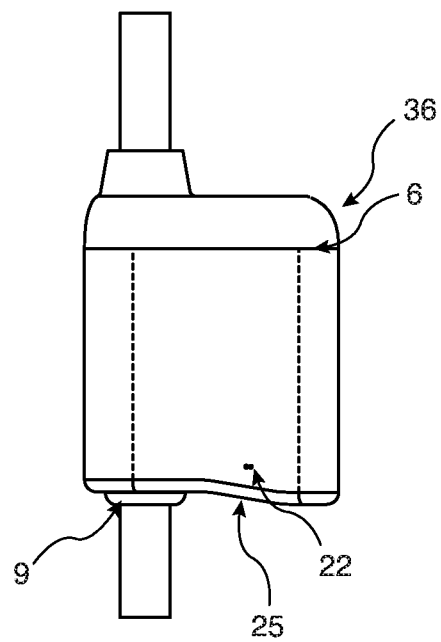
FIG. 7D. Side view of a closed design vertical valve application embodiment for new plumbing installations.

In certain embodiments, the features of the sensor unit 2 are placed in or on a sensor unit mount 17, as shown in FIG. 3B, FIG. 3C, and FIG. 3D. Features of the sensor unit 2 may affix to said sensor unit mount 17 such that features related to a sensor unit 2 are, as a whole, or in part, replaced with ease in relation to the container in embodiments of the invention. In certain embodiments, said sensor unit mount 17 comprises a printed circuit board (PCB), wherein the features of sensor unit 2 are electronically linked by the circuit board. Further, the embodiments of the sensor unit 2 shown in FIG. 3B, FIG. 3C, FIG. 3D and FIG. 6C are merely embodiments, and different sizes, shapes and arrangements of the features comprising a sensor unit 2 may be available. In some cases, such different sizes, shapes, and arrangements of the sensor unit, sensor unit mount, or related component may be necessary as to affix to certain embodiments of a container. In yet another embodiment, as shown in FIG. 5A, an open design vertical embodiment 30 may be placed in relation to a piping system in association with a fixture 29. In certain embodiments, as shown in FIG. 5B, an open design angle embodiment 31 may be placed in relation to a piping system in association with a fixture 29. In such embodiments, a leak from the piping system or fixture located above an embodiment may follow the path of a piping system, and collect within the encapsulated region or partially encapsulated region of container 1. In yet other embodiments, certain aspects of said embodiments are closed for purposes including, but not limited to aesthetics, fluid containment and fluid damage mitigation. As shown in FIG. 7A through FIG. 7D, said certain embodiment of the invention features an enclosed container 36, where an enclosed container encapsulates or partially encapsulates features of a piping system, such as a pipe 3 and a straight valve 4 in a vertical orientation. In such embodiments, installation of an enclosed container 36 to a piping system for retrofitting further involves a union of at least two container pieces 8 by joining said container pieces 8 at a joining edge 6 or a plurality of joining edges 6, as shown in FIG. 7B. In certain embodiments, a sensor unit affixes to an enclosed container 36 and senses fluid within or near an enclosed container 36 through a sensor opening 22 as shown in FIG. 7A, FIG. 7C and FIG. 7D. An enclosed container 36, in certain embodiments of the invention, and moreover, a sloped aspect 25 of an enclosed container 36, allows a leaking fluid to collect within a certain portion of an encapsulated area or partially encapsulated area of an enclosed container 36, thus allowing a sensor unit to detect a leak of a fluid from an aspect of a piping system as said leak occurs. Further, a gasket 9 placed between an enclosed container 36 and a pipe 3 or valve prevents the flow of a fluid through the interface between an enclosed container 36 and features of a piping system.

In a certain embodiment of an open design vertical valve retrofit application, at least one partial container piece fits together to fit on an aspect of a piping system that includes vertical valve, as shown in FIG. 26A. As shown in embodiments in FIG. 26B and FIG. 26C, two partial container pieces 8 are matingly joined at joining edges 6, where a partial container piece further includes a piping matching contour 51. Joining of partial container pieces 8 further creates an opening 11, as shown in an embodiment in FIG. 26B. In an embodiment as shown in FIG. 26D, a pipe-matching contour 51 of each partial container pieces 8 accommodates the shape of a gasket 9, where such gasket further surrounds a portion of a piping system such as a pipe 3, so that such gasket prevents flow of a fluid between partial container pieces 8 and a pipe 3. As further shown in FIG. 26B and FIG. 26E, embodiments of partial container pieces 8 are attached together with a fastening feature 37. In embodiments, a fastening feature 37 allows assembly of a plurality of container pieces in combination with one another, and may include a clasp, hook, latch, hose clamp, clip, magnets, and/or other fastening features as appreciated by those skilled in the art. Further, in some embodiments union of such joining edges 6 of partial container pieces 8 is achieved by an interference fit, and/or further placing a sealing material or coating between the faces of the joining edges.

In a certain embodiment of the invention, an enclosed container 36 is retrofitted to the form of existing piping system features, as further shown in FIG. 8A. An embodiment of an enclosed container 36 shown in FIG. 8A and FIG. 8B may include at least one container piece 8, wherein said container pieces 8 are attached together with a fastening feature 37. In embodiments of the invention, a fastening feature 37 allows assembly of a plurality of container pieces in combination with one another, and may include a clasp, hook, hose clamp, latch, clip, magnets, and/or other fastening features as appreciated by those skilled in the art. An embodiment of a fastening feature, such as a snap fit, as shown in FIG. 8F and FIG. 8G embodiment, engages more than one container piece together. An example of a snap fit has a flexible tab 44 of one partial container piece 8, such flexible tab being pliant, such flexible tab further containing a ridge-engaging tooth 86, engages when placed in a depression 45 of another partial container pieces 8.

As shown in FIG. 8A and FIG. 8C, two or more container pieces 8 joined together at the joining edges 6 can create the form of an enclosed container 36 embodiment. Further, an enclosed container 36 embodiment has openings 11, as shown in FIG. 8A and FIG. 8C, to accommodate some features of a piping system. As shown in FIG. 8D and FIG. 8E, the enclosed container 36 further accommodates features of a piping system, such as a pipe 3 or straight valve 4, or portions of an operating handle 7 enabling fluid sensing without limiting or encumbering the operation or actuation of said operation handle 7. As shown in FIG. 8A, FIG. 8B, and FIG. 8C, a certain embodiment of an enclosed container 36 has an adjustable face 109, where a portion or a whole of such adjustable face 109 may be removed to accommodate an operating handle stem 108 of different sizes and shapes. In other embodiments, an adjustable face 109 may be flexible and have the ability to stretch and accommodate different sized operating handle stems 108. As shown in FIG. 8A and FIG. 8B, a gasket 9 ensures that a fluid encapsulated by or partially encapsulated by an enclosed container 36 does not leak to the exterior of said container while accommodating the features of a piping system. In certain embodiments, a sensor unit or a sensor probe attached to a sensor opening 22 detects the fluid accumulating in the area encapsulated by or partially encapsulated by an enclosed container 36, notifying a user if a leak has occurred in the area associated with such enclosed container 36. In certain embodiments, as shown in FIG. 8D, and FIG. 8E, an enclosed container 36 encloses portions of a pipe 3 and a straight valve 4, and further keeps an operating handle 7 exposed. In such embodiments, a user can still control the flow of a fluid through a valve by turning said operating handle, without the need to remove the enclosed container 36. In certain embodiments, a sensor unit affixes to an enclosed container 36 and senses fluid within or near an enclosed container 36 through a sensor opening 22 as shown in FIG. 8A, FIG. 8C and FIG. 8D.

In yet another embodiment of the invention, features of a piping system, including an operating handle of a valve, are encapsulated. As shown in FIG. 9A, an operating handle container 39 further encapsulates an operating handle 7 associated with a valve. In some embodiments, one or more operating handle container waists 40 of an operating handle container 39, as shown in FIG. 9A, FIG. 9B, and FIG. 9C, enables a user to turn the operating handle that is enclosed by said operating handle container 39 while retaining the ability to collect a fluid within the area enclosed by such assembly. In such embodiment, an operating handle container 39 is coaxial with the axis of rotation of said operating handle 7 and an aperture of said enclosed container 36. In an embodiment of the invention, when a user turns an operating handle container 39 along a rotational axis, an operating handle container waist 40 interfaces with features of operating handle 7. For example, an elongated portion of said operating handle 7 interfaces with the operating handle container waist 40, such that a user can turn the operating handle container 39 thereby turning and actuation the operating handle 7 in order to control the flow of a fluid through a valve. In such embodiments, an operating handle container 39 is made of a rigid or semi-rigid material having the form capable of catching and turning an operating handle of a valve. Examples of a rigid material include any variety of plastics, polymers, rubber, and metal. In certain embodiments, a sensor unit affixes to an enclosed container 36 and senses fluid within or near an enclosed container 36 or an operating handle container 39 through a sensor opening 22 as shown in FIG. 9A, and FIG. 9B.

Figure 18A:
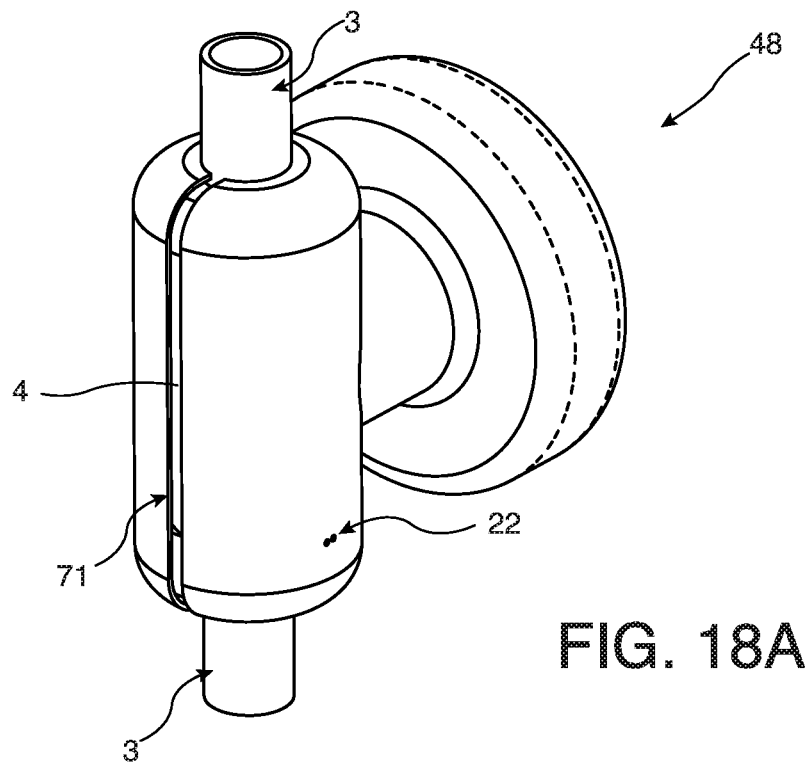
FIG. 18A. Perspective view of a flexible encapsulation assembly embodiment containing a slit on a pipe and valve.
Figure 18B:
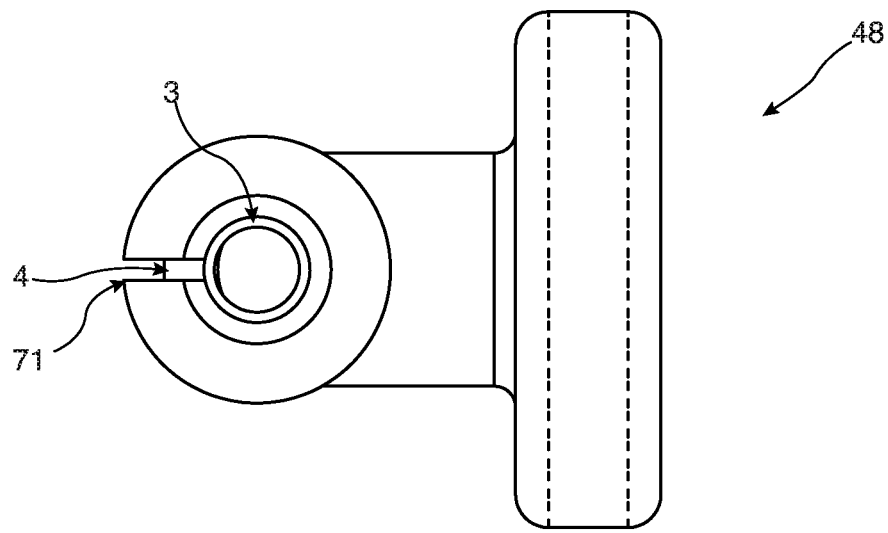
FIG. 18B. Top view of a flexible encapsulation assembly embodiment containing a slit on a pipe and valve.

In another certain embodiment of the invention, an encapsulating assembly may be made of a flexible material such that a user can turn a valve that is encapsulated by or partially encapsulated by such assembly. An embodiment of a flexible encapsulation assembly 48 fits the general form of a straight valve 4, as shown in FIG. 13A, FIG. 13B, FIG. 13C, FIG. 18A, and FIG. 18B. In other embodiments, a flexible encapsulation assembly may be used for other types of valves, such as an angled valve, or fitting, or other connections associated with a piping system. An embodiment of a flexible encapsulation assembly 48 may be made of a material that has elastic characteristics that a user's hand 49 can squeeze, and grip a portion of a piping system such as an operating handle 7, as to allow turning of an operating handle, as shown in FIG. 13B and FIG. 13C. Materials that embodiments of the invention may be made of include, but are not limited to rubber, silicone, elastomers, or a combination of such materials. In certain embodiments, a portion of a flexible encapsulation assembly may be comprised of one material, for example, a portion that covers the operating handle, while another portion of a flexible encapsulation assembly is comprised of another material, for example, a portion that covers a valve. In such cases, the portions of a flexible encapsulation assembly may be two distinct pieces assembled together, or dual injection molded. In an embodiment, a flexible encapsulation assembly 48 has a slit 71 that allows a flexible encapsulation assembly to fit over existing plumbing, such as a vertical valve 4 and pipe 3, as shown in FIG. 18A and FIG. 18B. Certain embodiments of a flexible encapsulation assembly 48 include a sensor opening 22 such that a sensor unit may be placed through a sensor opening 22 and detect a fluid encapsulated by or partially encapsulated by a flexible encapsulation assembly 48, as shown in FIG. 13A, FIG. 13C, and FIG. 18A.

Embodiments of the invention include implementation for horizontally orientated piping system features. A straight valve in the horizontal orientation, as shown in FIG. 10A can be encapsulated by or partially encapsulated by partial container parts in a certain embodiment including an enclosed straight container 42 or an enclosed straight container 42 and an enclosed straight cap 43. The joining edges 6 of an enclosed straight container 42 and an enclosed straight cap 43 are joined and secured with a fastening feature, such as a flexible tab 44 further containing a ridge-engaging tooth and depression 45, as shown in the exploded view of a certain embodiment in FIG. 10A comprising a potential snap-fit assembly feature. As further shown in an embodiment in FIG. 10B, a portion of a flexible tab 44, having a ridge-engaging tooth, fits in a depression 45, and a plurality of such fastening features secures an enclosed straight container 42 and an enclosed straight cap 43. It will be appreciated that such snap-fit assembly features enable ease of repetitive assembly and disassembly to enable installation, maintenance and quick access to the operating lever 7 as desired by the user. Further, as shown in FIG. 10A, FIG. 10B, FIG. 10C, FIG. 11A, and FIG. 11B, embodiments of partial container parts such as an enclosed straight container 42 and/or an enclosed straight cap 43 has a face seal 72 or more than one face seal along a joining edge 6 so that the interface between joining edges is sealed. It will be appreciated that embodiments of a face seal may comprise of one or more materials including but not limited to materials polymeric, metallic, and/or organic in nature. Some examples of materials used in the manufacture of face seals include but are not limited to rubber, nitrile, buna, neoprene, silicone, metal or a plastic polymer such as polytetrafluoroethylene (PTFE), polyether ether ketone (PEEK), urethane, or ethylene propylene. In certain embodiments of the invention, a face seal is a material such as rubber or silicone or a combination of such materials or other materials having sealing properties known to persons having skill in the art. Further, embodiments of a joining edge may be further sealed with a sealant, where a sealant is a substance blocking a passage of a fluid including on a surface or between edges or in openings, generally known to those having skill in the art. Examples of sealants include, but are not limited to silicone sealant, rubber sealant, polyurethane sealant, latex sealant, sealcoat, foam, adhesive sealant, or polytetrafluoroethylene, among others.

Figure 10D:
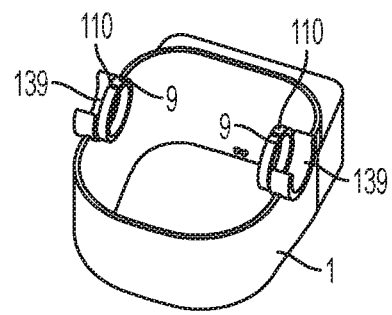
FIG. 10D. Perspective view of an open container embodiment with pipe attachment.
Figure 11A:
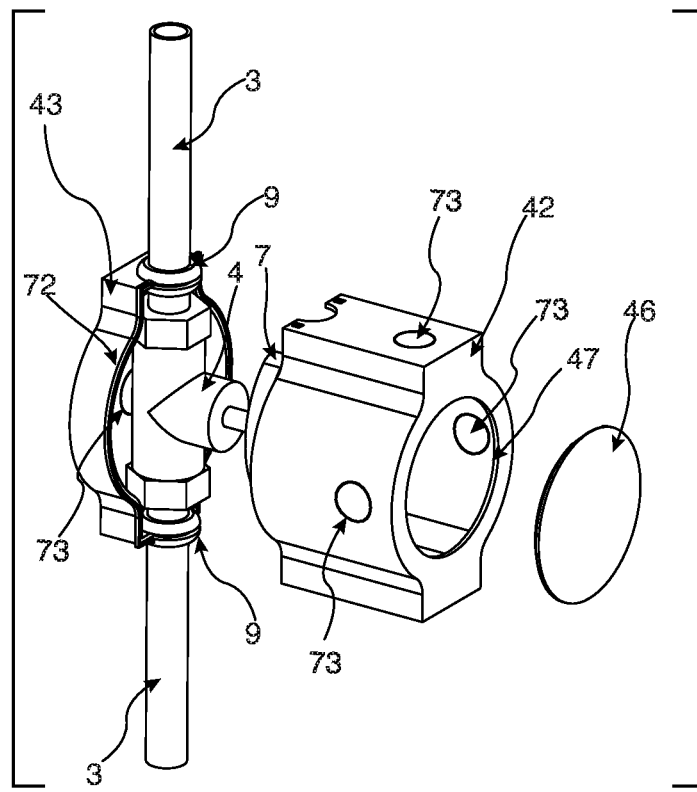
FIG. 11A. Exploded perspective view of an enclosed straight container embodiment and an enclosed straight cap embodiment attached to a straight valve in a vertical orientation, further showing an access port and access panel.
Figure 11B:
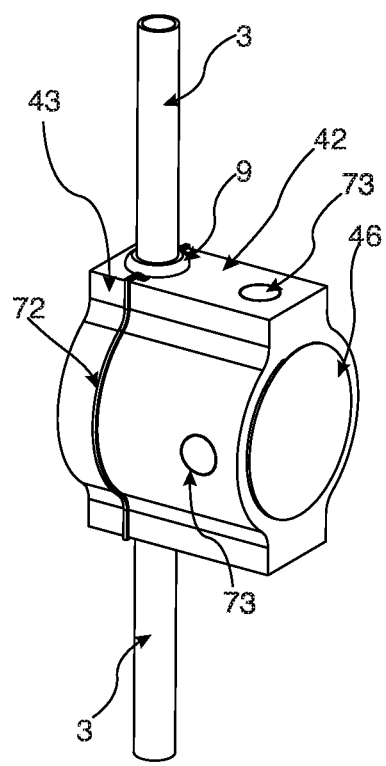
FIG. 11B. Perspective view of an enclosed straight container embodiment and an enclosed straight cap embodiment attached to a straight valve in the vertical orientation, further showing an access panel.

As shown in FIG. 10A, FIG. 11A, and FIG. 11B, a gasket 9 embodiment is placed on a piping system feature, such that when an enclosed straight container 42 and an enclosed straight cap 43 are fastened together around a pipe 3, the gasket seals a piping matching contour 51 of an enclosed straight container 42, piping matching contour 51 of an enclosed straight cap 43 and the pipe 3 as shown in an embodiment in FIG. 10A. Those skilled in the art can appreciate that embodiments of the invention may be implemented on valves in a number of different ways. For instance, the operating handle of a straight valve in the horizontal orientation may be found or installed at any angle of rotation, relative to the longitudinal axis of a piping system. In such case, embodiments of the enclosed straight container and enclosed straight cap, and other features of other embodiments may be oriented in a way to accommodate various angles of rotations of piping features. For instance, as shown in FIG. 10C, an embodiment of an enclosed straight container and an enclosed straight cap are placed at an angle. Further, while FIG. 10C provides an embodiment where a sensor unit 2 is placed on an enclosed straight cap 43, those skilled in the art would appreciate that a sensor unit 2 may be placed in a number of different locations of an enclosed straight container or an enclosed straight cap, as to accommodate the various angles and orientations that an enclosed straight container and an enclosed straight cap are set.

As shown in in FIG. 10A, FIG. 10B, FIG. 10C, FIG. 11A, and FIG. 11B, certain embodiments of an enclosed straight container 42 and/or an enclosed straight cap 43 have a removable piece 73 or a plurality of removable pieces. In some cases, for new plumbing installations, removable piece 73 may be removed from enclosed straight container 42 and/or an enclosed straight cap 43, and features of a piping system may be placed through an aperture that is left behind by such removal of removable piece 73. Having a removable piece has a number of added benefits to embodiments of the invention, such as being able to create one particular design of an embodiment of the invention that can fit any number of piping system configurations, such as junctions that are angled. Further, such removable piece, when removed from an enclosed straight container 42 and/or an enclosed straight cap 43, may serve as an additional opening for an additional pipe, hose, sensor unit or other objects to access an area encapsulated by an enclosed straight container 42 and/or an enclosed straight cap 43. It will be appreciated that other embodiments of the invention, including but not limited to an enclosed straight container 42 and/or an enclosed straight cap 43, may include a removable piece 73 or a plurality of removable pieces 73.

Figure 10E:
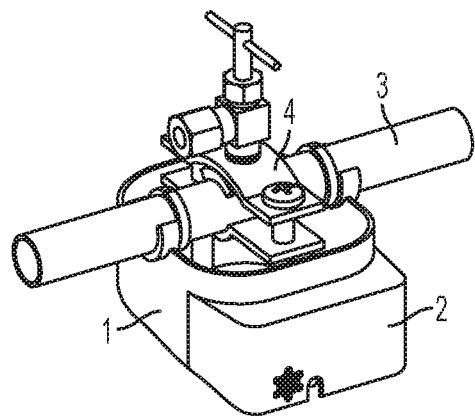
FIG. 10E. Perspective view of open container of 10D attached to pipe.

In another embodiment, referring to FIGS. 10D and 10E, container 1 may include gasket 9 and/or elastomeric seal 139 to allow container 1 to be attached to pipe 3 beneath valve 4. Gasket 9 has slit 110 to allow the gasket to be slipped around pipe 3 to sealingly attach container 1 to pipe 3 in retrofit applications. Elastomeric seal 139 may also be included alone or with gasket 9 to snap onto pipe 3 and allow container 1 to be attached thereto as shown in FIG. 10E. Fluid leaks from valve 4 may drip into container 1 and be detected by sensor unit 2.

As further shown in FIG. 11B, embodiments of the enclosed straight container and enclosed straight cap may be used for straight valves in the vertical orientation. In certain embodiments, an enclosed straight container includes a partial container part comprising an access port 47 that enables a user to access an operating handle 7 or other aspects of a straight valve 4 by removing an access panel 46, rather than requiring the disassembly of the container, as shown in FIG. 11A. As shown in the embodiments in FIG. 11A and FIG. 11B, the access port 47 and access panel 46 are located on aspects of the enclosed straight container 42. It will be appreciated that other embodiments of the invention, including, but not limited to an enclosed straight container 42 and/or an enclosed straight cap 43, may include an access port and access panel or a plurality of access ports and access panels. By including an access port, users are able to, for instance, shut off or open valves that may be enclosed by certain aspects of the invention. Further, by enclosing aspects of a piping system, any leaks of a fluid may be captured within the encapsulated area or partially encapsulated area of such assembly as to quickly detect leaks from a piping system.

In various embodiments of the invention, an access panel covers an access port in different ways. As shown in FIG. 19A, FIG. 19B, and FIG. 19C, showing a certain embodiment in a cross sectional view, an access panel 46 fits within the opening of an access port 47. In a certain embodiment of the invention, an access panel and access port come together in a press-fit assembly, allowing repetitive assembly and disassembly for quick access to an operating lever 7 as desired by the user. As shown in FIG. 19A, FIG. 19B and FIG. 19C, placing an access panel 46 to cover access port 47 includes locating a portion of an access panel 46, comprising a lid gasket 74, on access port 47. A lid gasket 74, having similarity with other gaskets known to those skilled in the art, comprises a flexible material. In certain embodiments of the invention, an access panel, and related components such as a lid gasket and an access port interface is of the same material. However, it can be appreciated that an access panel and/or an access port interface is an inflexible material such as certain plastics, certain recycled or recyclable plastic, metal, wood, polymers, among others, and a lid gasket comprises a flexible material. It will be appreciated that embodiments of a lid gasket is made of one or more materials including but not limited to materials polymeric, metallic, and/or organic in nature. Some examples of materials used in the manufacture of a lid gasket include but are not limited to rubber, nitrile, buna, neoprene, silicone, metal or a plastic polymer such as polytetrafluoroethylene (PTFE), polyether ether ketone (PEEK), urethane, or ethylene propylene. In certain embodiments of the invention, a lid gasket is a material such as rubber or silicone or a combination of such materials or other materials having sealing properties known to persons having skill in the art.

As shown in a close-up view of an access panel/access port assembly 76 of an access panel attachment site embodiment in FIG. 19A, FIG. 19B and FIG. 19C, an access panel 46 further includes an access port interface 75 having a perimeter with a shape and size similar to an access port. As shown in FIG. 19B, an access port interface 75 fits inside an access port, and a lid gasket 74 protrudes and follows the contour of an access port interface 75, thus a lid gasket seals the interface between an access panel and access port, as further shown in FIG. 19C. In certain embodiments of the invention, an access panel includes a tab 77, as shown in FIG. 19A, FIG. 19B, FIG. 19C, and FIG. 19D so that there is a gripping and/or leverage feature for removal of an access panel from an access port. In certain embodiments, an access panel includes a plurality of tabs, or a tab that spans the perimeter of an access panel.

Figure 12A:
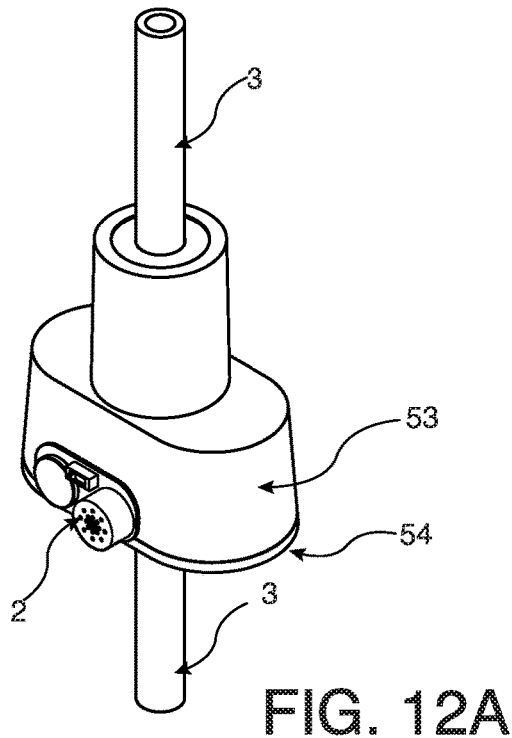
FIG. 12A. Perspective view of a closed design vertical fitting application embodiment.
Figure 12B:
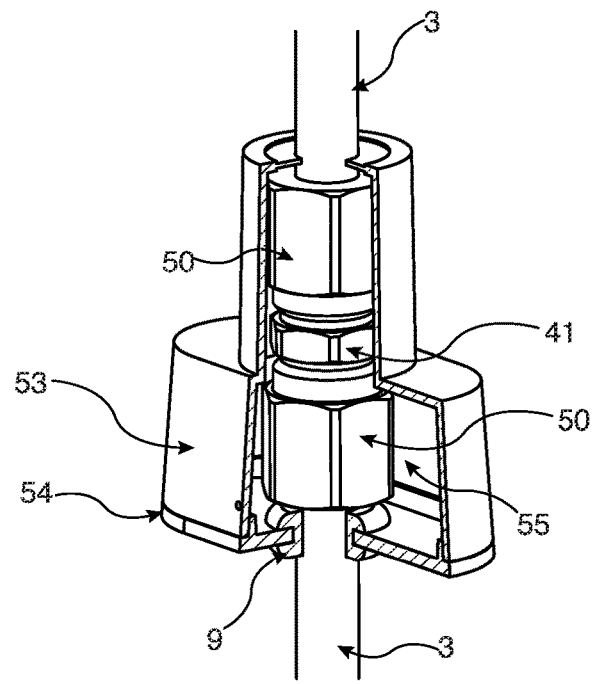
FIG. 12B. Perspective partial sectional view of a closed design vertical fitting application embodiment with fitting and pipes.
Figure 12C:
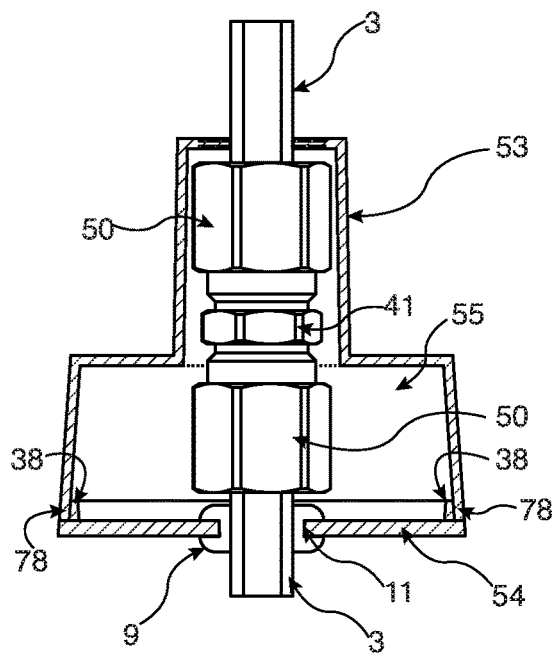
FIG. 12C. Side cross-sectional view of a closed design vertical fitting application embodiment with fitting and pipes.
Figure 12D:
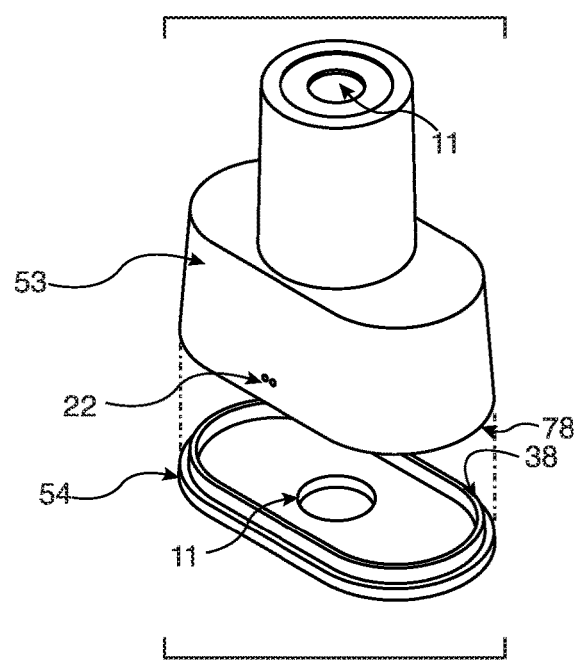
FIG. 12D. Exploded view of a closed design vertical fitting application embodiment.

In other aspects, connections are associated with a number of other types of piping systems that carry other types of fluids. Certain embodiments of the invention detect leaks from other aspects of a piping system, such as a pipe connection. As shown in FIG. 12A, FIG. 12B, and FIG. 12C, an embodiment of a closed design vertical fitting application encapsulates or partially encapsulates a certain type of pipe connection, and detects leaks associated with a certain type of pipe connection. As shown in FIG. 12B, and FIG. 12C, an exemplary fitting such as a compression fitting further includes components such as a coupling 41, compression ring, compression seat, pipe 3 and compression nut 50. As shown in FIG. 12D, an enclosed vertical fitting cover 53 further fits over a fitting, and affixes to a vertical fitting container base 54 embodiment to encapsulate or partially encapsulate a fitting. As shown in FIG. 12D, an enclosed vertical fitting cover 53 embodiment affixes to a vertical fitting container base 54 embodiment by an interference fit, such as a tapered interference fit. In an embodiment of the invention, a vertical fitting base 54 that includes a wedge 38 forms a tapered interference fit with a inner edge 78 of an enclosed vertical fitting cover 53, as shown in FIG. 12C. Embodiments of a vertical fitting container base 54 include a hole 11 that accommodates gasket 9, as shown in FIG. 12C, wherein a central opening of a gasket 9 further accommodates a pipe 3 or other features of a piping system. An embodiment of an enclosed vertical fitting cover 53 includes an opening in which a pipe 3 or other features of a piping system fits. An embodiment of an enclosed vertical fitting cover 53 also includes a sensor opening 22, to which a sensor unit 2 can attach, as shown in FIG. 12D and FIG. 12A. The three-dimensional shape of an enclosed vertical fitting cover 53 and a vertical fitting container base 54 together create a space 55 surrounding a fitting. Leaks of a fluid from a fitting or a pipe in the area of a space 55 are collected within a space 55 and detected by a sensor unit 2.

Figure 14A:
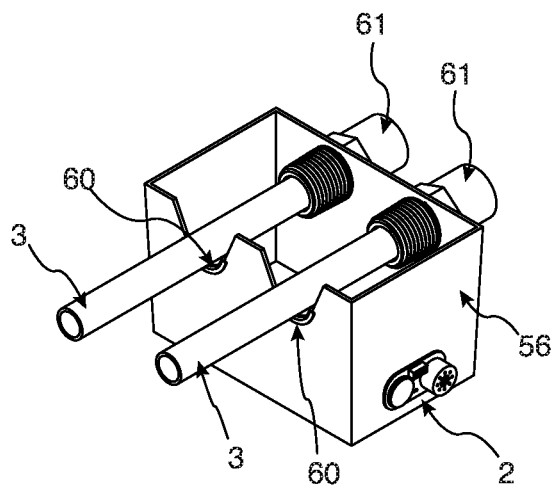
FIG. 14A. Perspective view of a dual horizontal connector application embodiment without a lid.
Figure 14B:
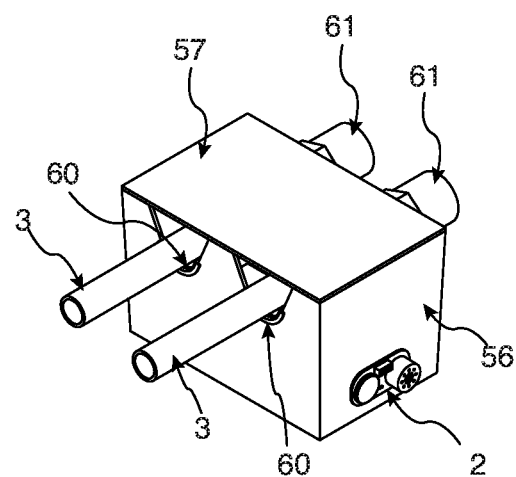
FIG. 14B. Perspective view of a dual horizontal connector application embodiment with a lid.
Figure 14C:
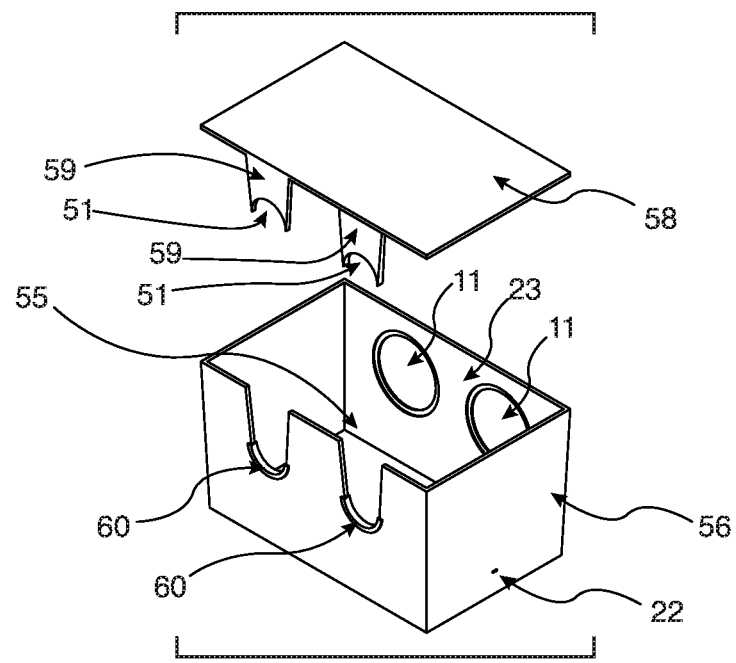
FIG. 14C. Exploded perspective view of a dual horizontal connector application embodiment with a stabilization lid.

In a certain embodiment of the invention, leaks from more than one connection may be detected. In an exemplary embodiment shown in FIG. 14A, FIG. 14B, and FIG. 14C, a dual horizontal connector container 56 accommodates a plurality of connectors, such as a plurality of horizontal fittings 61. As shown in FIG. 14C, a horizontal fitting 61 passes through an opening 11 found on a container wall 23 of an embodiment of a dual horizontal connector container 56. A pipe 3 extending from a horizontal fitting 61 further rests on a hose protector 60 of a dual horizontal connector container 56 embodiment, as shown in FIG. 14A, FIG. 14B, and FIG. 14C A certain embodiment features a dual horizontal connector lid 57, as shown in FIG. 14B that is placed on the top portion of a dual horizontal connector container 56 embodiment. In another embodiment, a dual horizontal connector lid with stabilizers 58 has stabilizers 59, and such stabilizer further contains a piping matching contour 51, as shown in FIG. 14C, as to fit around pipe 3. A dual horizontal connector container 56 embodiment has a sensor opening 22 that a sensor unit 2 can attach, as shown in FIG. 14A, FIG. 14B, and FIG. 14C. The three-dimensional shape of a dual horizontal connector container 56 embodiment and a dual horizontal connector lid 57 or a dual horizontal connector lid with stabilizers 58 together create a space 55 surrounding a fitting, as exemplified in FIG. 14C. Leaks of a fluid from a fitting or a pipe in the area of a space 55 is collected within a space 55 and detected by a sensor unit 2, in certain embodiment of the invention.

Figure 21A:
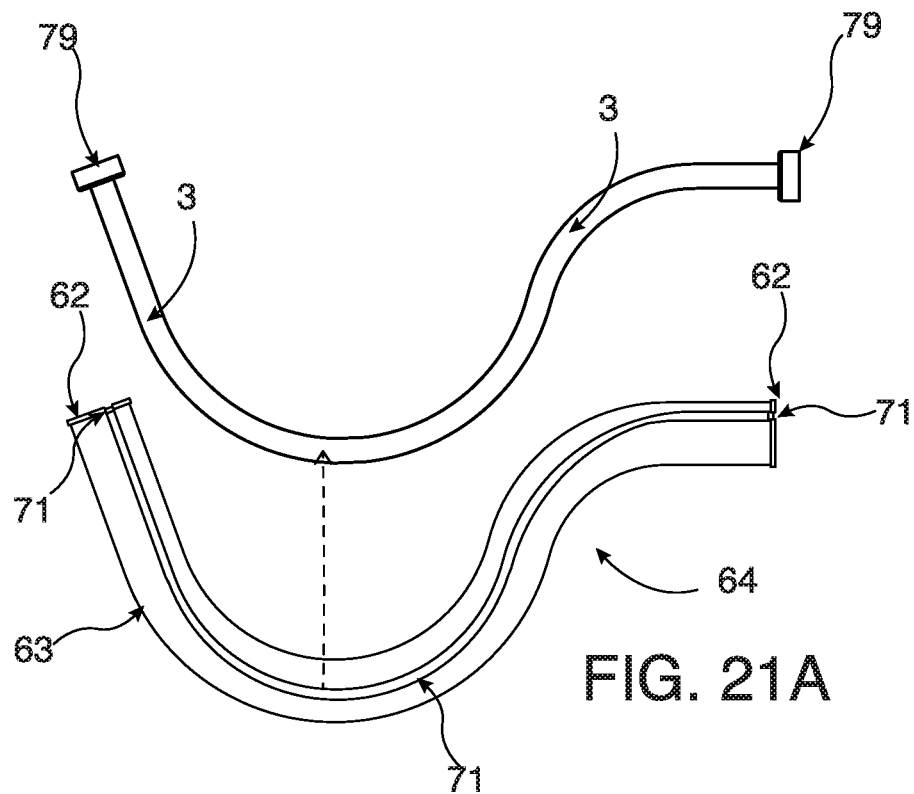
FIG. 21A. Side-view of a sleeve with a slit embodiment attaching to a portion of a piping system.
Figure 21B:
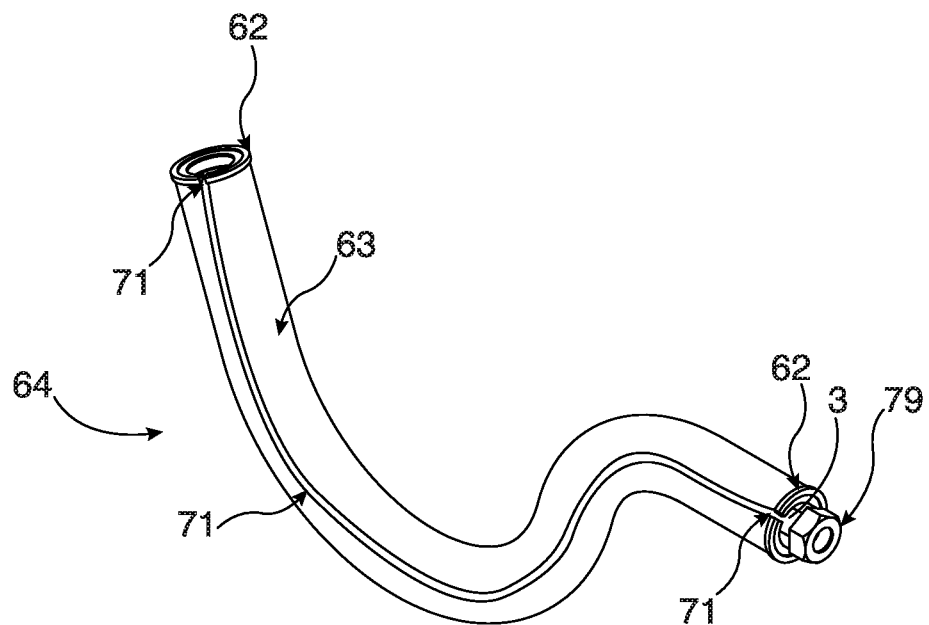
FIG. 21B. Perspective view of a sleeve with a slit embodiment on a portion of a piping system.

In certain cases, a leak from a piping system component can travel along another piping system component. For instance, in one example, a leak in a one piping system component, such as a connector, valve, or junction, or within a pipe or hose itself, can travel along an associated pipe or hose. In a certain embodiment of the invention, a leak of a fluid that travels along an associated pipe or hose is further collected with a sleeve 64. In certain embodiments, as shown in FIG. 15A, FIG. 15B, FIG. 15C, FIG. 15D, and FIG. 15E, a sleeve 64 allows the expansion and contraction of the span of plumbing monitored by the invention. Certain embodiments include one or more ring plates 62 and a bellows 63 enabling the expansion and contraction along the axis of the opening 11 while allowing articulation along multiple axes. As shown in FIG. 15A, a sleeve 64 is assembled with a ring plate 62 attached to a both ends of a bellows 63. As shown in FIG. 15D and FIG. 15E, an embodiment of a bellows 63 has a tubular form having an opening larger than the piping system component that a bellows 63 encapsulates or partially encapsulates. In a certain embodiment, a bellows 63 has pleats 65, as shown in FIG. 15C, as to compact a bellows 63. In embodiments of the invention, a bellows 63 is made of a material such as plastic, recycled or recyclable plastic, silicone, foam, metal, and/or rubber, among others. In a certain embodiment, a bellows 63 is made of a non-rigid material impermeable to a fluid. Further, a bellows end 66 is affixed to a ring plate 62, as shown in FIG. 15E, for example, with an adhesive. In another embodiment, a bellows end is grasped using features of a ring plate 62, such as a bellows end inserted between two or more partial ring plate pieces and such partial ring plate pieces secured to one another. In a certain embodiment, a bellows 63 has a slit 71, where such embodiment of a sleeve 64 can be installed on existing piping systems or existing plumbing, as shown in FIGS. 16A, 16B 21A and 21B. In such certain embodiment, a bellows 63 is made of a material such as silicone, rubber, foam, plastics, recycled materials, metal, and other materials. In a certain embodiment, a slit 71 in bellows 63, as shown in FIGS. 16A, 16B, 21A and 21B is closed by a self-clinging material such as silicone, or an adhesive such as tape, self-adhesive coating, caulk, glue, or a fastening mechanism for two sides of such slit such as buttons, zippers, snap fasteners, hook-and-loop, may be used to collect and detect a fluid potentially leaking from a piping system. Further, in certain embodiments as shown in FIGS. 16A, 16B, 21A and 21B, a ring plate 62 further includes a slit 71, where the entire sleeve assembly 64 is able to fit over an existing piping system or existing plumbing, as shown in FIG. 21A.

Figure 20A:
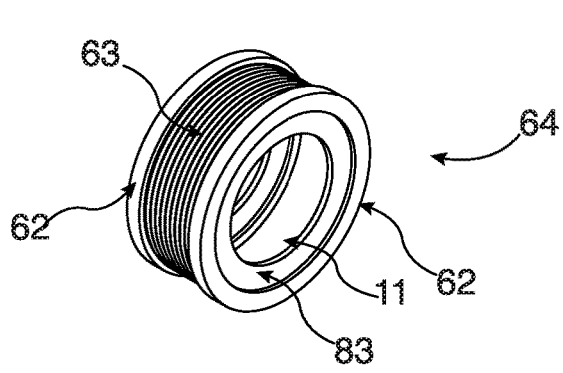
FIG. 20A. Perspective view of a contracted sleeve with ring plates embodiment.
Figure 20B:
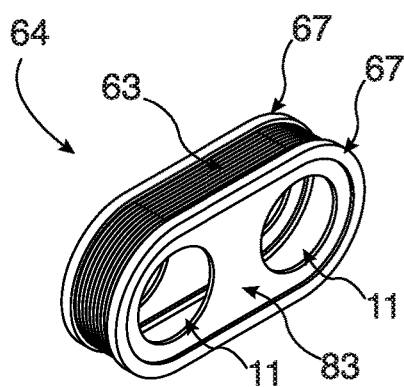
FIG. 20B. Perspective view of a contracted sleeve with two-opening plates embodiment.
Figure 20C:
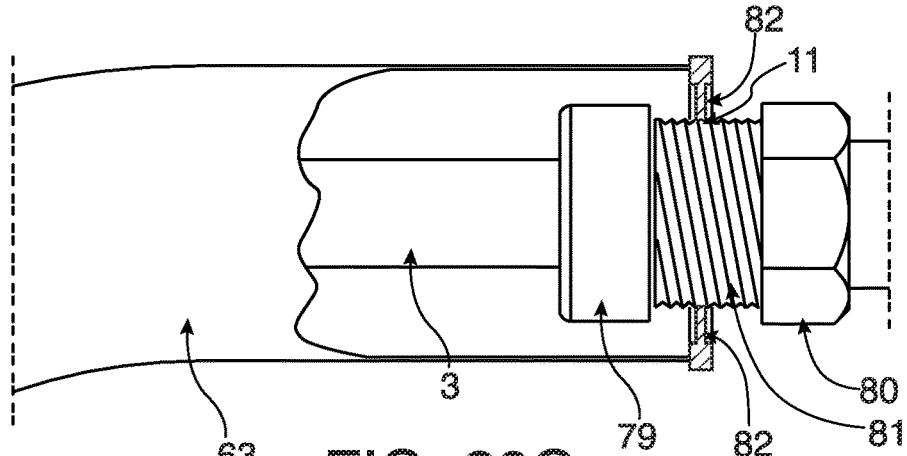
FIG. 20C. Side sectional view of an expanded sleeve embodiment on a portion of a piping system, where a ring plate is one piece.
Figure 20D:
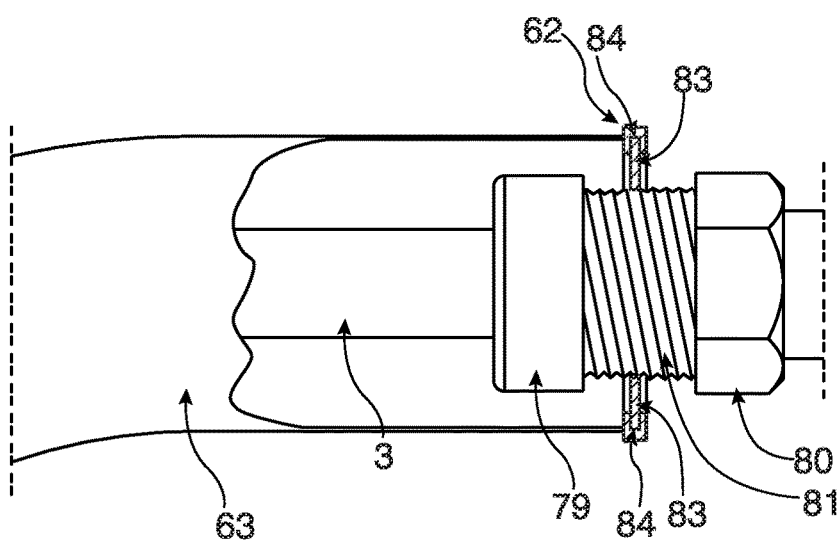
FIG. 20D. Side sectional view of an expanded sleeve embodiment on a portion of a piping system, where a ring plate includes a partial ring plate piece and a membrane.
Figure 20E:
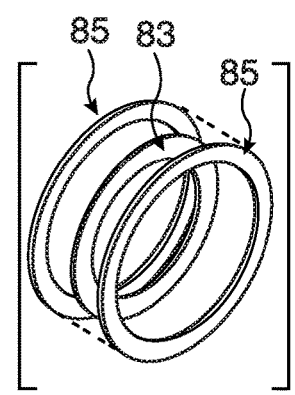
FIG. 20E. Exploded view of a ring plate embodiment comprising a partial ring plate piece and membrane.

Certain embodiments of a ring plate 62 or two-opening plate 67 has a membrane 83, as shown in FIG. 20A, FIG. 20B, and FIG. 20C. Embodiments of a membrane is made of a flexible material, where a membrane has one or more materials including but not limited to materials polymeric, metallic, and/or organic in nature. Some examples of materials used in the manufacture of a membrane include but are not limited to rubber, nitrile, buna, neoprene, silicone, metal or a plastic polymer such as polytetrafluoroethylene (PTFE), polyether ether ketone (PEEK), urethane, or ethylene propylene. In certain embodiments of the invention, a membrane is a material such as rubber or silicone or a combination of such materials or other materials having flexible properties. As shown in FIG. 20A, an embodiment of a ring plate 62 includes a membrane 83, where a membrane 83 has an opening to accommodate features of a piping system. As shown in a cross-sectional view of an embodiment of a ring plate 62 in FIG. 20D, a ring plate 62 includes a membrane housing 84 on the interior region of such ring plate. A membrane 83 placed within a membrane housing 84 keeps a membrane 83 in place while a user installs a sleeve over aspects of a piping system. In an embodiment of the invention, a ring plate further comprises a partial ring plate piece 85. As illustrated in FIG. 20E, a membrane 83 is contained between two partial ring plate pieces 85. In certain embodiments, a bellow may also be placed between such partial ring plate pieces as to secure a ring plate assembly to a bellow. In some embodiments, a ring plate, or a two opening plate lacks a membrane. In some embodiments, a ring plate 62, or a two opening plate 67 has a functional characteristic of a membrane. As shown in FIG. 20C, a membrane ring plate 82 may serve the function similar as a ring plate, attaching to bellows and having an opening 11 to accommodate features of a piping system, such as the threaded region 81 of a male adapter 80.

Pulling two ring plates 62 apart, hence pulling a bellows along its longitudinal axis, as shown in an embodiment in FIG. 15D, expands the region of a piping system that a sleeve 64 encapsulates or partially encapsulates, as shown in FIG. 15E. In certain embodiments, a sleeve 64 is secured to features of a piping system by fastening a ring plate between a female adapter 79 and male adapter 80, as shown in FIG. 20C and FIG. 20D. An opening 11 of a ring plate 62 or a two-opening plate 67 accommodates a threaded region 81 of a male adapter 80, and such ring plate 62 or a two-opening plate 67 is secured by screwing a male adapter 80 to a female adapter 79 where such female adapter 79 has threading corresponding to a threaded region 81 of a male adapter 80. It is appreciated that a female adapter, as known in the art, can accommodate a male adapter, where an example of a female adapter can include a threaded nut. In another certain embodiment, a caulk, sealant, cement, glue, tape, or other adhesive is placed on a surface of a ring plate 62 or a two-opening plate 67, and such ring plate 62 or a two-opening plate 67 is pressed against a surface to seal the interface between such ring plate 62 or a two-opening plate 67 and such surface.

In certain embodiments, a ring plate comprises an opening. Embodiments of a ring plate are not limited to a form resembling a circle or toroid, as other shapes, such as an ellipse, polygon, arbelos, superelipse, oval, ovoid, asteroid, and others comprising an opening may be used. In a certain embodiment, a sleeve 64 or a portion of a sleeve 64 includes more than one opening to accommodate more than one piping system component or more than one piping system line, as shown in FIG. 16A, FIG. 16B, FIG. 16C, FIG. 16D, and FIG. 16E. For instance, as shown in FIG. 16A, FIG. 16B, FIG. 16C, FIG. 16D, and FIG. 16E, a sleeve embodiment 64 has a double-opening plate 67 located at each distal end of a bellows 63, where such double-opening plate has two openings. In other embodiments, a ring plate may include one or more piping matching contours. In exemplary drawings FIG. 16C and FIG. 16D, an appliance 29 has two pipes 3 connected to two respective shut-off valves 68, further shown with a wall-mounted assembly 69, where one pipe 3 may be located adjacent to another pipe 3. A sleeve 64 embodiment, as shown in FIG. 16A and FIG. 16B may further have one or more two-opening plates 67, where such two-opening plate contains two openings 11. In a certain embodiment of a sleeve 64, adjacently located pipes 3 are fitted through each of the openings 11 of the sleeve 64 assembly, as shown in FIG. 16D during installation of such pipes or appliance. Because embodiments of the bellows 63 is collapsed, a user may pull each two-opening plate 67, and expand the region of a piping system that a sleeve 64 encapsulates or partially encapsulates, as shown in FIG. 16E. In some embodiments a slit 71 as shown in FIG. 16A may be included in sleeve 64, including plates 67 and bellows 63, to allow sleeve 64 to be retrofit onto two pipes 3. That is, slit 71 allows plate 67 and bellows 63 to be opened to allow pipes 3 to slide through slit 71 into opening 11 such that sleeve 64 and could then be expanded over the length of pipes 3.

In embodiments of the invention, a sensor unit 2 may be placed on a sleeve 64, as shown in FIG. 15E. In one example, a sensor opening may be created along a bellows 63 and accommodate a sensor feature or part of a sensor feature, as to detect leaks along a pipe. In such case, such sensor opening receives a portion of a sensor unit, such as sensor probes, to detect fluid in an area encapsulated by a sleeve. In another example, a sensor unit may be water-resistant for applications where a fluid is water or water-based, such that such sensor unit may be placed within an area encapsulated by a sleeve, and still function when a fluid comes in contact with such sensor unit. In such embodiment, a leaking fluid along a piping system captured by a sleeve, may be detected by a sensor unit and a notification sent to a user.

Figure 31A:
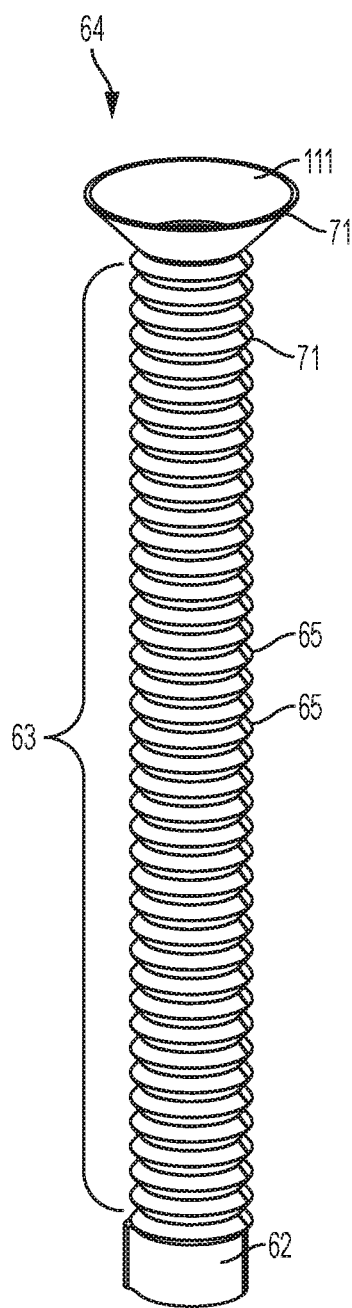
FIG. 31A. Perspective view of sleeve.

FIG. 31 illustrates an alternate embodiment. Referring to FIG. 31A, a sleeve 64 is shown in an expanded state with bellows 63 including pleats 65. In this embodiment, a slit 71 extending along the entire length of sleeve 64 permits easy retrofitting of sleeve 64 over existing fluid conduit systems such as a piping system. Slit 71 extends along a sleeve funnel 111 at the upper end of sleeve 64 and a ring cup 62 at lower end of sleeve 64. Sleeve 64 may be made of an elastomeric material such that sleeve 64 may be separated along slit 71 to allow sleeve 64 to fit around the existing piping system without disconnecting the piping system to allow easy retrofit installation on existing systems.

Figure 31B:
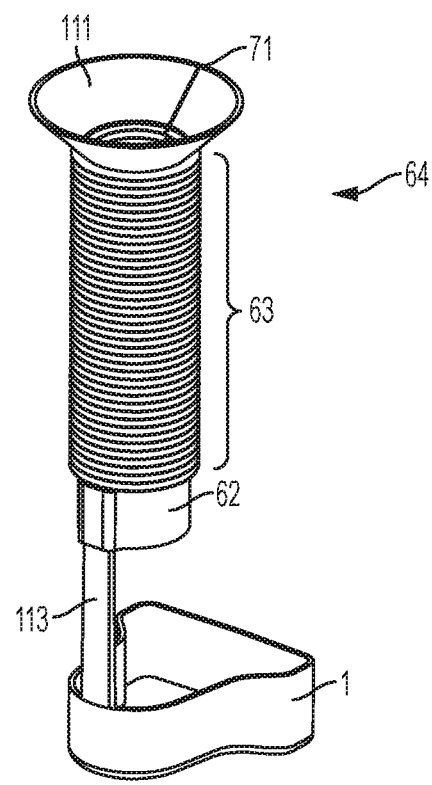
FIG. 31B. Perspective view of sleeve and container.

Referring to FIG. 31B, sleeve 64 is shown in combination with container 1. In this embodiment, sleeve 64 may be separated along slit 71 to fit over an existing piping system and container 1 may be assembled below ring plate 62 in two pieces as previously described or may be a deformable container to fit around piping system as will also be described herein. Container 1 may be connected to, or otherwise releasably associated with, ring plate 62 by connecting arm 113 such that container 1 and sleeve 64 may or may not be installed together and function as a single unit or they may function separately with separate sensors 2.

As shown in FIG. 31C, the combination of sleeve 64 and container 1 may be assembled over pipe 3 such that slit 71 faces away from the expected path of any leaking water or other fluid. For example, slit 71 is kept above pipe bend area 112 to allow any leaking fluid from funnel 111 to be transported by gravity into container 1. Similarly, any leaking fluid from straight valve 4 would also be deposited in container 1. Sleeve funnel 111 at the upper portion of sleeve 64 allows leaking fluid from the fixture connection 114 in piping system 3 (for example to the fixture 29 in FIG. 5) to be caught by funnel 111 and transported by gravity into sleeve 64 and thence to container 1.

FIG. 31D is a side view of the embodiment shown in FIG. 31C. Sleeve 64 and container 1 are shown installed adjacent pipe 3. Container 1 is located under valve 4 and sleeve 64 such that water or other fluid from pipe 3 or other fixture connections 114 may be transported into container 1 and detected as described herein. Container 1 includes gasket 9 to ensure a seal of container 1 around pipe 3. Gasket 9 may be a split seam gasket so as to be snapped around pipe 3 separately or it may be in two portions which are each built into a portion of container 1 and seal when container 1 is assembled onto pipe 3. For new builds or installations, gasket 9 may be slipped over piping 3 along with, or as part of, container 1, prior to connection of the piping.

Figure 22A:
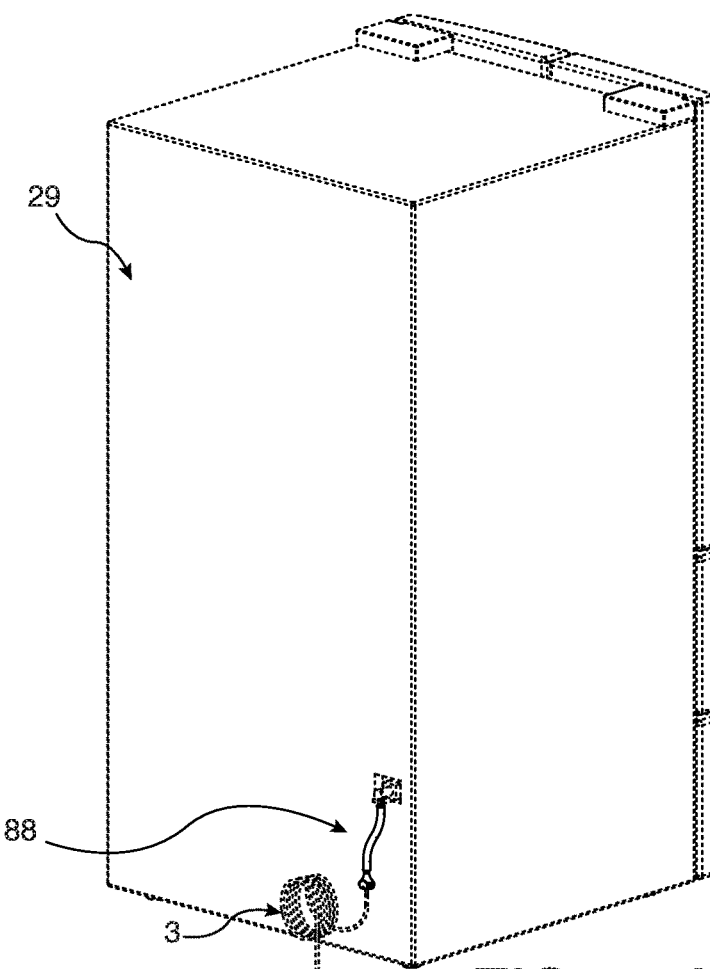
FIG. 22A. Perspective view of an appliance with a sleeve and container assembly embodiment.
Figure 22B:
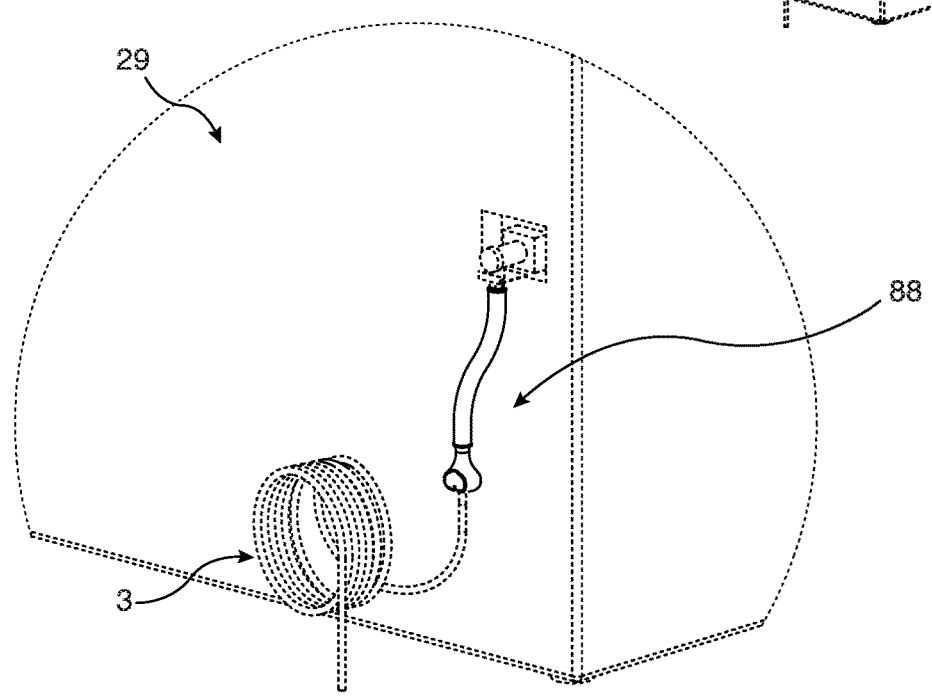
FIG. 22B. Close-up perspective view of an appliance with a sleeve and container assembly embodiment.

In other embodiments of the invention, a fluid from a piping system is detected in combination with a sleeve as shown in FIG. 22A and FIG. 22B. A sleeve and container assembly 88 includes the features of a sleeve, which expands to encapsulate features of a piping system, and a closed design vertical container, which further includes an encapsulated area that retains fluid leaked from such piping system. A sensor unit 2 detects and alarms a leak of a fluid from such piping system. In certain embodiments such as shown in FIGS. 22A and 22B, a sleeve and container assembly 88 (including 32 as shown in FIGS. 17 A-E) is associated with a fixture 29 by the original equipment manufacturer (OEM) of the fixture. By associating with fixture 29, a sleeve and container assembly 88 is able to detect leakage of a fluid going into or going out of a fixture, for example, through an associated pipe, junction, connection, hose, valve and other components related to a piping system. It should be expressly understood that all embodiments described herein may be built into a fixture 29 by the manufacturer. For example, manufacturers of refrigerators, washing machines, dish washers, water fountains, coffee makers, ice makers, and industrial pumps and valves may build the embodiments described herein into the fixture as part of the manufacturing process. As also described herein, various embodiments may also be retrofitted after manufacture.

Figure 17A:
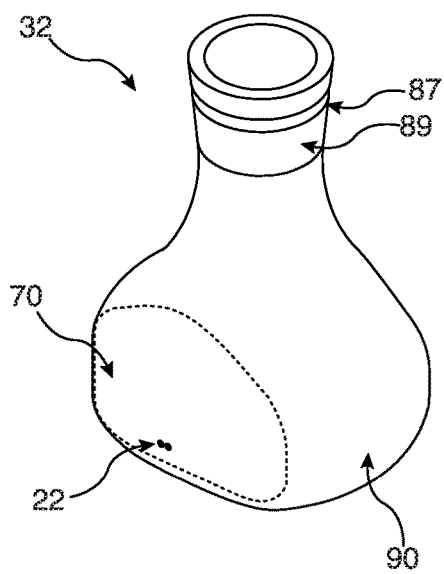
FIG. 17A. Perspective view of a closed design vertical container embodiment.
Figure 17B:
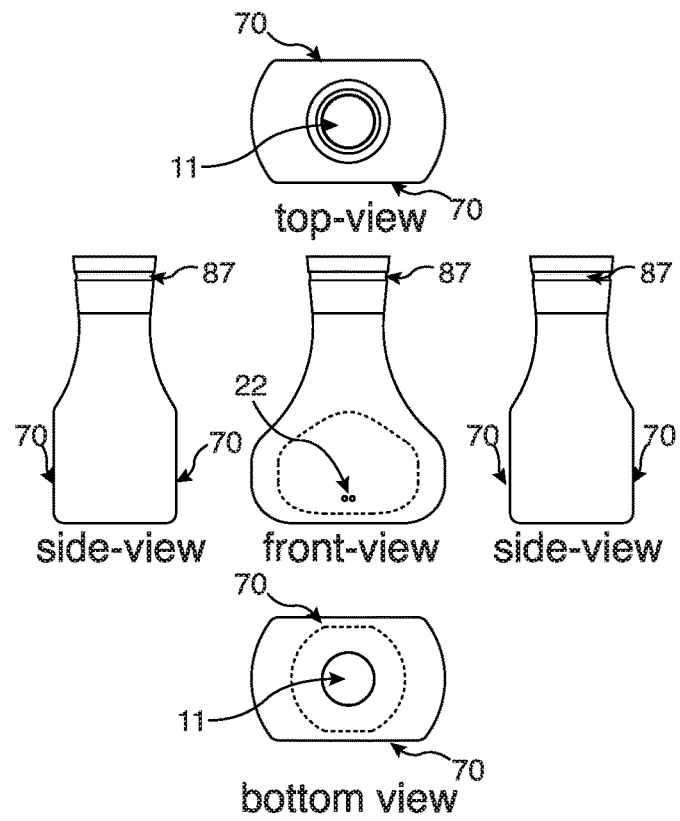
FIG. 17B. Front, top, bottom, and side views of a closed design vertical container embodiment.
Figure 17C:
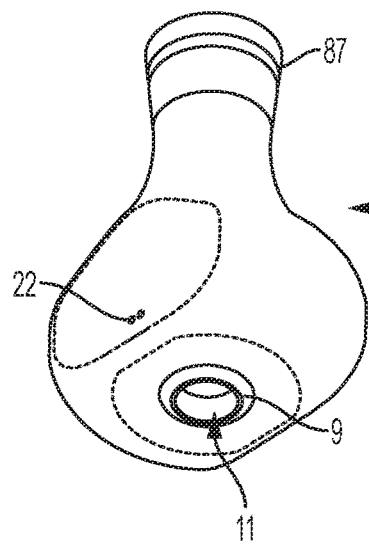
FIG. 17C. Bottom perspective view of a closed design vertical container embodiment.
Figure 17D:
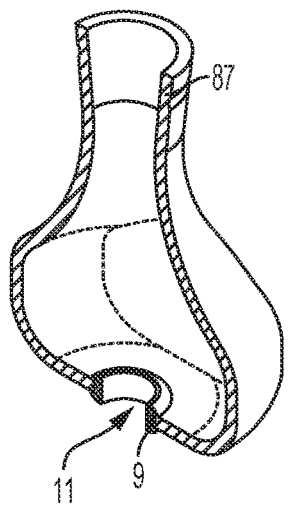
FIG. 17D. Sectional perspective view of a closed design vertical container embodiment.
Figure 17E:
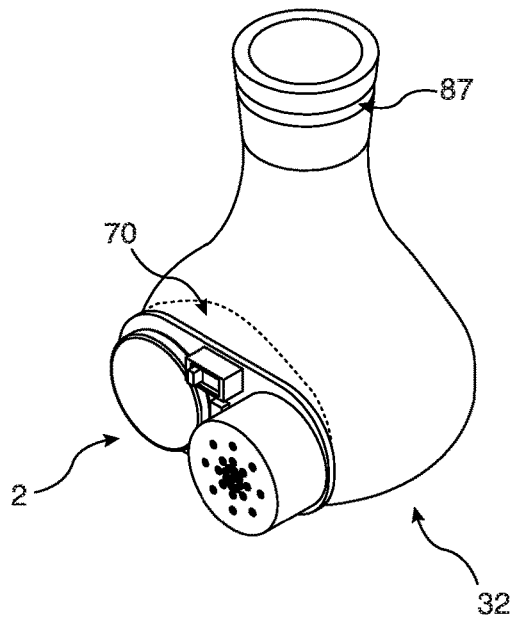
FIG. 17E. Perspective view of a closed design vertical container embodiment with a sensor unit.

A closed design vertical container 32, in certain embodiments of the invention, is shown in FIG. 17A, FIG. 17C, FIG. 17D, and FIG. 17E. As shown in FIG. 17A and FIG. 17E, a sensor unit 2 can attach and detect fluid leakage within an area encapsulated by a closed design vertical container 32 by placement of a sensor probe through a sensor opening 22, where a sensor opening 22 is located within a flat aspect 70 of such closed design vertical container 32. A closed design vertical container 32 includes an opening 11 located at the bottom, as shown in FIG. 17B and FIG. 17C, and an opening at the top, as shown in FIG. 17A, FIG. 17B, and FIG. 17E. Therefore, in certain embodiments of the invention, a passage is created through the closed design vertical container 32 as shown in a cross-sectional view of an embodiment shown in FIG. 17D, such that a feature of a piping system, such as a pipe, pipe, junction, connection, hose, valve and other components related to a piping system passes through such passage associated with a closed design vertical container 32. In certain embodiments, a gasket 9 may be placed on one or more openings 11 adjacent piping 3. In other embodiments, a closed design vertical container 32 comprises a flexible material having sealing properties when pressed against features of a piping system. In certain embodiments, an unsealed region between an opening and a feature of a piping allows water to pass from one region to another region. In one example, an opening gap 91 allows fluid from a bellows 63 region of a sleeve to pass into a closed design vertical container 32, as shown in FIG. 23D, so that such fluid can be detected by a sensor unit 2 shown in FIG. 23D, associated with closed design vertical container 32. It is appreciated that in embodiments of the invention, a fluid accumulates within the area encapsulated by a container assembly 88 including a closed design vertical container 32 and a sleeve 64, as shown in an embodiment in FIG. 23B, and it is advantageous having a gasket or seal 9 at some openings 11, and having an unsealed region at some openings as to regulate the flow of a fluid through certain embodiments of the invention.

In certain embodiments of the invention, a closed design vertical container 32 further includes a closed design vertical container neck 89 and a closed design vertical container body 90, as shown in FIG. 17A. In such embodiments, a closed design vertical container neck 89 and a closed design vertical container body 90 are made of a same material. In other embodiments, a closed design vertical container neck 89 and a closed design vertical container body 90 are made of different materials. A closed design vertical container neck 89 may be fixed, attached, fit, or otherwise adhered reversibly or irreversibly to a closed design vertical container body 90 or dual-injection molded. In other embodiments, a closed design vertical container neck 89 and a closed design vertical container body 90 is a single piece.

A groove 87 is located near the top of a closed design vertical container 32, as shown in certain embodiments in FIG. 17A, FIG. 17B, FIG. 17C, FIG. 17D, and FIG. 17E. In certain embodiments, a groove is located on a closed design vertical container neck 89. In embodiments of the invention, a groove being able to accommodate a mating portion having a shape and size that fits such groove, may be found on a number of interfaces, such as between a closed design vertical container 32 and a sleeve, or between two joining edges, among other interfaces that join two pieces. In embodiments of the invention, such groove and mating portion may form a gasketing interface as to prevent fluid flowing through such interface.

Figure 23A:
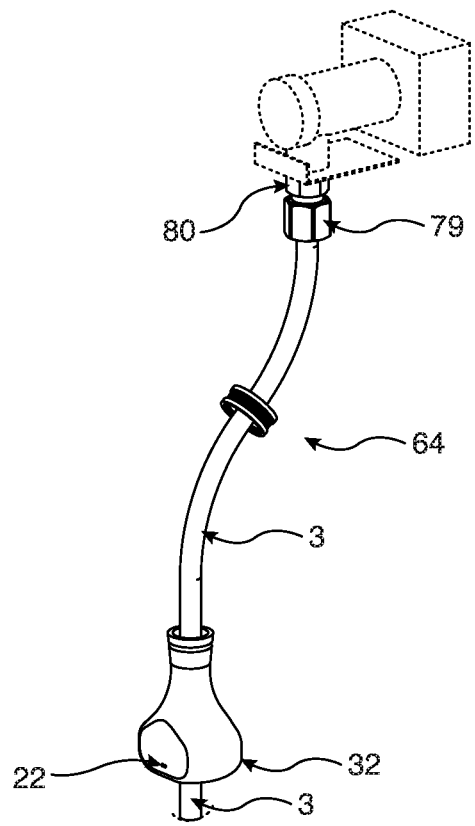
FIG. 23A. Perspective view of a sleeve and container assembly embodiment installed on a piping system, where a sleeve is contracted.
Figure 23B:
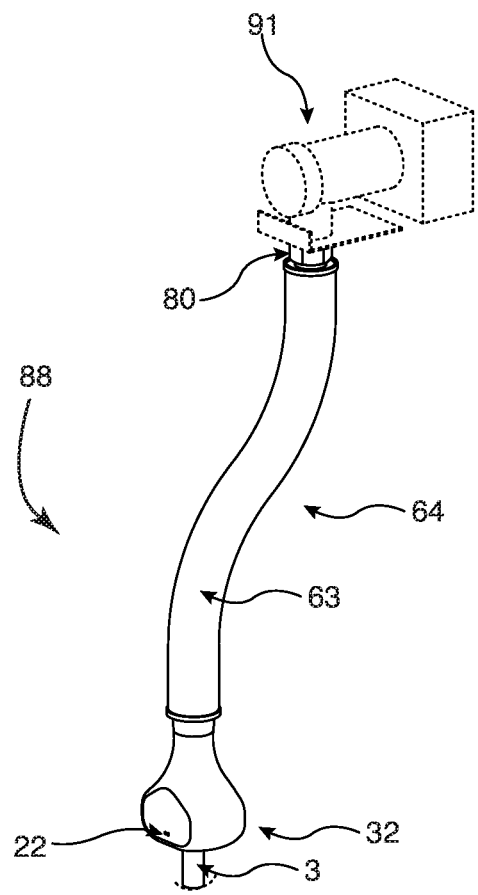
FIG. 23B. Perspective view of a sleeve and container assembly embodiment is installed on a piping system, where a sleeve is expanded.
Figure 23C:
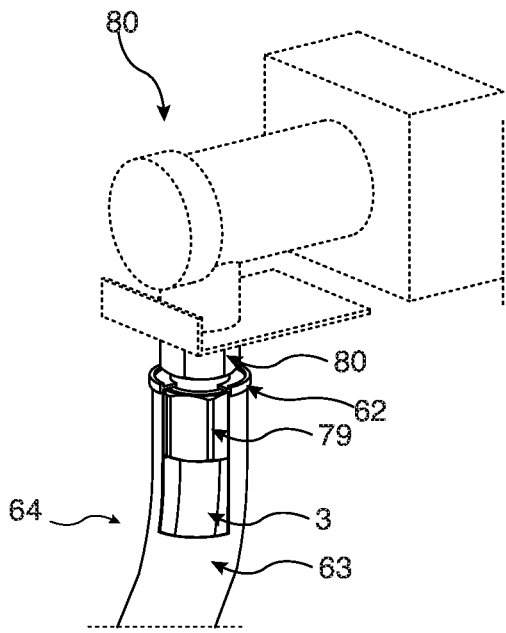
FIG. 23C. Close-up sectional view of an embodiment of a sleeve attaching to a junction.
Figure 23D:
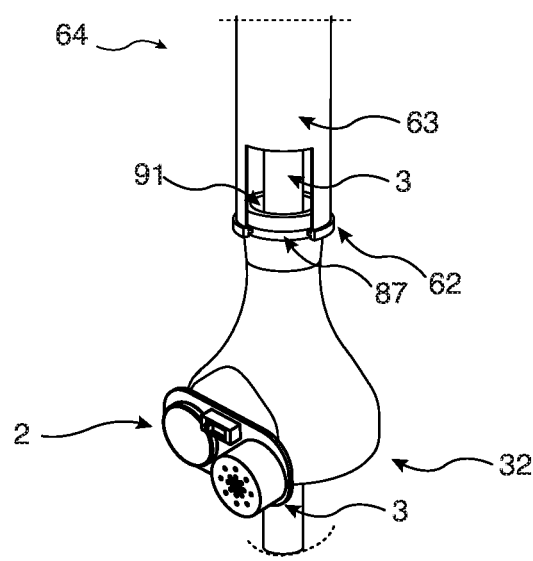
FIG. 23D. Close-up sectional view of an embodiment of a sleeve attaching to a closed design vertical container.
Figure 24A:
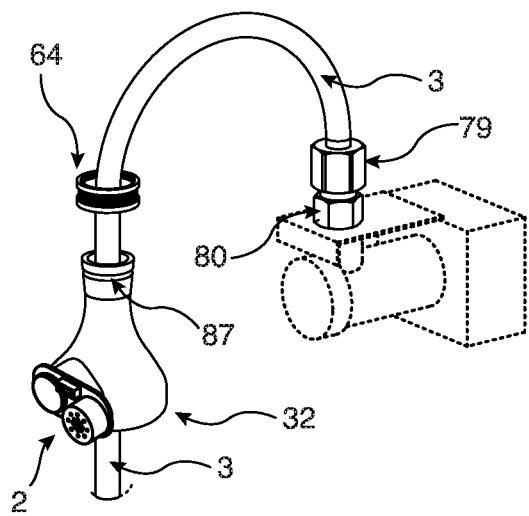
FIG. 24A. Perspective view of a sleeve and container assembly embodiment with a contracted sleeve, installed on a curved piping system.
Figure 24B:
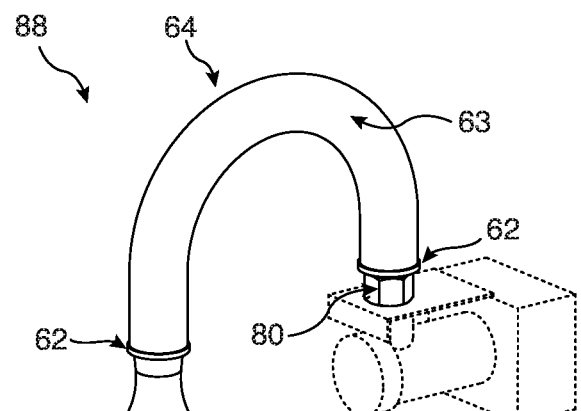
FIG. 24B. Perspective view of a sleeve and container assembly embodiment with an expanded sleeve, installed on a curved piping system.

As shown in FIG. 23A, FIG. 23B, FIG. 23C, FIG. 23D, FIG. 24A, FIG. 24B, FIG. 24C, and FIG. 24D, an embodiment of a sleeve 64 attaches to a closed design vertical container 32. For example, during a new plumbing installation, a closed design vertical container 32 and a sleeve 64 are placed over a pipe 3, as shown in FIG. 23A and FIG. 24A. In such example of a plumbing installation, a pipe junction may further include components of a fitting that can be disassembled from a pipe, for example, female adapters, male adapters, nuts, ferrules, o-rings, compression fittings and others known by those skilled in the art. By disassembly such components, a closed design vertical container 32 can slide over a pipe. A ring plate 62 further comprising a membrane 83, which may be flexible, as shown in FIG. 20A, may be slipped over existing features of a piping system such as a female adapter 79 or male adapter 80 shown in FIG. 23B and FIG. 24B. It can be appreciated that a membrane 83 having flexibility enables a user to fit over and further create a seal or a partial seal as to encapsulate a portion of a piping system with certain embodiments of the invention. Further, a sleeve 64 which is contracted, as shown in FIG. 23A and FIG. 24B, can be expanded over a portion of a piping system, as shown in FIG. 23B and FIG. 24B. In certain embodiments of the invention, a ring plate 62, as shown in FIG. 23C, is fitted between features of a piping system, such as between a male adapter 80 and a female adapter 79, where for example, a male adapter may screw into a female adapter. It will be appreciated that the orientation of such adapters is not necessarily of importance, and such junction may further include, but are not limited to components such as couplings, compression nuts, o-rings, crimp-rings, and others. It will also be appreciated that other features of a piping system, including but not limited to compression fittings, valve stems, nuts, and other components may be used to affix a sleeve 64 or a portion of a sleeve 64 embodiment to such piping system.

Further, a sleeve affixes to a closed design vertical container 32, as shown in FIG. 23D, where a ring plate 62 embodiment fits with a groove 87 embodiment of a closed design vertical container 32. Together, a sleeve and container assembly 88, as shown in an embodiment in FIG. 23B or FIG. 24B, encapsulates an area related to a piping system, and detects fluid leaking from such piping system. Thus, certain embodiments of a sleeve 64 affixing to a closed design vertical container 32, increases the potential encapsulating area that a sensor unit, associated with such closed design vertical container 32, detects.

Figure 24C:
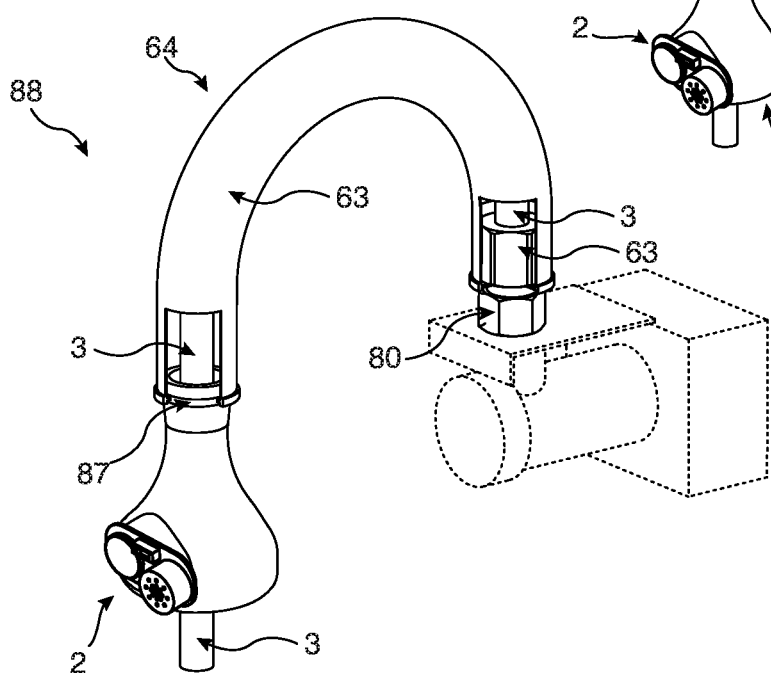
FIG. 24C. Partial cutaway view of an embodiment of a sleeve attaching to a junction and closed design vertical container.
Figure 24D:
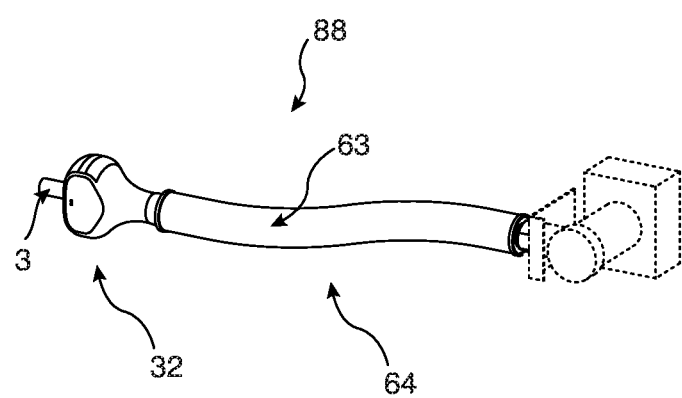
FIG. 24D. Perspective view of a sleeve and container assembly embodiment with an expanded sleeve, installed on a horizontal piping system.

In certain embodiments of a sleeve and container assembly 88, such sleeve and container assembly may be arranged in a number of different orientations. As shown in FIG. 24A, FIG. 24B, and FIG. 24C, a piping system may include a pipe 3 attached to a junction, where a portion of a pipe is curved. In certain embodiments of the invention, a sleeve and container assembly 88 includes a sleeve 64 having a flexible bellows 63 that can follow the path of a pipe 3. Further, in certain embodiments a sleeve and container assembly 88 seals and encapsulates such junction and a portion of a piping system. In such a case, as shown in FIG. 24B, A possible fluid leaking from an adapter travels within an encapsulated area of a bellows to a closed design vertical container 32, where a sensor unit 2 detects the presence of a fluid. In embodiments of the invention, such sleeve and container assembly 88 allows detection of a fluid from a piping system oriented in different ways, such as in a horizontal orientation, as shown in FIG. 24D, vertical orientation, as shown in FIG. 23A, FIG. 23B, FIG. 23C, and FIG. 23D, as well as any other multitude of directions and orientations in space.

Figure 27A:
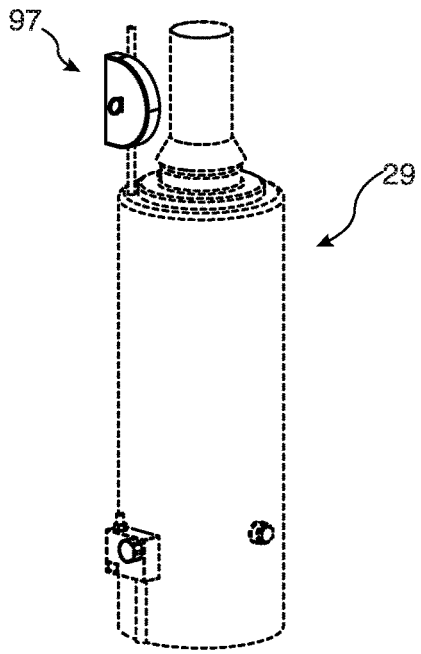
FIG. 27A. Perspective view of an appliance with a lever valve container embodiment.
Figure 27B:
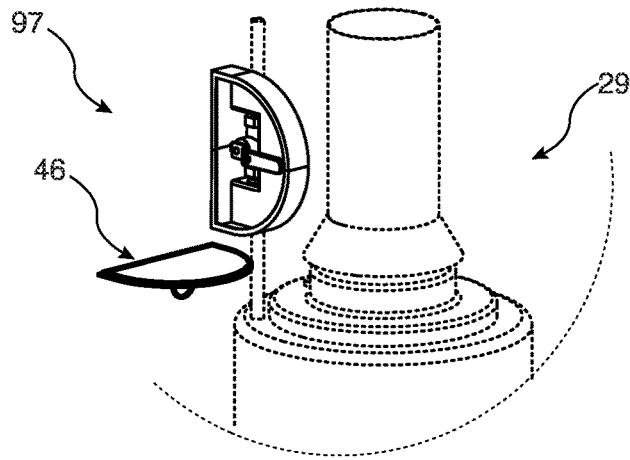
FIG. 27B. Perspective view of a lever valve container embodiment with an access port removed.
Figure 27C:
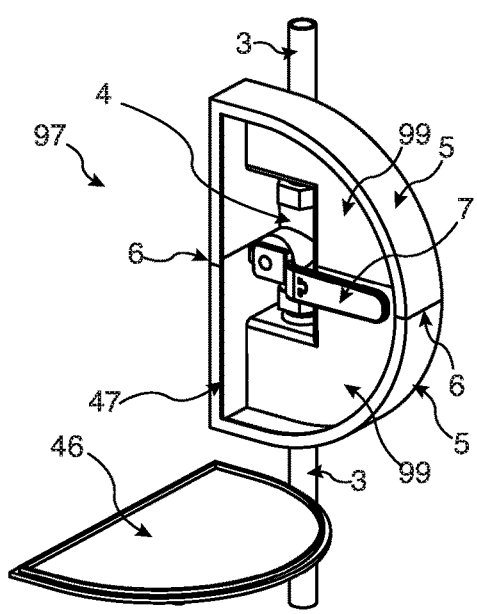
FIG. 27C. Perspective view of a lever valve container embodiment with an access port removed.

In certain embodiments, a fluid from a piping system is detected from a valve having a lever-type operating handle. As shown in FIG. 27C, a lever valve container 97 embodiment encapsulates or partially encapsulates a lever-type operating handle 7. In some cases, as shown in FIG. 27A and FIG. 27B, a lever valve container 97 embodiment may be associated with a lever-type operating handle further associated with a fixture 29. In a certain embodiment, a lever valve container 97 further contains more than one lever valve partial container piece 99, as shown in FIG. 27C and FIG. 28A. Such lever valve partial container pieces 99 are joined at a joined edge 6, as shown in FIG. 27C, FIG. 27D, FIG. 28A, FIG. 28B, FIG. 28C, and FIG. 28D. In other embodiments such as for new builds, lever valve container 97 may be one-piece construction. In certain embodiments, union of such joining edges is achieved by an interference fit, and/or further placing a sealing material or coating between the faces of such joining edges. Such sealing materials may include a face seal, or a flexible material having gasketing properties, such as a singular segment of flexible or semi-rigid gasket material, a plurality of flexible gasket material, a plurality of semi-rigid gasket material or a plurality of rigid gasket material to form a full gasket around the perimeter or segment of a perimeter of a joining edge. Such materials include, but are not limited to nitrile, buna, neoprene, foam, silicone, metal or a plastic polymer such as polytetrafluoroethylene (PTFE), polyether ether ketone (PEEK), urethane, or ethylene propylene. Such sealing materials may also include a sealant.

Figure 27D:
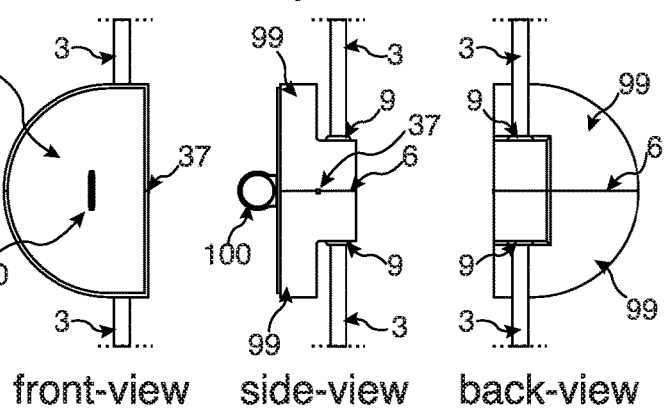
FIG. 27D. Top-view, front-view, side-view, and back-view of an embodiment of a lever valve container embodiment on a portion of a piping system.

As shown in FIG. 28A, one or more partial container pieces 99 are joined at a joining edge 6 and further secured with one or more fastening features 37, as shown in embodiments in FIG. 27D and FIG. 28C. An embodiment of such fastening feature, such as a snap fit, as shown in FIG. 28C, shows one embodiment where a flexible tab 44 of one partial container piece 99, such flexible tab being pliant, such flexible tab further containing a ridge-engaging tooth 86, engages when placed in a depression 45 of another partial container pieces 99. Further, in a certain embodiment, a lever valve container 97 or a lever valve partial container piece 99, has a shaped region 5 that accommodates the movement of a operating handle 7 as shown in FIG. 27C, FIG. 28A, and FIG. 28B.

Figure 27E:
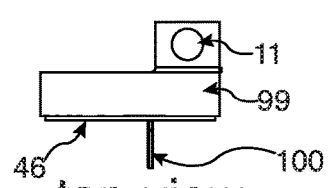
FIG. 27E. Top-view of lever valve container embodiment.

A lever valve partial container piece 99 accommodates portions of a piping system, such as a pipe 3, through an opening 11 shown in FIG. 27E. Such opening 11 further accommodates a gasket 9, as shown in FIG. 27D, FIG. 28A, and FIG. 28B. In this manner, portions of a piping system, such as pipes 3 a valve 4 and an operating handle 7 are encapsulated by a lever valve container 97 or a lever valve container 97 further comprising a lever valve partial container piece 99 and an access panel 46, as shown in FIG. 27C and FIG. 28A.

As shown in FIG. 27C, in an embodiment of the invention, fitting of more than one lever valve partial container piece 99 together creates an access port 47. In an embodiment, an access panel 46 is secured to an access port 47 of a lever valve container 97 or an access port created by more than one lever valve partial container piece 99 by an interference fit, as shown in FIG. 28D. In certain embodiments of the invention, union of such access panel and access port is achieved by an interference fit, and/or further placing a sealing material or coating between the faces of an access port and access panel. For instance, in an embodiment of the invention shown in FIG. 28D, a wedge 38 of an access panel 46 forms an interference fit with an inner edge 78 of a lever valve partial container piece 99. In an embodiment of the invention, such wedge 38 is made of a flexible material having gasketing properties, such as a singular segment of flexible or semi-rigid gasket material, a plurality of flexible gasket material, a plurality of semi-rigid gasket material or a plurality of rigid gasket material to form a full gasket around the perimeter of an access port or perimeter of an access panel. Such materials include, but are not limited to nitrile, buna, neoprene, foam, silicone, metal or a plastic polymer such as polytetrafluoroethylene (PTFE), polyether ether ketone (PEEK), urethane, or ethylene propylene. In certain embodiments, an access panel 46 includes a handle 100, as shown in FIG. 27D, FIG. 27E, FIG. 28A, and FIG. 28C, so that such access panel 46 may be removed by pulling such handle 100. A handle, commonly known, aids in movement of an object. A handle embodiment may be a portion of an access panel, such as a protruding aspect of an access panel, attached to an access panel, for example, by fasteners such as screws, rivets, or bolts, or attached by welding or soldering, or otherwise be part of an access panel. In an embodiment, a handle may be an aperture located on an aspect of an access panel that allows a user's hand, finger, or another material to grab onto such access panel to allow access to an area encapsulated or partially encapsulated by certain embodiments of the invention.

Figure 29A:
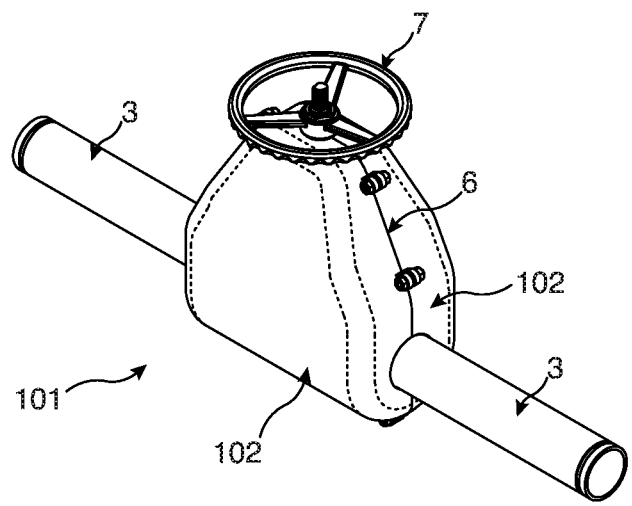
FIG. 29A. Perspective view of an industrial application embodiment on a portion of a piping system.
Figure 29B:
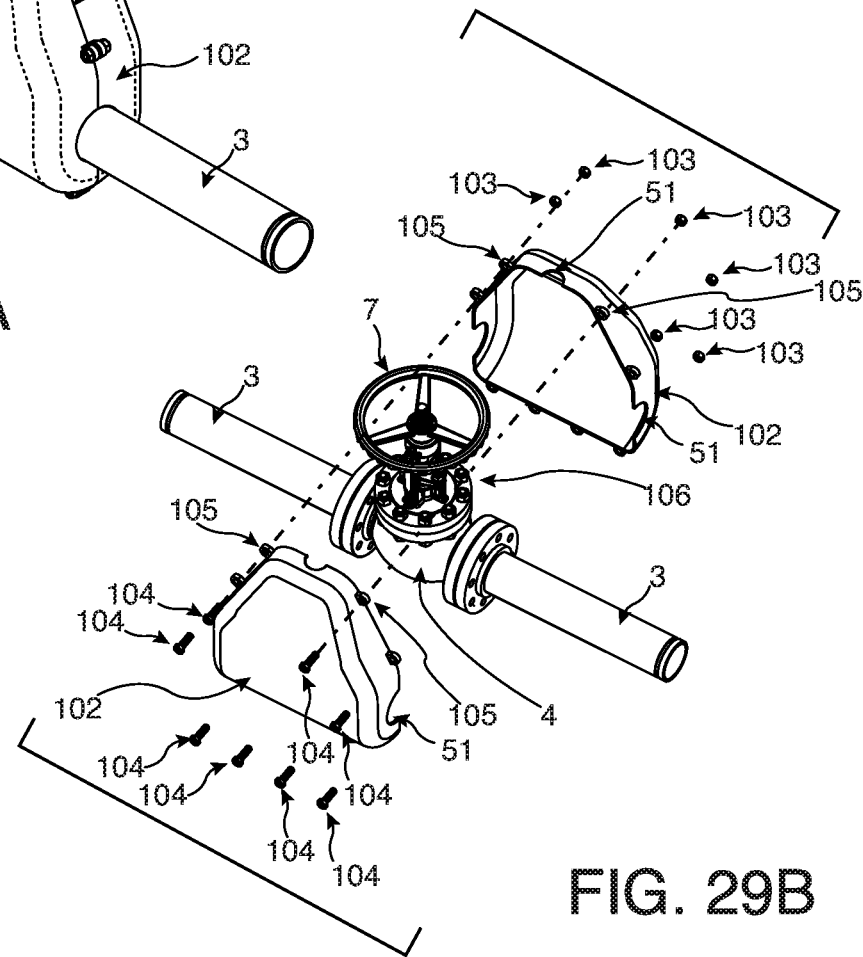
FIG. 29B. Exploded view of an industrial application embodiment on a portion of a piping system.
Figure 29C:
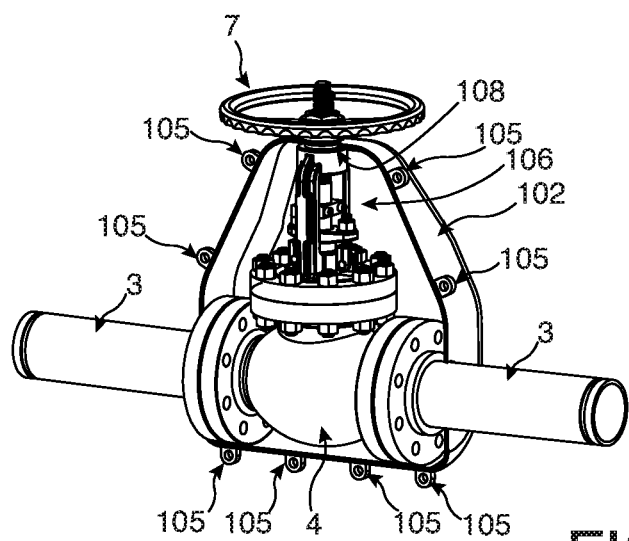
FIG. 29C. Perspective view of an industrial application embodiment on a portion of a piping system, where an industrial application partial container piece is removed.

In certain embodiments, a sensor unit for a lever valve container 97 embodiment may be placed on a number of different locations, for example, within an encapsulated area, or outside of an encapsulated area by such lever valve container 97. In such cases, a portion of a sensor unit, such as a sensor probe, placed within an encapsulated area by a lever valve container 97 embodiment allows a sensor unit to detect leaks of a fluid from components of a piping system encapsulated by such lever valve container 97 embodiment. A sensor opening may be located on a lever valve partial container piece 99, access port, access panel, or other features relating to a lever valve container 97 embodiment Certain embodiments may be used for industrial, commercial, residential, and other distribution applications. A certain embodiment of an industrial application is shown in FIG. 29A, FIG. 29B, FIG. 29C, FIG. 30A, FIG. 30B, FIG. 30C, and FIG. 30D. Certain embodiments of an industrial application includes an enclosed container 101 as shown in FIG. 29A. An enclosed container 101 embodiment encloses components of a piping system, where such components including pipes 3 or a valve may be associated with an oil or gas supply, and such valve regulates the flow of such fluid. As shown in FIG. 29B, an enclosed container 101 embodiment further includes more than one partial container piece 102 embodiment. As shown in FIG. 29B and FIG. 29C, such partial container piece 102 embodiments are fastened by a fastening feature, such as a plurality of threaded fasteners 104 and nuts 103, where a nut 103 may include an internal screw thread to mate with a thread of a threaded fastener. In such embodiment, further shown in FIG. 29C, FIG. 30B and FIG. 30C, a partial container piece 102 embodiments further includes a tabbed feature with aperture 105 embodiment or a plurality of such tabbed features with apertures. In an embodiment, a tabbed feature with aperture, located around an edge of one industrial application partial container piece 102, aligns with a tabbed feature with aperture around an edge of another partial container piece 102, as shown in FIG. 30A and FIG. 30C. A tabbed feature with aperture 105 further comprises an aperture in which a threaded fastener 104 may pass through. In such manner, as shown in FIG. 29B, a plurality of threaded fasteners 104 and nuts 103 secures two industrial application partial container piece 102 at a plurality of tabbed features with apertures 105.

In certain embodiments, joining edge 6 of two partial container piece 102 embodiments have a seal, such as a face seal, on one or both sides of a joining edge as to prevent fluid flow outside of such joined edges. As shown in FIG. 30D, joining edges 6 of two partial container piece 102 embodiments may be fitted, where one joining edge 6 has a tongue 107 and another joining edge 6 has a groove 87. Such tongue 107 and groove 87 portions may be made of a gasketing material, such gasketing material comprising of a singular segment of flexible or semi-rigid gasket material, a plurality of flexible gasket material, a plurality of semi-rigid gasket material or a plurality of rigid gasket material. It will be appreciated that gasketing material may comprise of one or more materials including but not limited to materials polymeric, metallic, and/or organic in nature. Some examples of materials used in the manufacture of gaskets include but are not limited to rubber, nitrile, buna, neoprene, foam, silicone, metal or a plastic polymer such as polytetrafluoroethylene (PTFE), polyether ether ketone (PEEK), urethane, or ethylene propylene. In certain embodiments of the invention, a materials of a tongue 107 and groove 87 interface is comprised of a material or a plurality of materials such as rubber or silicone, or other materials having sealing properties known to persons having skill in the art. Compression of partial container piece 102 embodiments by fasteners, such as a plurality of threaded fasteners 104 and nuts 103 shown in FIG. 29B, may further compress such materials of a tongue 107 and groove 87 interface shown in FIG. 30D, sealing the encapsulated region of an enclosed container 101 embodiment. In certain embodiments, partial container pieces open up in a clam shell type manner, where such partial container pieces have a hinge or a plurality of hinges.

As shown in FIG. 30B and FIG. 30D partial container piece 102 embodiments have a piping matching contour 51 that fits components of a piping system, such as a pipe. The surface or surfaces of a piping matching contour 51 may contain a lining 98, where such lining may form a seal comparable to that of a gasket, between a piping matching contour 51 and a component of a piping system. Further, as shown in FIG. 29B, FIG. 29C, and FIG. 30D, a piping matching contour 51 may accommodate features of an operating handle, such as an operating handle stem 108. In this manner, aspects of a piping system, such as a pipe 3, straight valve 4, and valve assembly 106 may be encapsulated by an enclosed container 101 embodiment or more than one partial container piece 102 embodiments, as shown in FIG. 29B and FIG. 29C. Certain embodiments of an enclosed container 101 embodiment may have a material resisting corrosion. In some cases, the material for an enclosed container 101 depends on the properties of a fluid that a piping system carries, where such fluid may be organic compounds, petroleum, crude oil, gasoline, natural gas, fracking fluid, emulsifiers, proppants including sand, hydrochloric acid, among others.

In certain embodiments, a sensor unit for an enclosed container 101 embodiment may be placed on a number of different locations, for example, within an encapsulated area, or outside of an encapsulated area. In such cases, a portion of a sensor unit, such as a sensor probe or a plurality of sensor probes, placed within an area encapsulated by such enclosed container 101 embodiment allows a sensor unit to detect leaks of a fluid from components of a piping system encapsulated by such enclosed container 101 embodiment. In other embodiments, a portion of a sensor unit, such as a sensor probe, or a plurality of sensor probes, may be placed outside of an area an area encapsulated by such enclosed container 101, allowing detection of a fluid in an area surrounding a enclosed container 101. In an exemplary case of a fluid carried through a piping system having a lower density characteristic relative to the surrounding medium, such as fluid substances which are typically at a gaseous state at atmospheric pressure, a sensor unit, sensor probe, or sensor opening may be placed in a different region of other embodiments of the invention as to better detect leaking of such fluid. For example, in the instance that the fluid carried exists at a gaseous state and exhibits a density less than ambient atmosphere, the sensing feature may be located at an elevated region of a container as the flow of such a fluid would typically flow upward. It is appreciated that more than one sensor unit, sensor probe, or other parts of a sensor unit or a sensor opening may be placed in various embodiments of the invention.

In embodiments of the invention, the opening 11 may come in any number of sizes and shapes to fit many number of different sized portions and shapes of a piping system. For instance, a pipe, hose, valve, junction, connection, and/or other features of a piping system may have components, parts, or features that range in size and shape, and an opening has features to fit such size and shape of such component, part, or feature through an opening. In embodiments of the invention, a pipe, hose, valve, junction, connection, and/or other piping system component carries any different type of fluid or fluids. A pipe, hose, valve, junction, connection, and/or other piping system components, for example, may be specifically designed to carry water or aqueous substances, gas, and hydrocarbons.

Figure 25:
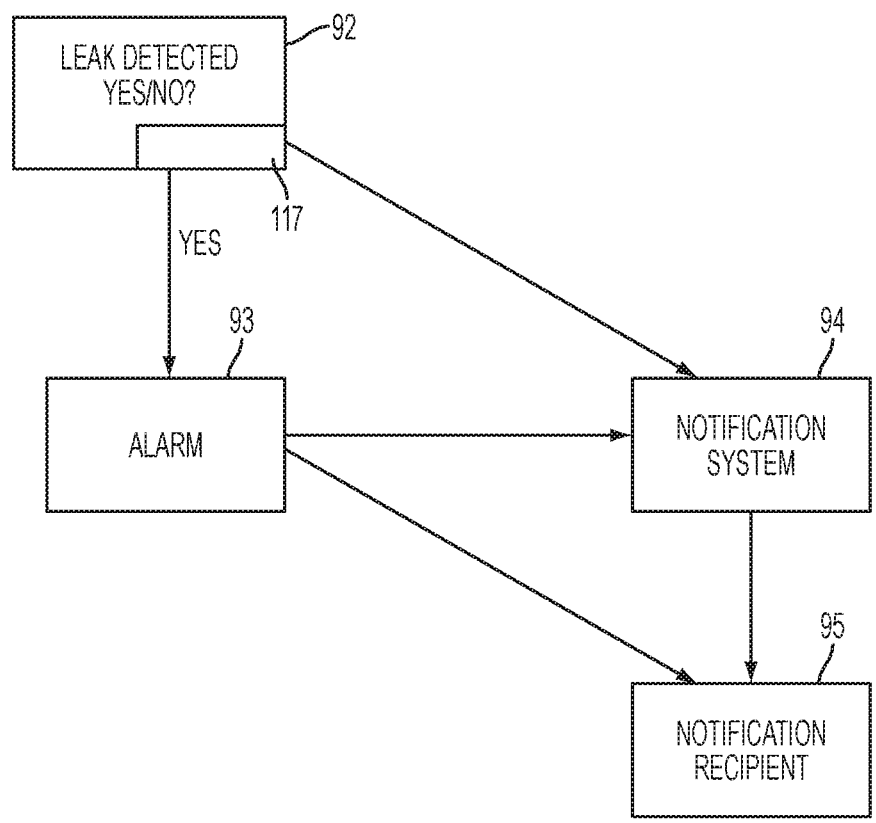
FIG. 25. Box diagram depicting an embodiment of a leak detection and an alarm system.

As seen in FIG. 25, certain embodiments comprise a system to detect leaks. A container 1 is attached to piping system. If a leak is present, the leak is detected by a sensor unit 2, the detection depicted by Element 92. An alarm creates a notification, which can be audible, visual, olfactory, Element 93. The notification can also be applications, such as computer applications, web-based cloud notifications, or smart phone applications (e.g. Android, iOS, etc.), Element 94. The notification can be sent to a homeowner, a gas company, a property management company, an insurance company, and/or a maintenance company, Element 95. Once notified, appropriate action can be taken to fix the leak, thus mitigating the potential damage and loss should the leak have gone unnoticed for longer periods of time. Element 92 may include a control device 117 that may execute instructions and carry out operations associated with sensor device 2 and computer applications, web-based cloud notifications, or smart phone applications as are described herein.

Using instructions from device memory, controller 117 may regulate the reception and manipulation of input and output data in sensor unit 2 and various electronic devices. Controller 117 may be implemented in a computer chip or chips. Various architectures can be used for controller 117 such as microprocessors, application specific integrated circuits (ASIC's) and so forth. Controller 117 together with an operating system may execute computer code and manipulate data. The operating system may be a well-known system such as iOS, Windows, Unix or a special purpose operating system or other systems as are known in the art. Control device 117 may include memory capability to store the operating system and data. Control device 117 may also include application software to implement various functions associated with sensor unit 2.

Referring to FIG. 32, in one embodiment container 1 may be made from a flexible elastomeric material to allow it to be fit over new or existing piping 3. FIG. 32A shows container 1 with gasket 9 surrounding pipe 3. Gasket 9 may be placed over pipe 3 prior to installation of container 1 or gasket 9 may be included as part of container 1 as described herein. As shown in FIG. 32B, container 1 may be flexed in opposite directions 118/119 to create an opening 120 in container 1 to allow it to fit around pipe 3. Container 1 may be made from a flexible elastomeric material such as flexible plastic such as PVC or other such materials as described herein. Gasket 9 provides a seal between pipe 3 and container 1. Gasket 9 could be a split seam gasket to fit around pipe 3 with opening 120 fitting around gasket 9 or gasket 9 could be attached to container 1 to allow it to fit onto pipe 3. For new builds, gasket 9 could be slipped over pipe 3 prior to the attachment of container 1 on pipe 3 around gasket 9. FIG. 32C shows container 1 on pipe 3 below valve 4 and sensor unit 2 to detect leaks from pipe 3 or valve 4 which are deposited in container 1. Opening 120 has been closed such that a seam 125 in container 1 is sealingly closed to prevent fluid leakage from container 1. In some embodiments, gasket 9 may be replaced or supplemented by an elastomeric seal 139 incorporated around opening 120 as shown in FIG. 32A.

Referring to FIGS. 33A and B, in another embodiment a trim cup container 121 may be used. Container 121 includes flexible portions 122/123 that may be moved in opposite directions 118/119 away from one another to allow a pipe 3 to fit into opening 120. A gasket 9 may be included as part of, or separate from, cup 121 to seal cup 121 to pipe 3. For new builds, gasket 9 could be slipped over pipe 3 prior to connection of pipe 3 with other elements and container 121 may be a one piece construction with an opening 120 to slide over pipe 3. In some embodiments, gasket 9 may be replaced or supplemented by elastomeric seal 139 incorporated into and around opening 120. Portions 122/123 may include passive interface sealing or positive engagement to allow for a liquid proof seam after portions 122/123 are engaged. A strip of liquid proof adhesive could be used or a positive interlock with ridges, bumps or latches could be used to allow portions 122/123 to attach to one another after container 121 is placed around pipe 3. In one embodiment, trim cup container 121 may be placed over the trim ring 124 shown in FIGS. 33B and 5A. Gasket 9 may be included as part of cup 121 in the form of elastomeric seal 139 or gasket 9 may be placed separately on pipe 3 as described herein, either before a new installation or as a split gasket 110 in a retrofit application.

Referring to FIG. 33C, the underside of trim cup container 121 is shown placed around pipe 3. Portion 122 overlaps portion 123 to provide a liquid seal at seam 125. Liquid leaking from pipe 3 or valve 12 is caught in cup 121 and sensed by sensor unit 2 as described herein. Referring to FIG. 33D, trim cup 121 is shown in a top view with portion 122 overlapping portion 123 to provide the liquid seal. Trim cup container 121 encloses pipe 3 and gasket 9 provides a liquid seal between container 121 and pipe 3.

Referring to FIGS. 34 A-C, in another embodiment, container 1 could take the form of an integrated unit 126 replacing, for example, wall mounted assembly 69. For example, referring to FIG. 34A, in the embodiment shown in FIGS. 16C/D/E, wall mounted assembly 69 is replaced by unit 126. Unit 126 may include an enclosure 127 and a box 128 as one or as separate portions. FIG. 34B is a perspective view of box 128 without enclosure 127. It should be expressly understood that enclosure 127 is optional. Box 128 may be installed around shut off valves 68 with or without enclosure 127 such that water leaking from valves 68, hose connections, hose breakage, or other leaks is channeled into area 129 adjacent sensor probes 19 (FIG. 34C) by sloped aspect 25 in area 129. In this embodiment, the use of sleeve 64 may be eliminated as sensor unit 2 will detect fluid leakage from valves 68 as the fluid is channeled to area 129 and contacts probes 19 and is then conducted to drain 130. In addition sensor unit 2 may detect fluid that backs up from drain 130 into areas 129 resulting in early detection of such blockage and overflows. Integrated unit 126 could also be built into pumps, appliances such as a dishwasher, clothes washer, coffee maker and the like by the manufacturer of those devices.

Referring to FIGS. 35 A-D, in another embodiment, a tray 131 may be used to capture and sense fluid leakage. Referring to FIG. 35A, tray 131 includes a bottom portion 132, side portions 133, a rear portion 134 and a front portion 135. Front portion 135 is sealingly attached to bottom portion 132 which may include sloped aspect 25 and may be hingedly attachable to side portions 133. That is, front portion 135 may be moved from an open to a closed position. FIG. 35B shows front portion 135 in a substantially closed position while FIG. 35 C shows front portion 135 in an open position. In the open position, front portion 135 is approximately parallel to, and preferably in contact with, a surface such as a floor 136. In the open position, a fixture 29 such as that shown in FIGS. 22A/B may be rolled (if on wheels) or otherwise placed from floor 136 onto bottom surface 132. By opening front portion 135, rolling and placing is facilitated. Referring to FIG. 35D, texturing 140 could be added to the underside of tray 132 so as to raise tray 132 above floor 136 in order to reduce moisture buildup from condensation or spills. Texturing 140 allows ambient air to circulate beneath tray 132. In some embodiments, front portion 135 is not hingedly attached but is rather fixedly attached and fixture 29 may be placed onto tray 132 and the entire fixture 29 and tray 132 slid into place. In some embodiments, tray 132 may be attached to fixture 29 by the manufacturer and provided as a single unit. Tray 132 may catch and detect internal leaks from pumps, valves and internal lines in the fixture 29.

Referring to FIG. 36A, a rear view of tray 131 with fixture 29 placed thereon is shown. Rear portion 134 of tray 131 includes a sensor unit 2 to detect fluid leakage from pipe 3 or fitting 137 which drips onto tray 131. In some embodiments, grommet holes 141 may be included in tray 131 to allow piping 3 to pass through tray 131. Grommet holes 141 may be elastomeric to provide a fluid seal between piping 3 and tray 131. Referring to FIG. 36B, a perspective view of fixture 29 in tray 131 is shown with front portion 135 of tray 131 in a closed position after fixture 29 has been rolled or otherwise placed onto tray 131. Front portion 135 provides a fluid seal with side portions 133 such that fluid leaking from pipe 3 or fitting coupling 137 is captured inside tray 131 and detected by sensor unit 2. While sensor unit 2 has been shown on the back portion 134 of tray 131, is should be understood that sensor 2 could be placed on side portions 133 or front portion 135 of tray 131.

Referring to FIG. 37A, a fixture 29 such as a dishwasher, refrigerator with icemaker, coffee maker or the like may include one or more containers 1 adjacent piping 3 and compression or other junctions 50 or fitting couplings 137. The container 1 in FIG. 37A catches and detects leakage from that connection on the back of the fixture 29. Container 1 may be attached by the manufacturer or may be adhesively or otherwise attached (hook and loop strips, screws etc.) after manufacture. In one embodiment as shown in FIG. 37B, container 1 may be snapped onto piping 3 by a friction pressure fit of elastomeric seal 139. Sensor 2 in container 1 could be connected to the circuitry of the fixture 29 such as a refrigerator or coffee maker and the fixture itself could generate an alarm or visual notification on a display 144 (FIG. 36B). In other embodiments, fixture 29 could be a valve for industrial applications or a self-detecting furnace with sensor 2 detecting carbon monoxide or other gases or combustion materials.

As shown in FIG. 37C, in another embodiment, a gasket 9 may be included to provide a fluid seal where container 1 connects to pipe 3. Gasket 9 could include slit 110 to allow it to be slipped around pipe 3 in a retrofit application In another embodiment, gasket 9 may be replaced by the elastomeric seal 139 as described in FIG. 37B. In some embodiments, both gasket 9 and seal 139 may be included. In the embodiment where container(s) 1 are included with an original equipment manufacture of fixture 29, gasket 9 or seal 139 could be included during the manufacturing process. Referring to FIG. 37D, in a partial cutaway view, the container 1 in FIG. 37A is shown with sensor unit 2 included as part thereof with probes 19 extending into container 1 through container wall 23.

Referring to FIG. 38, a flow chart illustrating a method for detecting leaking fluid prior to the fluid contacting surrounding structures such as walls, floors and the like is shown. Operation 142 includes installing a leak detection device which sealingly attached to fluid conduit systems adjacent an area which a user desires leak monitoring. This installation may include installing the device on a new build such as in a new home or other structure. For example, the device may be slipped onto a pipe, tube or other conduit prior to connection with an adjacent fitting, pipe or conduit. Installation may also include installing the device on an existing structure (retrofit). In some embodiments, installation may be accomplished by an equipment manufacturer. For example, in the case of a refrigerator, clothes washer, or other such fixture or appliance, the manufacturer may install the device during manufacture. The installation is made to optimize the effect of gravity. For example, in the case of a fluid such as water which is heavier than air, the container is installed with a capture and sensor below the area in which a leak may occur. In the event of a fluid lighter than air, such as a gas, the container is installed such that the capture and sensing area is above the area in which a leak may occur. In some embodiments, the container may enclose part or all of the entire potential leaking area. The container is installed so as to seal with the fluid conduit system to prevent leaking fluid from escaping from the container.

Referring again to FIG. 38, operation 143 includes capturing leaking fluid from a fluid conduit system adjacent the device. The leaking fluid is captured prior to contacting adjacent structure such as wall or floors or, in the case of a leaking gas, prior to its escape into surrounding ambient air. By capturing the fluid prior to contacting a surrounding structure, and notification to a user, substantial damage to the structure may be avoided or mitigated. In the case of a leaking gas, substantial damage to the environment, or possibly an explosive event, may be avoided by early capture and notification of the leaking fluid.

Referring again to FIG. 38, operation 145 includes detecting the captured fluid from operation 143 using the leak detection device. As discussed herein, detecting may include the use of sensor probes 19 or other leak detection devices. The operation of detecting may also include moving the leaking fluid toward the sensor probes 19 by using a sloped aspect 25 or fluid accumulation area in the lower portion of the container for heavier than air fluids or a sloped aspect in the upper portion of the container for lighter than air fluids such as gases. Other devices such as fans could also be used to move the leaking fluid.

Referring again to FIG. 38, operation 146 includes triggering an alarm after detection of a leak. This alarm may be visual, olfactory, audible or other sensory notification such as touch (vibration) as discussed herein. One or more of these types of alarms may be used individually or collectively. For example, sensor 2 in container 1 could be connected to the circuitry of fixture 29 such as a refrigerator or coffee maker and the fixture itself could generate an alarm or visual notification on a display 144 (FIG. 36B).

Referring again to FIG. 38, the method may include optional operation 147 of generating a notification to alert a user of the leaking fluid in addition to or in lieu of operation 146. For example, the sensor unit 2 could include wireless or other electromagnetic signal notification to a user on his or her mobile telephone, computer or other electronic device. For example, smart-phone apps and web interfaces that may be further associated with software or hardware may be used to alert a user to leaking fluid.

While various embodiments have been described in detail, it is apparent that modifications and alterations of those embodiments will occur to those skilled in the art. However, it is to be expressly understood that such modifications and alterations are within the scope and spirit of the present disclosure. Further, the embodiments described herein are capable of being practiced or of being carried out in various ways. Various embodiments have been described in detail, it is apparent that modifications and alterations of those embodiments will occur to those skilled in the art. In addition, it is to be understood that the phraseology and terminology used herein is for the purposes of description and should not be regarded as limiting.

What is claimed is:

1. An apparatus for detecting leaks in a fluid conduit system, the fluid conduit system including a trim ring adjacent a surrounding structure, the fluid conduit system being a residential or commercial plumbing system, the trim ring being for trimming the fluid conduit system entering a wall or floor of the surrounding structure, the apparatus comprising:
    a gasket sealingly engaged with the fluid conduit system;
    a containment apparatus positioned over the trim ring and including a first and a second portion defining an opening therebetween to permit the fluid conduit system to pass through the opening;
    the first and the second portion each including a contour slidably engageable with a grooved portion on the gasket such that the containment apparatus fastens to the fluid conduit system;

the containment apparatus capturing fluid prior to the fluid contacting the surrounding structure;
a fluid accumulation area associated with the containment apparatus including a sloped aspect;
a sensor unit at a bottom of the sloped aspect to detect the captured fluid; and
an alarm associated with the sensor unit to generate a notification.

2. The apparatus of claim 1 wherein the containment apparatus includes a plurality of connectable pieces each sealingly connected to a mating connectable piece adjacent to the fluid conduit system.

3. The apparatus of claim 1 wherein the containment apparatus includes a sleeve to enclose at least a portion of the fluid conduit system.

4. The apparatus of claim 3 wherein the sleeve includes a substantially circular sleeve including an aperture through an approximate center of the sleeve to fit around the fluid conduit system, the sleeve further comprising bellows to expand the sleeve along a length of the fluid conduit system.

5. The apparatus of claim 1 wherein the fluid accumulation area is below at least a portion of the fluid conduit system.

6. The apparatus of claim 1 wherein the alarm is selected from one or more of: an audible alarm; a visual alarm; a scent alarm; or a wireless alarm.

7. The apparatus of claim 1 wherein the fluid conduit system is substantially vertical.

8. The apparatus of claim 1, wherein the sensor unit is located at a lowest region in the fluid accumulation area.

9. The apparatus of claim 1, wherein the containment apparatus, including the first and second portion, is a single piece of material.

10. A method for installing a leak detection device on a fluid conduit system, the fluid conduit system including a trim ring adjacent a surrounding structure, the fluid conduit system being a residential or commercial plumbing system, the trim ring being for trimming the fluid conduit system entering a wall or floor of the surrounding structure, the method comprising the operations of:
placing a gasket around at least a portion of the fluid conduit system;
sliding the leak detection device over the trim ring while allowing the fluid conduit system to pass through an opening between a first portion and a second portion in the leak detection device; and
during the operation of sliding, engaging contours on the first portion and the second portion with a grooved portion on the gasket to sealingly engage the leak detection device with the gasket and to sealingly fasten the leak detection device to the fluid conduit system.

11. The method of claim 10 further including the operations of:
capturing leaking fluid in a fluid containment apparatus prior to the leaking fluid contacting the surrounding structure;
directing the leaking fluid using a sloped aspect;
detecting the leaking fluid in the sloped aspect with a sensor at a bottom of the sloped aspect; and
triggering an alarm to alert a user to the leaking fluid.

12. The method of claim 11 wherein the operation of triggering includes notifying the user by providing one of an audio, a visual, a scent or an electromagnetic message.

13. A leak detection apparatus comprising:
a container positioned beneath at least a substantially horizontal portion of a fluid conduit system;
the container including an engagement portion defining an opening to contact and at least partially surround the substantially horizontal portion of the fluid conduit system;
the engagement portion including a first and a second semi-rigid protruding aspect to allow the engagement portion itself and the first and second semi-rigid protruding aspect to snap onto the substantially horizontal portion of the fluid conduit system;
a fastening mechanism associated with the container to further affix the container to the substantially horizontal portion of the fluid conduit system;
a sloped aspect in the container to direct a fluid leaking from the fluid conduit system to a fluid containment area;
a sensor positioned adjacent the fluid containment area to detect the leaking fluid; and an alarm associated with the sensor to alert a user to the detected leaking fluid.

14. The leak detection apparatus according to claim 13 wherein the fastening mechanism includes one or more of: hardware; saddle clamps; or a strap.

15. The leak detection apparatus according to claim 13 wherein the alarm includes one or more of a visual alarm, a scent alarm, an audio alarm, or an electromagnetic message.

16. The leak detection apparatus of claim 13 further including a substantially circular sleeve including an aperture through an approximate center of the substantially circular sleeve to fit around the fluid conduit system, the substantially circular sleeve further comprising bellows to expand the substantially circular sleeve along a length of the fluid conduit system.

17. A method for installing a leak detection device on a substantially horizontal portion of a fluid conduit system comprising the operations of:
positioning a container beneath at least a portion of the substantially horizontal portion of the fluid conduit system;
snapping a first semi-rigid protruding aspect and a second semi-rigid protruding aspect on the container onto the substantially horizontal portion of the fluid conduit system; and
fastening a mechanism associated with the container to further affix the container to the substantially horizontal portion of the fluid conduit system;
capturing a fluid leaking from the fluid conduit system in the container prior to the leaking fluid contacting a surrounding structure;
directing the leaking fluid using a sloped aspect in the container;
detecting the leaking fluid in the sloped aspect with a sensor at a bottom of the sloped aspect; and
triggering an alarm to alert a user to the detected leaking fluid.

18. The method of claim 17 wherein the operation of triggering includes notifying the user by providing one or more of an audio, a visual, a scent or an electromagnetic message.

19. An apparatus for detecting leaks in a fluid conduit system, the fluid conduit system including a trim ring adjacent a surrounding structure, the fluid conduit system being a residential or commercial plumbing system, the trim ring being for trimming the fluid conduit system entering a wall or floor of the surrounding structure, the apparatus comprising
a gasket sealingly engaged with the fluid conduit system;
a containment apparatus positioned over the trim ring and including a first and a second portion defining an opening therebetween to permit the fluid conduit system to pass through the opening;

the gasket including shaped edges on an exterior portion of the gasket to sealingly interface with matable edges on the first and second portion of the containment apparatus such that the containment apparatus sealingly fastens to the fluid conduit system;

the containment apparatus capturing fluid prior to the fluid contacting the surrounding structure;

a fluid accumulation area associated with the containment apparatus including a sloped aspect;

a sensor unit at a bottom of the sloped aspect the sloped aspect to detect the captured fluid; and an alarm associated with the sensor unit to generate a notification.

20. A method for installing a leak detection device on a fluid conduit system, the fluid conduit system including a trim ring adjacent a surrounding structure, the fluid conduit system being a residential or commercial plumbing system, the trim ring being for trimming the fluid conduit system entering a wall or floor of the surrounding structure, the method comprising the operations of:

placing a gasket around at least a portion of the fluid conduit system;

sliding the leak detection device over the trim ring while allowing the fluid conduit system to pass through an opening between a first and a second portion in the leak detection device; and during the operation of sliding, mating shaped edges on each of the first portion and the second portion with matable edges on the gasket to sealingly engage the leak detection device with the gasket and to sealingly fasten the leak detection device to the fluid conduit system.

* * * * *